US007419162B2

(12) United States Patent
Lancaster et al.

(10) Patent No.: US 7,419,162 B2
(45) Date of Patent: Sep. 2, 2008

(54) GAMING SYSTEM WITH BLACKJACK PRIMARY GAME AND POKER SECONDARY GAME

(75) Inventors: Eric W. Lancaster, Las Vegas, NV (US); Steven R. Kastner, Las Vegas, NV (US)

(73) Assignee: IGT, Reno, NV (US)

( * ) Notice: Subject to any disclaimer, the term of this patent is extended or adjusted under 35 U.S.C. 154(b) by 402 days.

(21) Appl. No.: 11/303,551

(22) Filed: Dec. 15, 2005

(65) Prior Publication Data

US 2006/0131809 A1 Jun. 22, 2006

Related U.S. Application Data

(60) Provisional application No. 60/637,211, filed on Dec. 17, 2004.

(51) Int. Cl.
*A63F 1/00* (2006.01)
*A63F 9/24* (2006.01)
*A63F 13/00* (2006.01)

(52) U.S. Cl. ............................ 273/292; 463/16; 463/20

(58) Field of Classification Search ................. 273/292; 463/16, 20, 12, 25
See application file for complete search history.

(56) References Cited

U.S. PATENT DOCUMENTS 2,743,108 A 4/1956 Sanders
3,904,207 A 9/1975 Gold
4,363,485 A 12/1982 Edwall
4,582,324 A 4/1986 Koza et al.
4,618,150 A 10/1986 Kimura
4,652,998 A 3/1987 Koza et al.
4,659,087 A 4/1987 Shen et al.
4,695,053 A 9/1987 Vazquez, Jr. et al.
4,743,022 A 5/1988 Wood
4,775,155 A 10/1988 Lees
4,807,884 A 2/1989 Breeding
4,836,553 A 6/1989 Suttle et al.
4,844,464 A 7/1989 Berge (Continued)

FOREIGN PATENT DOCUMENTS

EP 0 449 433 10/1991

(Continued)

OTHER PUBLICATIONS

Advantage Casino System Bonusing Brochure, written by IGT, available prior to Dec. 17, 2004.

(Continued)

*Primary Examiner*—Eugene L. Kim
*Assistant Examiner*—Michael D Dennis
(74) *Attorney, Agent, or Firm*—Bell, Boyd & Lloyd LLP

(57) ABSTRACT

A gaming device having a primary game and a secondary game is provided. The gaming device includes a primary game, such as blackjack or 21 operable on a wager by a player, and an optional secondary game that is operable on a secondary game wager by a player. After placing a secondary game wager and satisfying certain criteria in the primary game, one or more players are provided with a secondary game card to be used in the secondary game. The secondary game is resolved after a player has accumulated a plurality of secondary game cards over the course of several sequentially played rounds of the primary game.

44 Claims, 31 Drawing Sheets

U.S. PATENT DOCUMENTS 4,861,041 A 8/1989 Jones et al.
5,019,973 A 5/1991 Wilcox et al.
5,033,744 A 7/1991 Bridgeman et al.
5,087,405 A 2/1992 Maker
5,098,107 A 3/1992 Boylan et al.
5,116,055 A 5/1992 Tracy
5,154,429 A 10/1992 LeVasseur
5,174,579 A 12/1992 Griffiths
5,205,555 A 4/1993 Hamano
5,248,142 A 9/1993 Breeding
5,275,400 A 1/1994 Weingardt et al.
5,275,416 A 1/1994 Schorr et al.
5,280,909 A 1/1994 Tracy
5,288,077 A 2/1994 Jones
5,288,081 A 2/1994 Breeding
5,292,127 A 3/1994 Kelly et al.
5,334,836 A 8/1994 Filo
5,342,047 A 8/1994 Heidel et al.
5,342,049 A 8/1994 Wichinsky et al.
5,344,144 A 9/1994 Canon
5,362,053 A 11/1994 Miller
5,364,105 A 11/1994 Jones
5,377,973 A 1/1995 Jones et al.
5,377,993 A 1/1995 Josephs
5,390,934 A 2/1995 Grassa
5,393,057 A 2/1995 Marnell, II
5,393,067 A 2/1995 Paulsen et al.
5,407,200 A 4/1995 Zalabah
5,411,271 A 5/1995 Mirando
5,417,430 A 5/1995 Breeding
5,431,407 A 7/1995 Hofberg et al.
5,452,899 A 9/1995 Skratulia et al.
5,454,570 A 10/1995 Karal
5,476,259 A 12/1995 Weingardt
5,494,296 A 2/1996 Grassa
5,529,309 A 6/1996 Bartlett
5,531,440 A 7/1996 Dabrowski et al.
5,536,016 A 7/1996 Thompson
5,542,669 A 8/1996 Charron et al.
5,560,603 A 10/1996 Seelig et al.
5,570,885 A 11/1996 Ornstein
5,577,731 A 11/1996 Jones
5,584,485 A 12/1996 Jones et al.
5,584,763 A 12/1996 Kelly et al.
5,597,162 A 1/1997 Franklin
5,607,162 A 3/1997 Boylan et al.
5,611,730 A 3/1997 Weiss
5,615,888 A 4/1997 Lofink et al.
5,626,341 A 5/1997 Jones et al.
5,632,485 A 5/1997 Woodland et al.
5,639,088 A 6/1997 Schneider et al.
5,639,089 A 6/1997 Matsumoto et al.
5,641,730 A 6/1997 Brown
5,645,486 A 7/1997 Nagao et al.
5,649,705 A 7/1997 String
5,651,548 A 7/1997 French et al.
5,660,391 A 8/1997 Klasee
5,660,393 A 8/1997 Dreger
5,664,781 A 9/1997 Feola
5,673,917 A 10/1997 Vancura
5,678,821 A 10/1997 Hedman
5,685,774 A 11/1997 Webb
5,713,574 A 2/1998 Hughes
5,718,430 A 2/1998 Aramapakul et al.
5,720,483 A 2/1998 Trinh
5,735,742 A 4/1998 French
5,743,523 A 4/1998 Kelly et al.
5,755,619 A 5/1998 Matsumoto et al.
5,769,716 A 6/1998 Saffari et al.
5,772,506 A 6/1998 Marks et al.
5,781,647 A 7/1998 Fishbine et al.
5,788,573 A 8/1998 Baerlocher et al.
5,788,574 A 8/1998 Ornstein et al.
5,794,964 A 8/1998 Jones et al.
5,795,225 A 8/1998 Jones et al.
5,806,846 A 9/1998 Lofink et al.
5,816,575 A 10/1998 Keller
5,823,873 A 10/1998 Moody
5,823,874 A 10/1998 Adams
5,830,063 A 11/1998 Byrne
5,833,536 A 11/1998 Davids et al.
5,833,537 A 11/1998 Barrie
5,839,730 A 11/1998 Pike
5,845,906 A 12/1998 Wirth
5,848,932 A 12/1998 Adams
5,851,011 A 12/1998 Lott
5,851,148 A 12/1998 Brune et al.
5,855,515 A 1/1999 Pease et al.
5,857,678 A 1/1999 Coleman et al.
5,863,041 A 1/1999 Boylan et al.
5,873,781 A 2/1999 Keane
5,882,261 A 3/1999 Adams
5,890,962 A 4/1999 Takemoto
5,893,718 A 4/1999 O'Donnell
5,911,418 A 6/1999 Adams
5,911,419 A 6/1999 Delaney et al.
5,927,714 A 7/1999 Kaplan
5,935,002 A 8/1999 Falciglia
5,941,769 A 8/1999 Order
5,947,820 A 9/1999 Morro et al.
5,947,822 A 9/1999 Weiss
5,951,397 A 9/1999 Dickinson
5,957,776 A 9/1999 Hoehne
5,967,894 A 10/1999 Kinoshita et al.
5,976,016 A 11/1999 Moody et al.
5,980,384 A 11/1999 Barrie
5,984,310 A 11/1999 English
5,997,401 A 12/1999 Crawford
6,007,066 A 12/1999 Moody
6,012,719 A 1/2000 Webb
6,015,346 A 1/2000 Bennett
6,019,369 A 2/2000 Nakagawa et al.
6,039,650 A 3/2000 Hill
6,047,963 A 4/2000 Pierce et al.
6,050,895 A 4/2000 Luciano, Jr. et al.
6,056,641 A 5/2000 Webb
6,056,642 A 5/2000 Bennett
6,059,289 A 5/2000 Vancura
6,059,658 A 5/2000 Mangano et al.
6,062,981 A 5/2000 Luciano, Jr.
6,089,976 A 7/2000 Schneider et al.
6,089,978 A 7/2000 Adams
6,093,102 A 7/2000 Bennett
6,095,525 A 8/2000 Terminel
6,102,798 A 8/2000 Bennett
6,110,039 A 8/2000 Oh
6,110,041 A 8/2000 Walker et al.
6,110,043 A 8/2000 Olsen
6,117,012 A 9/2000 McCrea
6,120,031 A 9/2000 Adams
6,120,377 A 9/2000 McGinnis, Sr. et al.
6,126,541 A 10/2000 Fuchs
6,126,542 A 10/2000 Fier
6,126,547 A 10/2000 Ishimoto
6,131,908 A 10/2000 Palmer
6,135,884 A 10/2000 Hedrick et al.
6,135,885 A 10/2000 Lermusiaux
6,139,013 A 10/2000 Pierce et al.
6,142,873 A 11/2000 Weiss et al.
6,142,874 A 11/2000 Kodachi et al.
6,146,273 A 11/2000 Olsen
6,155,925 A 12/2000 Giobbi et al.
6,159,095 A 12/2000 Frohm et al.
6,159,096 A 12/2000 Yoseloff 6,159,097 A 12/2000 Gura
6,159,098 A 12/2000 Slomiany et al.
6,165,069 A 12/2000 Sines et al.
6,165,070 A 12/2000 Nolte et al.
6,174,233 B1 1/2001 Sunaga et al.
6,174,235 B1 1/2001 Walker et al.
6,179,291 B1 1/2001 Vancura
6,179,293 B1 1/2001 Hedman
6,186,894 B1 2/2001 Mayeroff
6,190,255 B1 2/2001 Thomas et al.
6,203,010 B1 3/2001 Jorasch et al.
6,210,279 B1 4/2001 Dickinson
6,220,593 B1 4/2001 Pierce et al.
6,220,961 B1 4/2001 Keane et al.
6,224,482 B1 5/2001 Bennett
6,224,484 B1 5/2001 Okuda et al.
6,227,969 B1 5/2001 Yoseloff
6,231,442 B1 5/2001 Mayeroff
6,231,445 B1 5/2001 Acres
6,234,897 B1 5/2001 Frohm et al.
6,237,917 B1 5/2001 Timpano
6,238,288 B1 5/2001 Walker et al.
6,261,177 B1 7/2001 Bennett
6,267,669 B1 7/2001 Luciano, Jr. et al.
6,270,409 B1 8/2001 Shuster
6,270,412 B1 8/2001 Crawford et al.
6,293,866 B1 9/2001 Walker et al.
6,299,536 B1 10/2001 Hill
6,305,686 B1 10/2001 Perrie et al.
6,309,298 B1 10/2001 Gerow
6,309,299 B1 10/2001 Weiss
6,312,330 B1 11/2001 Jones et al.
6,312,334 B1 11/2001 Yoseloff
6,313,871 B1 11/2001 Schubert
6,334,814 B1 1/2002 Adams
6,336,859 B2 1/2002 Jones et al.
6,336,862 B1 1/2002 Byrne
6,345,824 B1 2/2002 Selitzky
6,346,044 B1 2/2002 McCrea, Jr.
6,347,996 B1 2/2002 Gilmore et al.
6,371,867 B1 4/2002 Webb
6,375,189 B1 4/2002 Jones
6,386,977 B1 5/2002 Hole
6,398,644 B1 6/2002 Perrie et al.
6,402,147 B1 6/2002 Lo
6,416,409 B1 7/2002 Jordan
6,419,583 B1 7/2002 Crumby et al.
6,425,823 B1 7/2002 Byrne
6,428,412 B1 8/2002 Anderson et al.
6,435,511 B1 8/2002 Vancura et al.
6,443,837 B1 9/2002 Jaffe et al.
6,460,848 B1 10/2002 Soltys et al.
6,461,240 B1 10/2002 Perkins
6,461,241 B1 10/2002 Webb et al.
6,464,582 B1 10/2002 Baerlocher et al.
6,471,591 B1 10/2002 Crumby
6,474,646 B1 11/2002 Webb
6,475,088 B1 11/2002 Jones et al.
6,481,713 B2 11/2002 Perrie et al.
6,482,089 B2 11/2002 Demar et al.
6,485,368 B2 11/2002 Jones et al.
6,503,145 B1 1/2003 Webb
6,511,068 B1 1/2003 Sklansky et al.
6,514,140 B1 2/2003 Storch
6,517,073 B1 2/2003 Vancura
6,517,435 B2 2/2003 Soltys et al.
6,523,831 B2 2/2003 Webb
6,530,837 B2 3/2003 Soltys et al.
6,532,291 B1 3/2003 McGrath
6,533,276 B2 3/2003 Soltys et al.
6,533,658 B1 3/2003 Walker et al.
6,533,662 B2 3/2003 Soltys et al.
6,537,150 B1 3/2003 Luciano et al.
6,547,242 B1 4/2003 Sugiyama et al.
6,553,276 B2 4/2003 Akram et al.
6,569,015 B1 5/2003 Baerlocher et al.
6,572,471 B1 6/2003 Bennett
6,579,180 B2 6/2003 Soltys et al.
6,607,195 B2 8/2003 Vancura
6,609,711 B1 8/2003 Campbell
6,616,531 B1 9/2003 Mullins
6,645,073 B2 11/2003 Lemay et al.
6,648,759 B2 11/2003 Vancura
6,652,378 B2 11/2003 Cannon et al.
6,656,040 B1 12/2003 Brosnan et al.
6,656,047 B1 12/2003 Tarantino et al.
6,672,975 B1 1/2004 Galloway
6,682,419 B2 1/2004 Webb et al.
6,682,420 B2 1/2004 Webb et al.
6,692,003 B2 2/2004 Potter et al.
6,692,355 B2 2/2004 Baerlocher et al.
6,702,289 B1 3/2004 Feola
6,726,427 B2 4/2004 Jarvis et al.
6,733,389 B2 5/2004 Webb et al.
6,749,200 B2 * 6/2004 Yurkins ...................... 273/292
6,758,751 B2 7/2004 Soltys et al.
6,772,975 B2 8/2004 Sommerfeld et al.
6,776,415 B2 8/2004 Robinson et al.
6,789,800 B2 9/2004 Webb
6,802,773 B2 10/2004 Moody
6,808,173 B2 10/2004 Snow
6,827,348 B1 12/2004 Mitchell
6,840,517 B2 1/2005 Snow et al.
6,845,981 B1 1/2005 Ko
6,848,994 B1 2/2005 Knust et al.
6,857,958 B2 * 2/2005 Osawa ......................... 463/20
6,869,074 B2 3/2005 Miller
6,869,075 B1 3/2005 Stavinsky
6,874,786 B2 4/2005 Bruno et al.
6,877,748 B1 4/2005 Patroni et al.
6,878,064 B2 4/2005 Huang
6,884,168 B2 4/2005 Wood et al.
6,896,620 B1 5/2005 Luciano et al.
6,902,167 B2 6/2005 Webb
6,923,446 B2 8/2005 Snow
6,938,900 B2 9/2005 Snow
6,959,928 B2 11/2005 Schultz
7,011,309 B2 3/2006 Soltys et al.
7,017,805 B2 3/2006 Meehan
7,018,291 B1 3/2006 Lemke et al.
7,114,718 B2 10/2006 Grauzer et al.
7,137,630 B2 11/2006 Yurkins
7,159,868 B2 1/2007 Webb
2001/0000933 A1 5/2001 Koelling
2001/0035610 A1 11/2001 Webb
2001/0054796 A1 12/2001 Lo
2002/0028710 A1 3/2002 Ishihara et al.
2002/0034974 A1 3/2002 Wood et al.
2002/0042298 A1 4/2002 Soltys et al.
2002/0042299 A1 4/2002 Soltys et al.
2002/0045472 A1 4/2002 Adams
2002/0068625 A1 6/2002 Soltys et al.
2002/0072405 A1 6/2002 Soltys et al.
2002/0072407 A1 6/2002 Soltys et al.
2002/0094855 A1 7/2002 Berman
2002/0177480 A1 11/2002 Rowe
2002/0198036 A1 12/2002 Baerlocher et al.
2003/0057648 A1 3/2003 Webb
2003/0064772 A1 4/2003 Tempest et al.
2003/0064785 A1 4/2003 Stone et al.
2003/0069064 A1 4/2003 Ainsworth
2003/0071418 A1 4/2003 Saucier
2003/0087696 A1 5/2003 Soltys et al.
2003/0151194 A1 8/2003 Hessing et al.
2003/0171142 A1 9/2003 Kaji et al.
2003/0181231 A1 9/2003 Vancura et al.

| | | | |
|---|---|---|---|
| 2003/0207709 | A1 | 11/2003 | Paotrakul |
| 2003/0207710 | A1 | 11/2003 | Rodgers et al. |
| 2003/0211884 | A1 | 11/2003 | Gauselmann |
| 2003/0236116 | A1 | 12/2003 | Marks et al. |
| 2004/0029631 | A1 | 2/2004 | Duhamel |
| 2004/0053673 | A1 | 3/2004 | Mishra |
| 2004/0053683 | A1 | 3/2004 | Hartl et al. |
| 2004/0070146 | A1 | 4/2004 | Snow |
| 2004/0072619 | A1 | 4/2004 | Brosnan et al. |
| 2004/0152509 | A1 | 8/2004 | Hornik et al. |
| 2004/0164491 | A1 | 8/2004 | Webb |
| 2004/0183256 | A1 | 9/2004 | Ko |
| 2004/0195770 | A1 | 10/2004 | Ornstein |
| 2004/0224777 | A1 | 11/2004 | Smith et al. |
| 2004/0227294 | A1 | 11/2004 | Au-Yeung |
| 2004/0251630 | A1 | 12/2004 | Sines et al. |
| 2005/0012273 | A1 | 1/2005 | Bruno et al. |
| 2005/0026680 | A1 | 2/2005 | Gururajan |
| 2005/0026683 | A1 | 2/2005 | Fujimoto |
| 2005/0029743 | A1 | 2/2005 | Daines |
| 2005/0051963 | A1 | 3/2005 | Snow |
| 2005/0054408 | A1 | 3/2005 | Steil et al. |
| 2005/0059461 | A1 | 3/2005 | Ching et al. |
| 2005/0073100 | A1 | 4/2005 | Falciglia, Sr. |
| 2005/0073102 | A1 | 4/2005 | Yoseloff et al. |
| 2005/0082758 | A1 | 4/2005 | Sklansky et al. |
| 2005/0116414 | A1 | 6/2005 | Yurkins |
| 2005/0119047 | A1 | 6/2005 | Olive |
| 2005/0119048 | A1 | 6/2005 | Soltys et al. |
| 2005/0143168 | A1 | 6/2005 | Torango |
| 2005/0161882 | A1 | 7/2005 | Miller |
| 2005/0164760 | A1 | 7/2005 | Moody |
| 2005/0176488 | A1 | 8/2005 | Olive |
| 2005/0209004 | A1 | 9/2005 | Torango |
| 2005/0236767 | A1 | 10/2005 | Parsadaian et al. |
| 2005/0239542 | A1 | 10/2005 | Olsen |
| 2005/0269776 | A1 | 12/2005 | Miller |
| 2005/0282622 | A1 | 12/2005 | Lindquist |
| 2006/0001211 | A1 | 1/2006 | Lewis et al. |
| 2006/0019739 | A1 | 1/2006 | Soltys et al. |
| 2006/0027970 | A1 | 2/2006 | Kyrychenko |
| 2006/0058082 | A1 | 3/2006 | Crawford, III et al. |
| 2006/0058083 | A1 | 3/2006 | Crawford, III et al. |
| 2006/0058084 | A1 | 3/2006 | Crawford, III et al. |
| 2006/0058085 | A1 | 3/2006 | White et al. |
| 2006/0058086 | A1 | 3/2006 | White et al. |
| 2006/0058087 | A1 | 3/2006 | White et al. |
| 2006/0058088 | A1 | 3/2006 | Crawford, III et al. |
| 2006/0058089 | A1 | 3/2006 | White et al. |
| 2006/0058090 | A1 | 3/2006 | Crawford, III et al. |
| 2006/0058091 | A1 | 3/2006 | Crawford, III et al. |
| 2006/0058092 | A1 | 3/2006 | Crawford, III et al. |
| 2006/0058093 | A1 | 3/2006 | White et al. |
| 2006/0066052 | A1 | 3/2006 | White et al. |
| 2006/0068498 | A1 | 3/2006 | White et al. |
| 2006/0068864 | A1 | 3/2006 | White et al. |
| 2006/0068865 | A1 | 3/2006 | White et al. |
| 2006/0068866 | A1 | 3/2006 | White et al. |
| 2006/0068868 | A1 | 3/2006 | Crawford, III et al. |
| 2006/0068869 | A1 | 3/2006 | White et al. |
| 2006/0068870 | A1 | 3/2006 | Crawford, III et al. |
| 2006/0068871 | A1 | 3/2006 | Crawford, III et al. |
| 2006/0068879 | A1 | 3/2006 | Crawford, III et al. |
| 2006/0068899 | A1 | 3/2006 | White et al. |
| 2006/0079309 | A1 | 4/2006 | Walker et al. |
| 2006/0131809 | A1 | 6/2006 | Lancaster et al. |
| 2006/0160600 | A1 | 7/2006 | Hill et al. |
| 2006/0160608 | A1 | 7/2006 | Hill et al. |
| 2006/0165254 | A1 | 7/2006 | Fujimoto et al. |
| 2006/0177109 | A1 | 8/2006 | Storch |
| 2006/0202422 | A1 | 9/2006 | Bahar |
| 2006/0223638 | A1 | 10/2006 | Koyama et al. |
| 2006/0252521 | A1 | 11/2006 | Gururajan et al. |
| 2006/0252554 | A1 | 11/2006 | Gururajan et al. |
| 2006/0258427 | A1 | 11/2006 | Rowe et al. |
| 2006/0258442 | A1 | 11/2006 | Ryan |
| 2006/0264252 | A1 | 11/2006 | White et al. |
| 2006/0287066 | A1 | 12/2006 | Crawford, III et al. |
| 2006/0287067 | A1 | 12/2006 | White et al. |
| 2006/0287101 | A1 | 12/2006 | Crawford, III et al. |
| 2006/0287102 | A1 | 12/2006 | White et al. |
| 2006/0287103 | A1 | 12/2006 | Crawford, III et al. |
| 2006/0287104 | A1 | 12/2006 | White et al. |
| 2006/0293099 | A1 | 12/2006 | Cooper |
| 2007/0052170 | A1 | 3/2007 | Taylor |
| 2007/0052171 | A1 | 3/2007 | Dargue |
| 2007/0052175 | A1 | 3/2007 | McGurk et al. |
| 2007/0069467 | A1 | 3/2007 | Forster |
| 2007/0085274 | A1 | 4/2007 | Asher et al. |
| 2007/0176366 | A1 | 8/2007 | Jones |

FOREIGN PATENT DOCUMENTS

| | | | |
|---|---|---|---|
| EP | 0 874 337 | | 10/1998 |
| EP | 0 945 837 | | 9/1999 |
| EP | 0 984 408 | | 3/2000 |
| EP | 0 984 409 | | 3/2000 |
| EP | 1 469 432 | | 4/2004 |
| EP | 1532594 | | 11/2006 |
| GB | 2 096 376 | A | 10/1982 |
| GB | 2 097 160 | A | 10/1982 |
| GB | 2 100 905 | A | 1/1983 |
| GB | 2 117 952 | | 10/1983 |
| GB | 2 137 392 | A | 10/1984 |
| GB | 2 142 457 | A | 1/1985 |
| GB | 2 153 572 | A | 8/1985 |
| GB | 2 161 008 | A | 1/1986 |
| GB | 2 161 009 | A | 1/1986 |
| GB | 2 170 636 | A | 8/1986 |
| GB | 2 180 682 | A | 4/1987 |
| GB | 2 181 589 | A | 4/1987 |
| GB | 2 183 882 | A | 6/1987 |
| GB | 2 191 030 | | 12/1987 |
| GB | 2 222 712 | A | 3/1990 |
| GB | 2 226 907 | A | 7/1990 |
| GB | 2 408 951 | | 6/2005 |
| WO | WO 98/47115 | | 10/1998 |
| WO | WO 98/51384 | | 11/1998 |
| WO | WO 00/12186 | | 3/2000 |
| WO | WO 2004/021294 | | 3/2004 |
| WO | WO 2004/112923 | | 12/2004 |
| WO | WO 2005/009563 | | 2/2005 |
| WO | WO 2005/025696 | | 3/2005 |
| WO | WO 2005/025701 | | 3/2005 |
| WO | WO 2005/037385 | | 4/2005 |
| WO | 2005/043475 | | 5/2005 |
| WO | WO 2005/081958 | | 9/2005 |
| WO | WO 2005/083599 | A1 | 9/2005 |
| WO | WO 2005/099425 | A2 | 10/2005 |
| WO | WO 2005/123203 | | 12/2005 |
| WO | 2006/041655 | | 4/2006 |
| WO | 2006/106192 | | 10/2006 |
| WO | 2006/127128 | | 11/2006 |
| WO | WO 2007/038468 | | 4/2007 |

OTHER PUBLICATIONS

Advantage Casino System Brochure, Mobile Data Access, written by IGT, available prior to Dec. 17, 2004.

Advantage Casino System Brochure, NexGen Interactive Touch Screen Display, written by IGT, available prior to Dec. 17, 2004.

Advantage Casino System Marketing Brochure, written by IGT, available prior to Dec. 17, 2004.

Advantage Casino System Table Touch Brochure, written by IGT, 2004.

Description of Poker written by Hoyle's Rules of Games published 1946-1983.

Mikohn Ripley's Believe It or Not Article written by Strictly Slots published in 2001.
Bingo Game Brochure written by Casino Data System/published in 1998.
Fortune Cookie Brochure written by IGT/published in 2000.
Full House Brochure written by Anchor Games/published in 2000.
Jackpot Bingo written by CDS.com/printed Apr. 12, 2001.
Jewel in the Crown Brochure written by Barcrest/Ltd/published date unknown.
Match Reel Game Bonus Description written by IGT/published date unknown.
Payday Poker Article written by Bally Gaming Systems/published in 2005.
Plinko Showcase Show Down written by International Game Technology/published in 2001.
Slot Bingo Wagering Description and Paytable written by IGT/published before Sep. 30, 2004.
Take Your Pick Brochure written by Anchor Games/published in 1999.
Tetris Game Description written by Radica/published in 2000.
Top Dollar Brochure written by IGT/published in 1999.

* cited by examiner

GAMING SYSTEM WITH BLACKJACK PRIMARY GAME AND POKER SECONDARY GAME

PRIORITY CLAIM

This application is a non-provisional application of, claims priority to and the benefit of U.S. Provisional Patent Application Ser. No. 60/637,211, filed on Dec. 17, 2004, the entire contents of which are incorporated herein.

BACKGROUND

Blackjack and poker are two very well known and popular card games. Gaming establishments are always introducing variations to slot machines and table games to increase player excitement and enjoyment. One method of increasing player excitement is to include additional wagering opportunities, bonus games or payout schemes. However, bonus games have not been developed for table games such as Blackjack and poker, where the bonus or secondary game is a persistence game played over a series of plays of the primary game. Therefore, there is a need to create new and exciting games that combine aspects of both poker and blackjack as well as include a bonus game that is played overall several plays of the base game. This provides added excitement to the player by having additional opportunities to win awards. Moreover, in multiplayer table games the player often has idle time while waiting for other players at the table to make decisions. This type of secondary game gives the player an enjoyable diversion that occupies idle time between plays.

SUMMARY OF THE INVENTION

One embodiment of the present invention relates to a gaming device having a secondary game that is based on a series of plays of the primary game. The primary game is operable or initiated upon a wager by a player. The secondary game is operable or initiated upon a separate additional wager by a player. The secondary game is optional to each player and the separate additional wager on the secondary game is thus optional to each player. In one embodiment, in each play of the primary game where a player has placed a wager on the secondary game, the player may receive a secondary game element if a predetermined criteria or a triggering event occurs in or results from the play of the primary game.

In one embodiment, the secondary game element is a component (such as a symbol or card) from the play of the primary game. The gaming device stores in a memory device the secondary game element from or in association with the primary game, displays the secondary game element(s) to the player and enables the player to accumulate further secondary elements over several plays of the primary game. After one or more players accumulate a designated or predetermined number of secondary elements over the course of several plays of the primary game, the gaming device evaluates the secondary game elements against a set of rules or paytable and provides the player or players with any secondary award occurring in the secondary game at least partially based on those accumulated secondary game elements. This enables each player to participate in two different games simultaneously, thereby enhancing the gaming experience. Furthermore, this gives the player, who has accumulated at least some secondary game elements, added incentive to place additional wagers in the primary game to complete the secondary game.

In one embodiment, the primary game is played at a live gaming table with a human dealer. The gaming table can accommodate one player, but preferably can accommodate a plurality of players. The primary game may be blackjack, poker (including any of the numerous poker games), pai gow, roulette, baccarat, craps, alternatives thereof or any other suitable table game. The secondary game may also be any suitable game. In one such embodiment, the primary table game is blackjack, played with one or more conventional decks of 52 playing cards and the secondary game is a poker game. Prior to the start of the primary game, each player makes a wager on the primary game and places the wager in a primary wagering area on the table. At the same time, each player has the option of making a separate additional wager on the secondary game. The separate additional wager is placed on the gaming table in a secondary wagering area on the table. The dealer deals a hand to each player and a hand to himself or herself. Each player may hit, stand, double down, split, and take insurance according to the house rules in a conventional manner. After each player's hand is finished, the dealer reveals the dealer's down card and hits until the dealer's hand satisfies a predetermined condition (such as the value of the dealer's hand exceeding sixteen). The dealer determines wins and losses for the primary game and provides each player at the table with any payouts or collects each player's wagers in the event of a loss in the primary game in a conventional manner.

In one embodiment, the gaming table includes at least one processor or is associated with at least one processor that operates a card recognition system that employs optical, radio frequency (RFID), or other suitable card identification technologies to identify and to keep track of each player's and dealer's cards in the primary game. In one embodiment, the card recognition system includes a computer tracking program. For example, in a Blackjack table game where an optical reader is included in a card shoe, a computer tracking program would be able to determine the number of cards dealt and at least partially determine what cards have been dealt to the different players at the table. In one embodiment, after identification of the cards the processor compares each player's cards with the dealer's cards in the primary game, and determines whether to provide each respective player with a secondary game element such as a card from the play of the primary game. Specifically, the processor determines for each player, if the player wagered on the secondary game for that play of the primary game and if the designated condition or triggering condition was satisfied in that play of the primary game. In such event, in one embodiment the gaming device selects one of the cards from the player's hand in the primary game to use as a secondary gaming element. The gaming table includes a display device for each player that displays that player's accumulated secondary game cards for that player. It should be appreciated that this secondary game feature can be provided separately to each player at the table. Each player would have the option of participating in their individual secondary game.

In this embodiment, when a player has achieved the designated number of secondary game cards, the gaming device determines whether the player's secondary game cards are a winning poker combination. If the gaming device determines that the player has a winning poker combination, the gaming device provides a secondary game award to the player. The secondary game award may be based at least in part on the value of the player's secondary game wagers. Also, the secondary game award may be relative to the probability of achieving a particular poker hand with the secondary game cards. For example, the award for a royal flush would be much higher than a reward for a three-of a kind in the secondary game.

In one embodiment, one or more secondary game cards may be initially provided to a player free (i.e., without requiring the player to place the optional side wager). For example, three cards may be provided so that the player only has to accumulate two additional cards to form a complete poker hand. In this example, the player must place the optional side wager and satisfy the triggering condition to receive the fourth and then fifth cards. In one embodiment, the player must only place the optional side wager when he or she is attempting to accumulate the fifth and final secondary game card. Therefore, in this embodiment the player may accumulate the first through the fourth cards over a series of plays of the primary game without having to pay the optional side wager. Then, if a player's first four cards form a promising poker hand, it may be worthwhile for the player to continue to place the optional side wager until they have obtained the fifth and final card. In another embodiment, a player must only place the optional side wager after a predetermined number of plays of the primary game.

Any suitable payout method or pay table may be employed in the secondary game, including but not limited to fixed pay tables, scaled pay tables based on the amount(s) of each player's wagers, and one or more progressive awards. In one such embodiment, one, a plurality of, or each winning hand is limited to a separate progressive award. For example, the following hands may each have a separate progressive award as illustrated below:

| | |
|---|---|
| One Pair (e.g., Jacks or Better) | Progressive Award 1 |
| Two Pair | Progressive Award 2 |
| Three of a Kind | Progressive Award 3 |
| Straight | Progressive Award 4 |
| Flush | Progressive Award 5 |
| Full House | Progressive Award 6 |
| Four of a Kind | Progressive Award 7 |
| Straight Flush | Progressive Award 8 |
| Royal Straight Flush | Progressive Award 9 (Jackpot) |

These awards may be for individual tables or gaming machines, for groups or banks of tables or gaming machines, or for Local or Wide Area Progressives. The gaming device may also or alternatively include other winning combinations (e.g., Four Aces) and fixed or progressive awards associated with the combination.

By providing progressive awards with one, some, or all of the secondary game card hands, and providing limited tables or gaming devices, further player enjoyment and excitement can be generated.

It should thus be appreciated that in one embodiment of the present invention, the primary game is played at a live gaming table and includes a tracking system which tracks the elements, symbols or cards provided to each player in the primary game. The primary game is a live game with actual physical game elements such as cards or die and the secondary game is displayed on a video display mounted in or adjacent to the table. Upon the occurrence of a triggering event in or associated with the primary game, the gaming device transfers information or data for one or more primary game elements such as symbols or cards for use in the secondary game. In the secondary game, the gaming device processes the information or data about the elements, symbols or cards, and causes the display device in the table to display a visual representation of each of the elements, symbols or cards.

In one embodiment, the display device includes a touch screen, and each player can select one or more of the gaming elements to keep in the secondary game. In another embodiment, the gaming elements are all retained and displayed by the secondary game display device. Various other suitable options can be employed in the secondary game. In other words, the secondary game can have its own sets of rules and functions similar to any other game.

In an alternative embodiment, the primary game is played on a processor controlled gaming device at or mounted in a conventional gaming machine cabinet. The primary game may be blackjack, poker (including any of the numerous poker games), pai gow, roulette, baccarat, craps, alternatives thereof, or any other suitable video machine or mechanical machine based game. The secondary game may also be any suitable game. In one embodiment, the primary game is blackjack, played with one or more conventional decks of 52 playing cards and the secondary game is a poker game. The gaming device includes at least one display device such as a main display screen. The main display screen in one embodiment is divided in several viewing areas for displaying the player's hand, the dealer's hand, and for displaying the secondary game cards provided to the player. The gaming device includes a touch screen (or other suitable input device) for enabling the player to place wagers on the primary and secondary games. The touch screen (or other suitable input device) also enables the player to hit, stand, double, or split cards in the primary game in a conventional manner.

In one embodiment, at the beginning of the primary game, each player makes a primary game wager. At the same time, each player has the option of making a separate additional wager on the secondary game. Both the primary game wager and the secondary game wager are displayed by the display device. The gaming device deals or displays a player hand and a dealer hand. Each player may hit, stand, double down, split, or take insurance according to rules of the primary game in a conventional manner. After the play of each player's hands are finished, the gaming device reveals the dealer's down card and hits the dealer's hand until the value exceeds sixteen. The processor determines if one or more players have won the primary game and provides those players with any payout according to the pay table for the primary game. For each player, the gaming device compares the player's cards and the dealer's cards and determines whether to provide the player with a secondary game card. In one embodiment, this secondary game element or card is a card taken from the player's hand in the primary game. The secondary game element or card can be determined in any other suitable manner.

The gaming device enables each player to accumulate further secondary game cards over several plays of the primary game. When a player has achieved the designated or predetermined number of secondary game cards, the gaming device determines whether the player's secondary game cards are a winning poker combination. If the gaming device determines that the player has a winning poker combination, a secondary game award is provided to the player and the player's credits are updated. The secondary game award may be based at least in part on the value of the player's wagers in the secondary game. Any of the above mentioned or other suitable paytables or pay out schemes may be employed in the secondary game. In another embodiment, at least a portion of the players' secondary game wagers may be used to fund a progressive jackpot, where the secondary game awards are provided from the progressive jackpot.

In the above described embodiments, the primary game wager is placed at the beginning of the primary game, prior to any cards having been dealt to the players or the dealer and the secondary game wager is placed at the same time as the primary game wager. However, it should be appreciated that the gaming device may enable the players to place the secondary game wager at other times during the play of the primary game, such as after one or more of the player's cards have been dealt (but not fully revealed), after one or more of the dealer's cards have been dealt (but not fully revealed), or after both the player's cards and the dealer's cards have been dealt (but not fully revealed). In another embodiment, the player can make a secondary wager at any point during the play of the primary game and in one such embodiment the determination of whether to provide a secondary gaming element to the player is a random determination.

Alternatively, the game may enable a player to place a secondary game wager if certain conditions are met. In one embodiment, the game enables the player to place a secondary game wager if the dealer receives a specified card or game element such as an ace or a ten value up-card. In one embodiment, if the player is provided with an opportunity to take insurance, the insurance bet may also serve as the secondary game wager. In another embodiment, a player can place a secondary game wager if that player is presented with the opportunity to split or double-down. Thus, it should be appreciated that the functions of certain bets can have dual roles involving the secondary game.

In one embodiment, for each player the gaming device enables the player to place a secondary game wager if the player's primary game cards include specified combinations of cards such as a pair, three of a kind, or if all of the player's card are the same suit. In another embodiment, the player's initial cards in the primary game may need to be specified card combinations such as a king and queen of the same suit (i.e., a marriage in Pinochle), or any other suitable combination. In one embodiment, the gaming device enables the player to place a secondary wager on the secondary game only if one or both of the player's initially dealt cards from the primary game match one or more predetermined cards. Alternatively, any of the cards in the player's hand may match the predetermined cards. In another embodiment, the gaming device enables the player to place a secondary wager only if one of the cards in the player's hand matches the dealer's face-up card.

It should be appreciated that the gaming device may not require each player to make a secondary game wager for every single play of the primary game to be eligible to participate in the associated secondary game. In one embodiment, one secondary game wager may last for two or more plays of the primary game. In this embodiment, a single secondary game wager gives a player multiple opportunities to receive secondary game cards or elements in or over the course of a plurality of plays of the primary game. In one embodiment, one secondary wager may last until the player actually receives a secondary game card from a result in the primary game. In this embodiment, the player would be required to make only five wagers to receive a complete secondary game hand where the hand has five cards.

It should be understood that it is preferred to require a secondary game wager to maintain (without adjustments) the pay table or payout percentage of the primary game, which will typically be known and used by the house and player. These known pay tables for the primary game define a comfortable zone for both. The separate wager on the secondary game enables the house to accommodate a separate book for the secondary game payouts. However, it is contemplated that a secondary game wager does not have to be placed which would in turn require a higher average payback percentage overall, or a change in the primary game average payback percentage.

Under other circumstances, the players may not be required to place any secondary game wagers to participate or more particularly to the further participate in the secondary game. In one such embodiment, if a player's secondary game cards result in a poor poker hand, the player may not have to place any further additional secondary game wagers to be eligible for a secondary game card. Thus, a minimum potential threshold of the hand in the secondary game may be necessary to require the player to make a wager on the secondary game. For example, if the player has a 2 of diamonds, a 4 of clubs, a 6 of spades and an 8 of hearts, and has no way to win a conventional five card Jacks or better poker hand, the player would not be required to make another secondary game wager to receive a card in the secondary game. In another embodiment, the gaming machine may enable the player to choose to forfeit his or her secondary gaming elements if they do not appear to be able to result in a winning combination or a winning combination of a desired amount. This essentially restarts the secondary game. These embodiments allows the player to move to another round of the secondary game without having to make additional secondary game wagers or wait for the triggering conditions to occur in the primary game. These embodiments also eliminate the need for a player to leave a table or gaming machine if they do not like the secondary game elements. Other solutions to this may include allowing a player to draw one or more times to the secondary game hand as discussed below.

In the above embodiments, the secondary game wager makes a player eligible to or gives the player an opportunity to receive a secondary game card if a predetermined set of criteria or a triggering condition is satisfied or occurs in the primary game as provided above and as further discussed below. It should be appreciated that the triggering condition for determining when the gaming machine provides a secondary game element to the player may vary. In the two example embodiments described above, if a player has placed a secondary game wager on a particular round of the primary game, the player will receive a secondary game card if the dealer obtains a natural blackjack. In other embodiments, the player may receive a secondary game card if the player has received a different negative result in the primary game. For instance, the negative may be if the player (a) loses the hand, (b) busts, (c) busts after having a designated hand value (such as hitting on a hand with a value of twelve), (d) pushes or ties with a good hand (such as a hand of eighteen or better), or (e) doubles down and receives a total hand value of twelve or less.

In other example embodiments, a player may receive a secondary game card if the player has received a positive result in the primary game. For instance, if the player splits aces and draws a ten value card for each ace.

In another embodiment, a player may be provided with a secondary game card or element upon the occurrence of some unusual or predetermined combination of cards in the primary game (such as a five card Charlie). For example, in the primary blackjack game the player may hit three times to receive a total of five cards. If these five cards in the blackjack hand would also qualify as a winning poker hand, the player will receive a secondary game card. In another example, in the primary blackjack hand the player may hit several times and receive a designated number of cards that sequentially increase or decrease in value or rank.

In another embodiment, multiple players playing at a community gaming table or device will receive a secondary game card or element if a minimum number of the players at the table receive a specified result such as blackjack. In one embodiment, even if a player has not made a secondary game wager, the player may still receive a secondary game card if the player's cards in the primary game satisfy a different set of conditions.

It should also be appreciated that more than one of the different triggering events may be employed for the same primary game.

In another embodiment, for each player the player may receive more than one or multiple secondary game cards in one play of the primary game. This may occur in the normal course, or upon an occurrence of a suitable multiple secondary game element triggering event such as the dealer and the player obtaining blackjack.

In one embodiment, the primary game is played with one or more decks of conventional playing cards, and the secondary game elements are cards selected from the cards in the primary game. In this embodiment, and in other embodiments, there is the potential for a player to accumulate more than one secondary game card of the same rank and suit. For example, a player may accumulate two secondary game cards that are the King-of-Hearts. In one embodiment, to address this issue the gaming device may include a set of rules for determining winning combination(s) if a secondary game hand would include duplicate secondary gaming cards. In another embodiment, the gaming device will restrict the selection of a secondary game card to one that is not a duplicate. In such an embodiment, if only duplicates are in the player's hand in the primary game, a different card can be selected from a different player's hand, the dealer's hand, the cards remaining in the deck(s) (i.e., such as the next card in the deck(s)) or cards previously dealt from the deck(s). Other suitable resolutions to this may be employed in accordance with the present invention.

The secondary game may be terminated in a plurality of different manners. In the two above described embodiments, the secondary game terminates when a predetermined number of cards are in the secondary game. In one embodiment, if a player discontinues wagering on the primary game such as by leaving the table or cashing out of the gaming machine, all of the accumulated secondary game elements would be forfeited. In alternate embodiments, the player may be allowed to save the accumulated secondary game elements under certain circumstances.

In one embodiment, where the primary game is played at a conventional gaming table with a human dealer, one or more players may temporarily leave the gaming table and the gaming device will retain the players' secondary game cards for a limited period of time. In this embodiment, the players may place a marker at their playing position to hold their secondary game cards while they temporarily leave the table.

In another embodiment, when a player leaves the table or gaming device, the secondary game elements are stored on a internal or portable memory device, or stored in memory such as on a Local Area Network. It should also be appreciated that in one embodiment the secondary game may be tied to the player's player tracking card which will enable the player to store and retrieve the secondary game elements to continue to play the secondary game.

In one embodiment, where a player has left the primary game, a computing device may keep track of the limited amount of time before the player must return to wagering on the primary game. If the time expires, the secondary bonus elements may be forfeited or suitably stored for later play.

In another embodiment, if one player cashes out and leaves the primary game having accumulated at least one secondary game element, a new player may start playing and have the option of using the previous player's accumulated secondary game elements.

As discussed above, in one embodiment, the primary game is a card game played at a gaming table with a live dealer and one or more conventional decks of fifty-two playing cards. In this embodiment, the gaming table may include suitable scanning or reading technologies that are capable of identifying the values of the dealer's and player's cards. In one embodiment, the card identification system further includes a computer tracking program. For example, where an optical reader is included in a card shoe, a computer tracking program would be able to determine the number of cards dealt and at least partially determine what cards have been dealt to the different players based in part on the rules of the game. The scanning technologies may be optical, based on radio frequency identification or another suitable method.

One example of this type of technology is described in U.S. Patent Application No. 2003/0171142 to Toshiyuki et al., which discloses a card data reader where the card data recorded on the back of each player card will be read by an internal image sensor. Another example of this technology is described in U.S. Patent Application No. 2002/0042298 to Soltys et al. ("Soltys"), which discloses a table monitor that automatically images the activity occurring at a gaming table. The Soltys application describes an imaging system that makes a periodic comparison of captured images identifying player wagering, as well as the appearance, removal and position of cards and other game objects on the gaming table. A third example of a scanning/tracking technology is described in U.S. Patent Application No. 2003/0171142 to Stephen et al. ("Stephen"). The Stephen application describes a method of scanning and tracking cards in a physical deck and dealing a virtual hand of blackjack to each of the players at a gaming table, thereby allowing the players to have their cards come from an actual shuffled deck and eliminating the need for a human dealer. These patents are merely examples of the types of technologies which maybe employed. It should be appreciated that other suitable technologies may be employed.

Employing such a tracking system in the table game would allow the operator to track the cards in the secondary game without adding too much additional work or distractions for the dealer. This may avoid distracting the dealer from the primary blackjack game, which already requires a high level of the dealer's attention.

Employing such tracking technologies and by providing a display screen (either a community screen on or above the table or multiple individual screens) the present invention provides the opportunity to allow each player to effortlessly recall previously dealt cards for viewing and/or play in a secondary game. Providing a display (i.e., that shows the accumulated secondary cards of each of the players at the table) gives a blackjack player an opportunity to review previously played cards. This may give each player information in deciding whether to hit or stand on subsequent rounds of the primary game and may lead to increased enjoyment and excitement for players.

In another embodiment, similar tracking technologies as described above are also employed to determine and keep track of a player's primary wagers and/or secondary wagers. In one embodiment, the tracking technologies identify the amount of each of the player's secondary wagers and store these amounts in a memory device. Therefore, a computing device can factor in the amounts of a player's secondary game wagers in determining a secondary game award in addition to tracking the chips on the table.

As discussed above, the awards in the secondary game may be based on a paytable. This paytable may be based on the minimum, average and maximum secondary game wagers and/or the minimum, average and maximum primary game wagers. It should also be appreciated that the gaming device of the present invention could employ one or more progressive awards for the winning secondary game outcomes as described above or otherwise.

It should thus be appreciated that in one embodiment, the gaming device includes a primary blackjack card game. The gaming device also includes a secondary poker card game, where the cards in the secondary game are obtained in a series of plays of the primary game. Each card is obtained for the secondary game in a play of the primary game if a player makes a separate additional wager on said play of the secondary game and a triggering event occurs. Each card is a component from the respective play of the primary game. An outcome for the secondary game is determined after a predetermined number of cards are obtained in the secondary game during the plays of the primary game.

It should thus be appreciated that in another embodiment, the primary game is played at a blackjack table. The blackjack table has several player positions and a dealer position. The game table includes a primary blackjack card game including at least one deck of playing cards. The blackjack table includes a separate secondary game display at at least one of the player positions at the table, and a secondary game for each player position that is displayed by the secondary game display. For each play of the primary game a secondary game element in the secondary game is obtained based on whether a player makes a separate additional wager on the play of the primary game and a triggering event occurs. The blackjack table also includes a method for tracking the cards in each play of the primary game and automatically determining if at least one secondary game element is provided to the secondary game for that play of the primary game. An outcome is determined for the secondary game after a predetermined number of secondary game elements are obtained in the secondary game based on the plays of the primary game.

It should be appreciated that the primary game and secondary game may be played on a pub-style table-top game, a personal computer, a hand held gaming device, or any other suitable gaming platform.

An advantage of the present invention is that a player can accumulate secondary game elements if the player continues to play additional rounds of the primary game. This provides the possibility of a large secondary game award or payout if the player obtains a winning combination of secondary game elements.

Another advantage of the present invention is that a secondary game is provided that further holds the player's interest during several plays of the primary game.

Additional features and advantages of the present invention are described in, and will be apparent from, the following Detailed Description of the Invention and the figures.

BRIEF DESCRIPTION OF THE FIGURES

FIG. 2B is a schematic diagram of the data network that one or more of the gaming devices of the present invention may be connected to.

DETAILED DESCRIPTION OF THE INVENTION

Figure 1A:
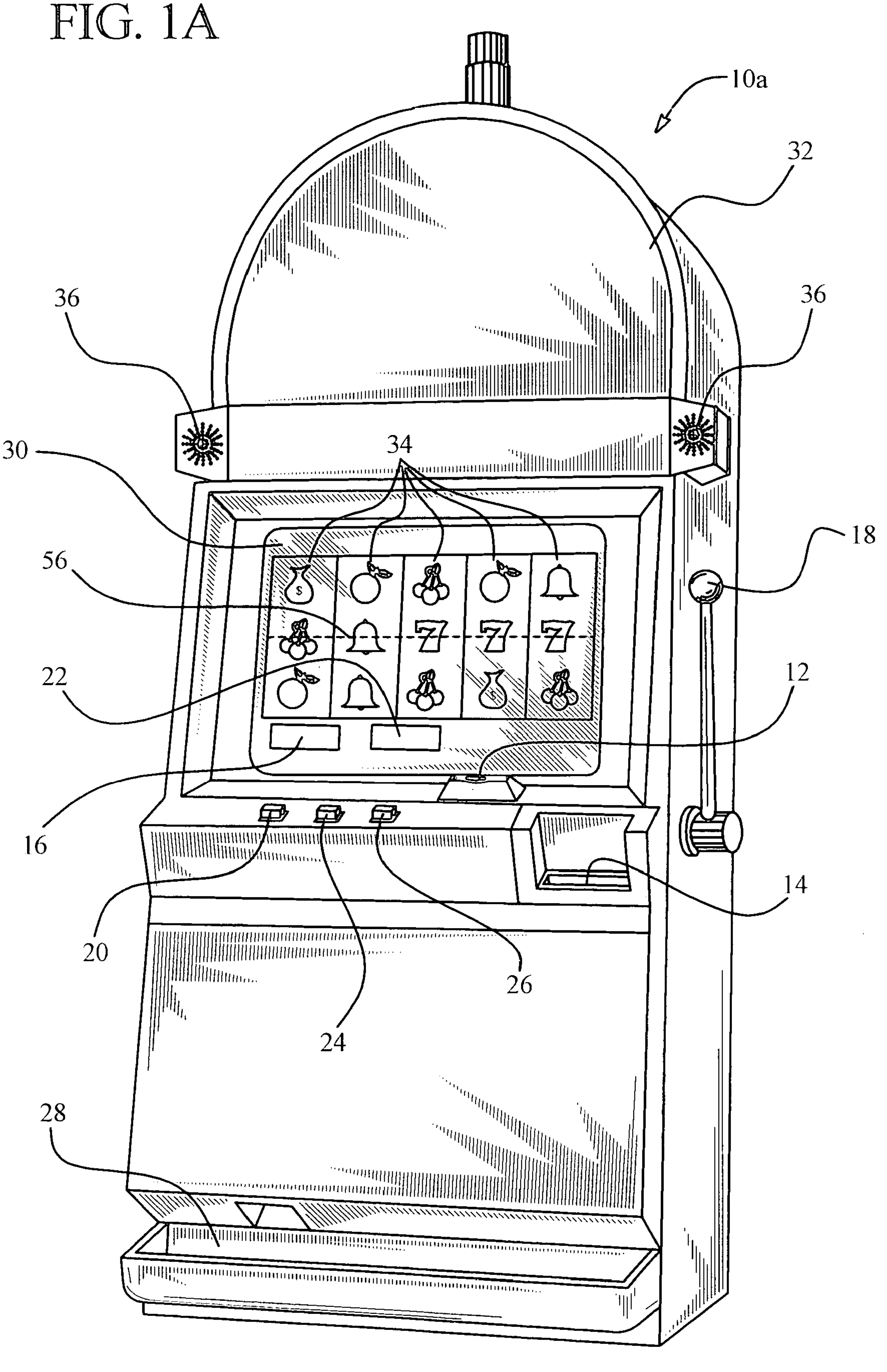
FIG. 1A is front perspective view of one embodiment of the gaming device of the present invention.
Figure 1B:
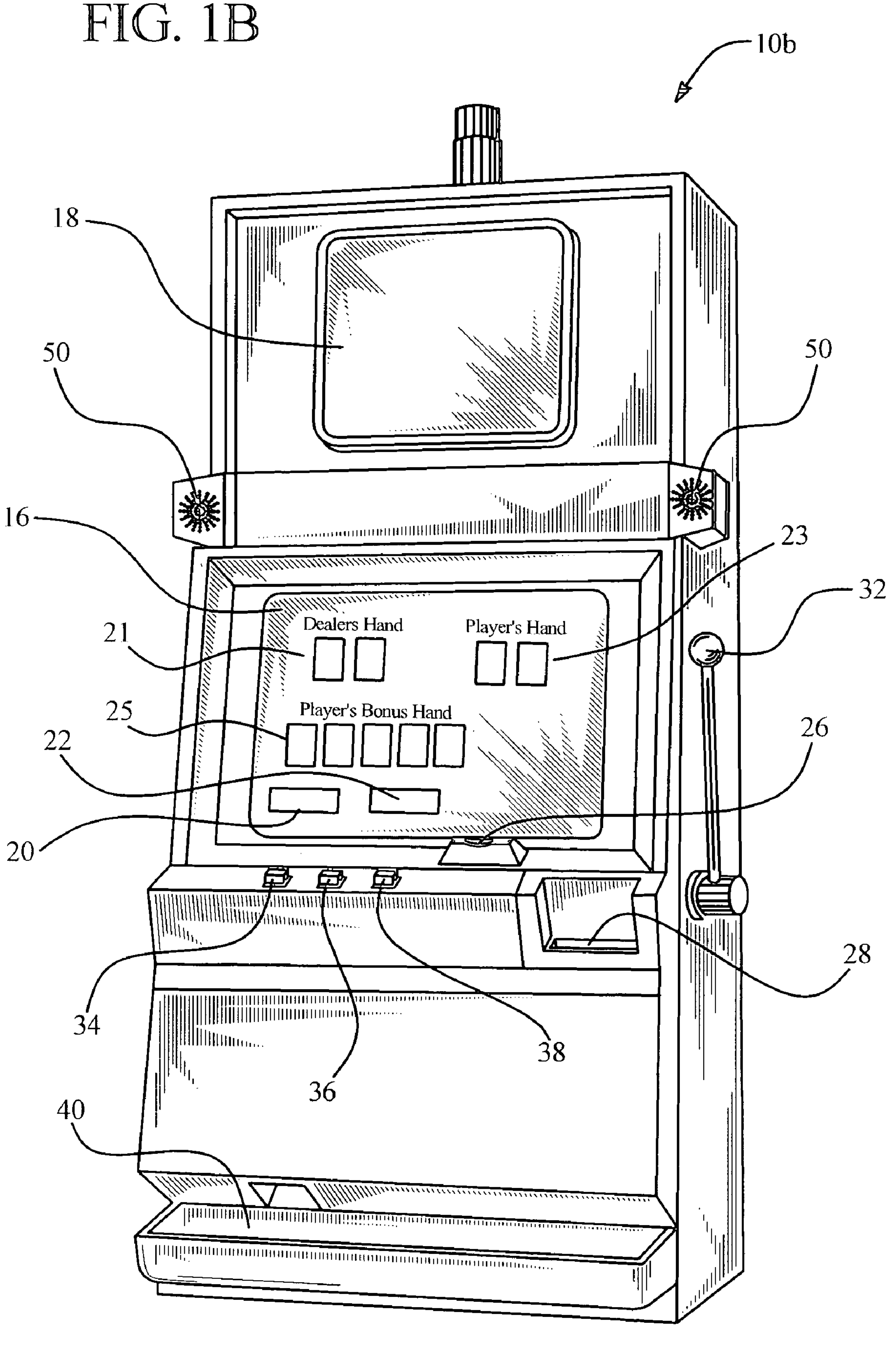
FIG. 1B is front perspective view of another embodiment of the gaming device of the present invention.
Figure 1C:
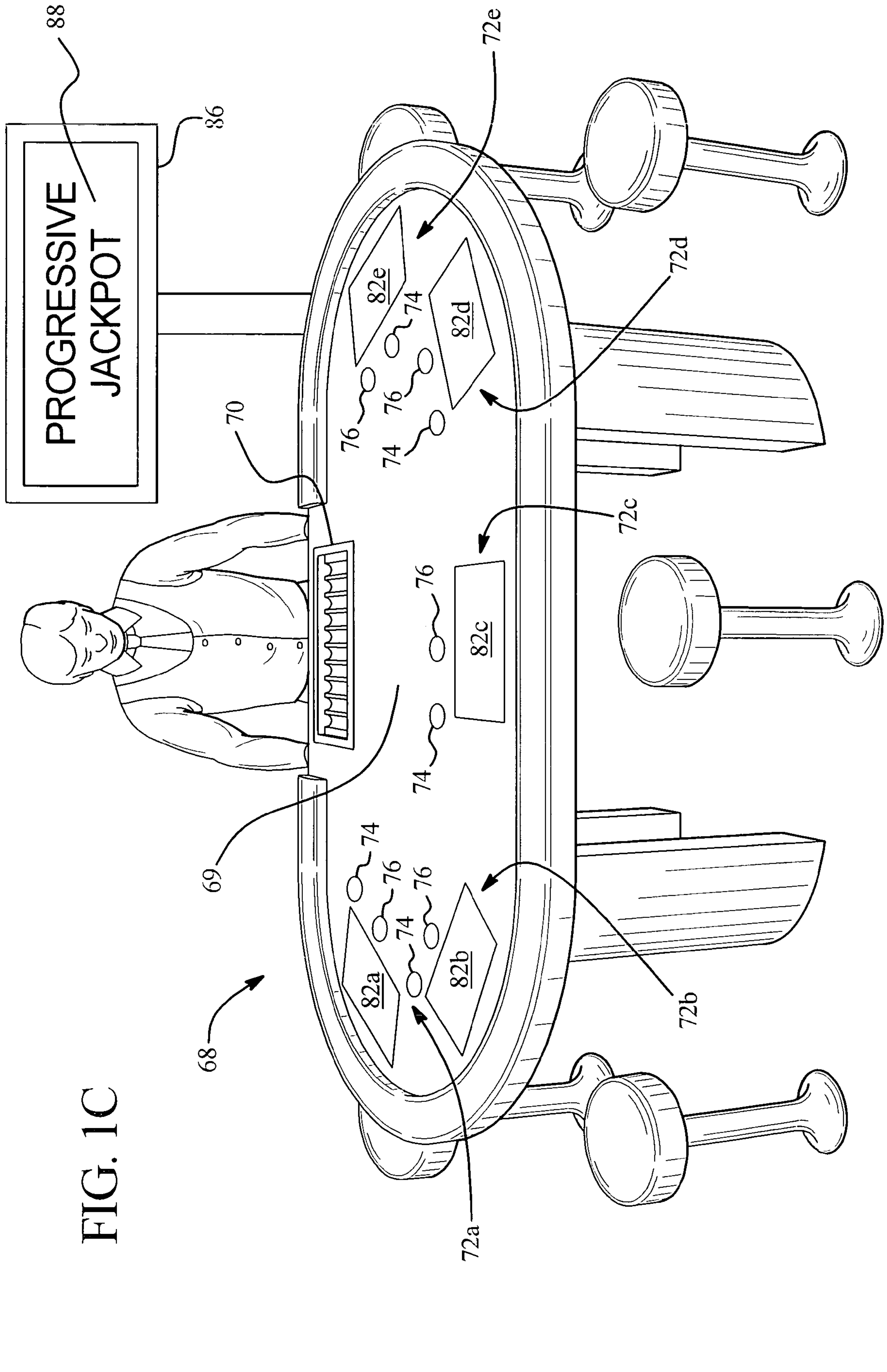
FIG. 1C is a front perspective view of another embodiment of the gaming device of the present invention.
Figure 1D:
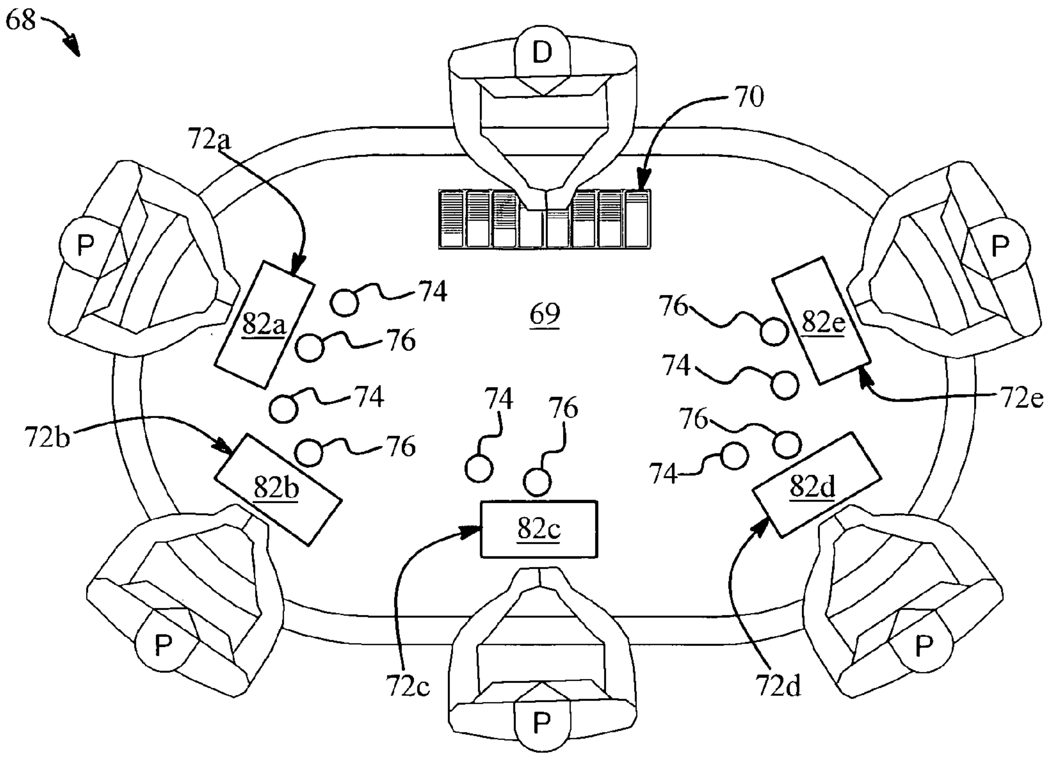
FIG. 1D is a top view of the gaming device of FIG. 1C.
Figure 1E:
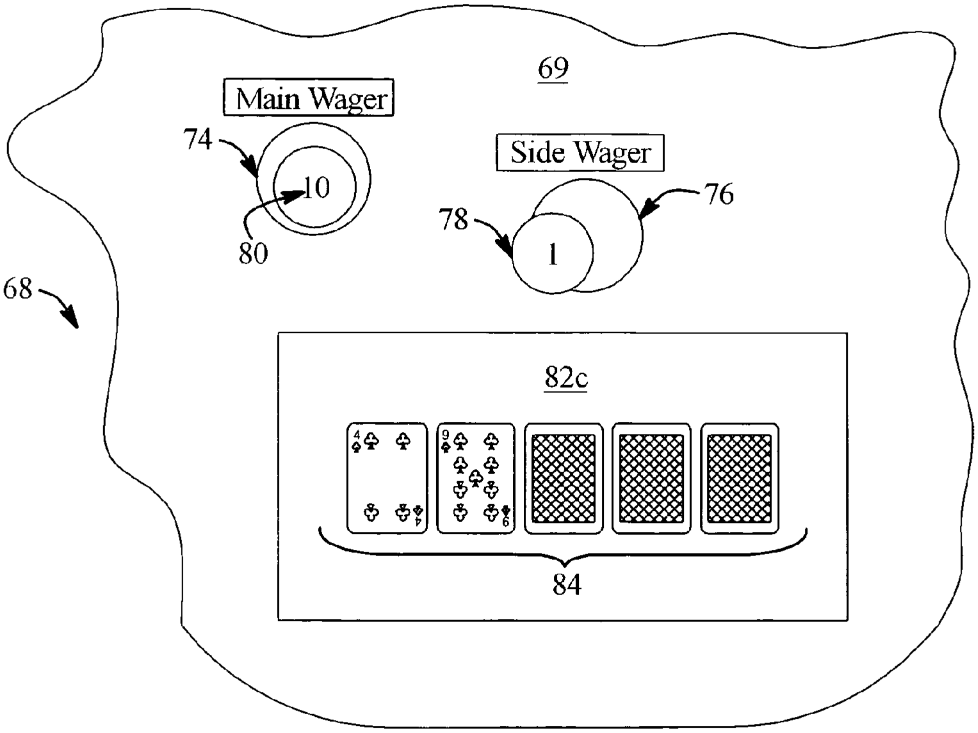
FIG. 1E is an enlarged fragmentary top view of a section of the gaming table illustrated in FIG. 1D.

Referring now to the drawings, two alternative embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10. In another embodiment, as shown in FIGS. 1C, 1D and 1E, the gaming device can be a live gaming table such as a blackjack table.

In one embodiment, as illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device can be constructed with varying cabinet and display configurations.

Figure 2A:
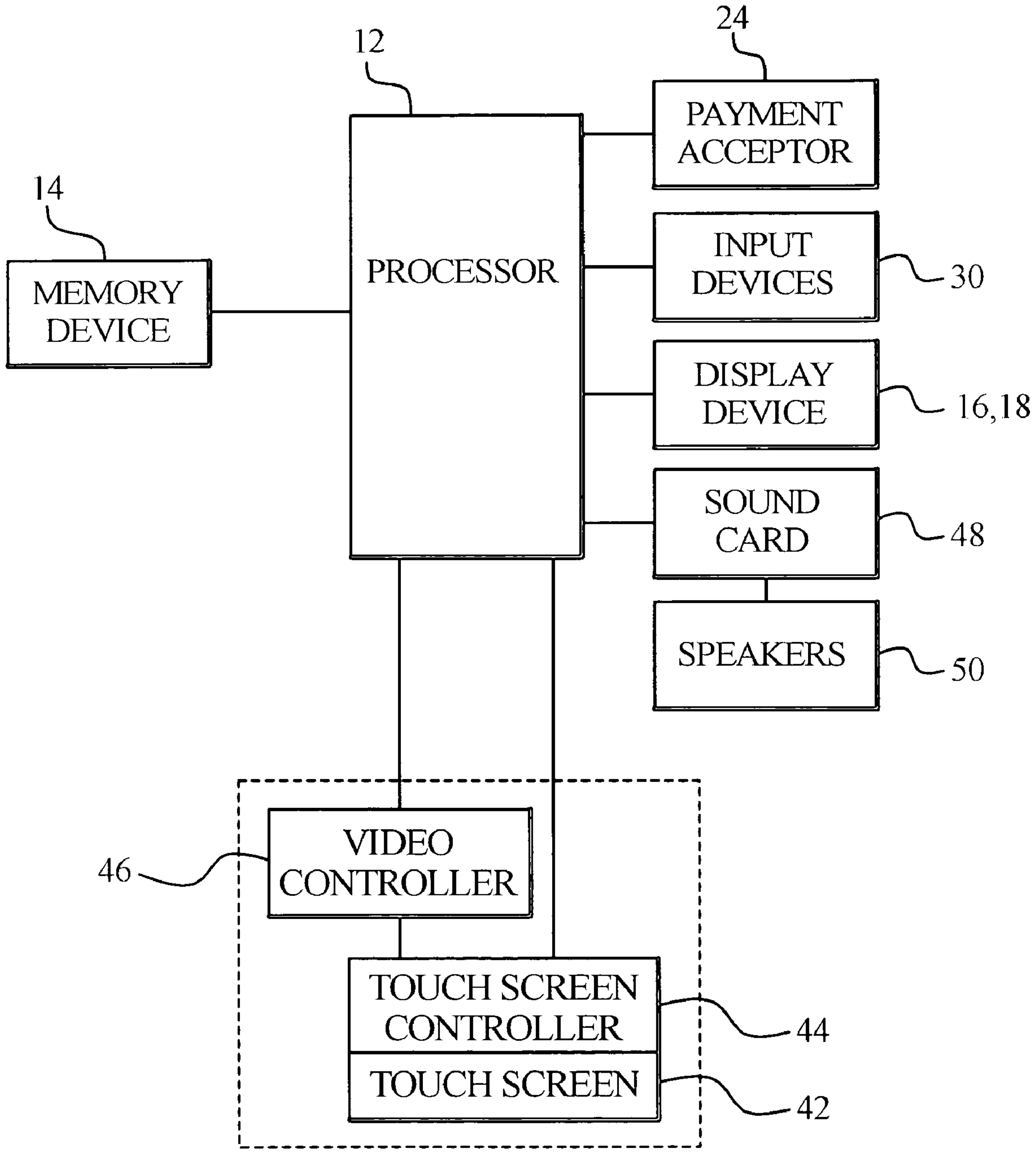
FIG. 2A is a schematic diagram of the electronic configuration of one embodiment of the gaming device of the present invention.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or other operating data, information and applicable game rules that relate to the play of the gaming device. In another embodiment, the memory device includes random access memory (RAM). In one embodiment, the memory device includes read only memory (ROM). In a further embodiment, the memory device includes flash memory and/or EEPROM (electrically erasable programmable read only memory). Any other suitable magnetic, optical and/or semiconductor memory may be implemented in conjunction with the gaming device of the present invention.

In one embodiment, part or all of the program code and/or operating data described above can be stored in a detachable or removable memory device, including, but not limited to, a suitable cartridge, disk, CD ROM, smartcard, memory stick, Compact Flash memory module or USB removable flash drive. A player can use such a removable memory device in a desktop, a laptop personal computer, a personal digital assistant (PDA) or other computerized platform. The processor and memory device may be collectively referred to herein as a computer or controller.

In one embodiment, as discussed in more detail below, the gaming device randomly generates awards and/or other game outcomes based on probability data. That is, each award or other game outcome is associated with a probability and the gaming device generates the award or other game outcome to be provided to the player based on the associated probabilities. In this embodiment, since the gaming device generates outcomes randomly or based upon a probability calculation, there is no certainty that the gaming device will provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device removes the provided award or other game outcome from the predetermined set or pool. Once removed from the set or pool, the specific provided award or other game outcome cannot be provided to the player again. In this type of embodiment, the gaming device provides players with all of the available awards or other game outcomes over the course of the play cycle and guarantees a designated amount of actual wins and losses.

In one embodiment, as illustrated in FIG. 2A, the gaming device includes one or more display devices controlled by the processor. The display devices are preferably connected to or mounted to the cabinet of the gaming device. In another embodiment, as seen in FIGS. 1C, 1D and 1E, at least one of the display devices is part of a live gaming table such as a blackjack table. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated with the primary game and/or information relating to the primary or secondary game. In another embodiment, at least one display device may be a mobile display device, such as a PDA or tablet PC, that enables at least a portion of the primary or secondary game to be played at a location remote from the gaming device. As seen in FIGS. 1A and 1B, in one embodiment, the gaming device includes a credit display 20 which displays a player's current number of credits, cash, account balance or the equivalent. In one embodiment, the gaming device includes a bet display 22 which displays a player's amount wagered.

The display devices may include, without limitation, a monitor, a television display, a plasma display, a liquid crystal display (LCD), a display based on light emitting diodes (LED) or any other suitable electronic device or display mechanism. In one embodiment, as described in more detail below, the display device includes a touch-screen with an associated touch-screen controller. The display devices may be of any suitable configuration, such as a square, a rectangle or an elongated rectangle.

The display devices of the gaming device are configured to display at least one and preferably a plurality of games or other suitable images, symbols and indicia such as any visual representation or exhibition of the movement of objects such as mechanical, virtual or video reels and wheels, dynamic lighting, video images and images of people, characters, places, things and faces of cards, tournament advertisements, promotions and the like.

In one alternative embodiment, the symbols, images and indicia displayed on or by the display device may be in mechanical form. That is, the display device may include any suitable electromechanical device which preferable moves one or more mechanical objects, such as one or more mechanical rotatable wheels, reels or dice, configured to display at least one and preferably a plurality of games or other suitable images, cards, symbols or indicia.

As illustrated in FIG. 2A, in one embodiment, the gaming device includes at least one payment acceptor 24 in communication with the processor. As seen in FIGS. 1A and 1B, the payment acceptor may include a coin slot 26 and a payment, note or bill acceptor 28, where the player inserts money, coins or tokens. The player can place coins in the coin slot or paper money, ticket or voucher into the payment, note or bill acceptor. In other embodiments, devices such as readers or validators for credit cards, debit cards, data cards or credit slips could be used for accepting payment. In one embodiment, a player may insert an identification card into a card reader of the gaming device. In one embodiment, the identification card is a smart card having a programmed microchip or a magnetic strip coded with a player's identification, credit totals and other relevant information. In one embodiment, money may be transferred to a gaming device through electronic funds transfer. When a player funds the gaming device, the processor determines the amount of funds entered and the corresponding amount is shown on the credit or other suitable display as described above. In the embodiment shown in FIGS. 1C-1E, where the gaming played at a live game table, the card may be transferred to a dealer in exchange for playing chips.

As seen in FIGS. 1A, 1B and 2A, in one embodiment the gaming device includes at least one and preferably a plurality of input devices 30 in communication with the processor. The input devices can include any suitable device which enables the player to produce an input signal which is read by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a maximum bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game associated with the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips which are redeemable by a cashier or funded to the player's electronically recordable identification card. In the embodiment shown in FIGS. 1C, 1D and 1E where the game is played at a live gaming table, the player takes the chips which are redeemable by a cashier.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching the touch-screen at the appropriate places.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a player or other sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display device may be configured to display the image acquired by the camera as well as display the visible manifestation of the game in split screen or picture-in-picture fashion. For example, the camera may acquire an image of the player and that image can be incorporated into the primary and/or secondary game as a game image, symbol or indicia.

Figure 2B:
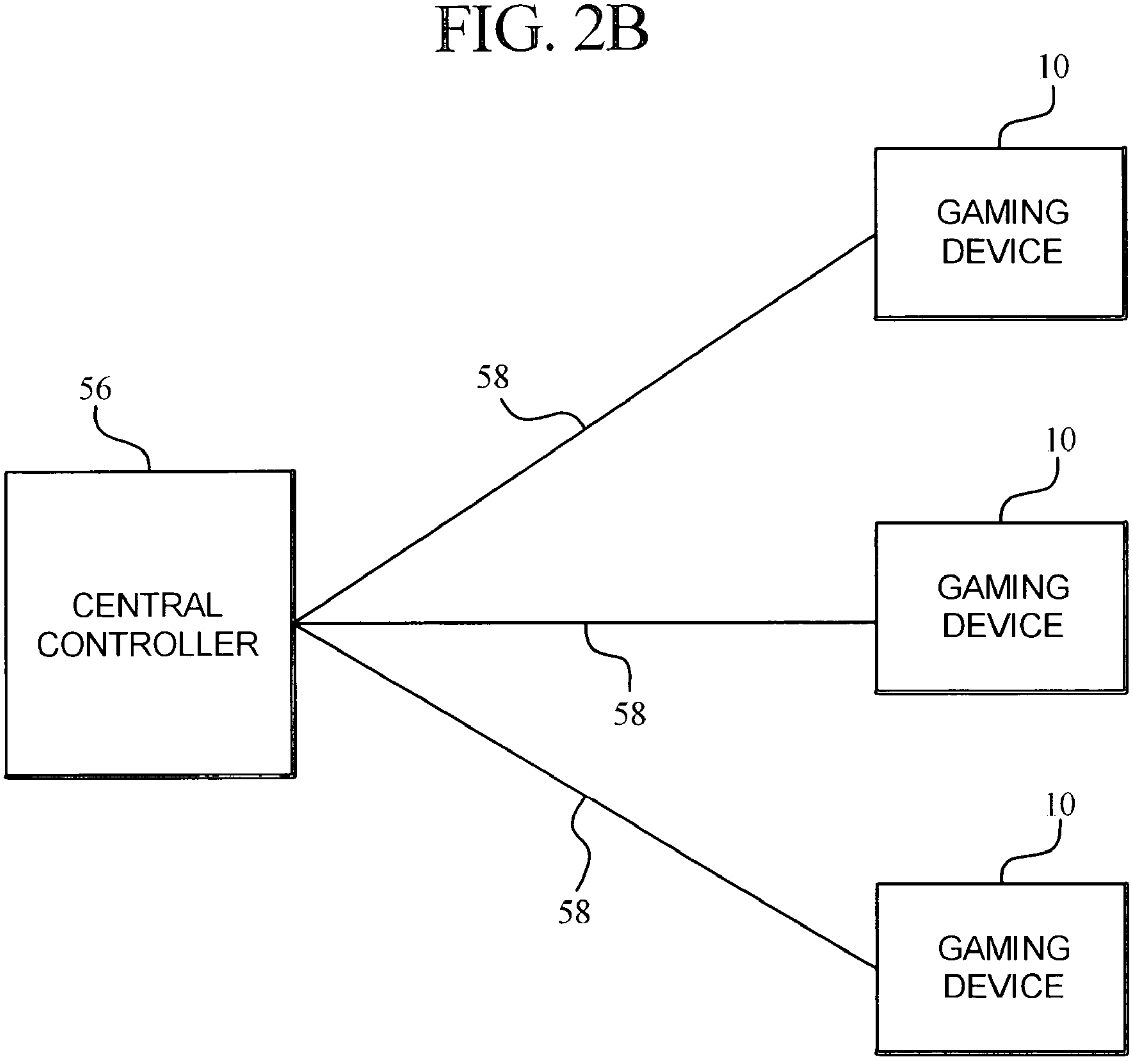

In one embodiment, as illustrated in FIG. 2B, one or more of the gaming devices 10 of the present invention may be connected to a data network or a remote communication link 58 with some or all of the functions of each gaming device provided at a central location such as a central server or central controller 56. More specifically, the processor of each gaming device may be designed to facilitate transmission of signals between the individual gaming device and the central server or controller.

In one embodiment, the game outcome provided to the player is determined by a central server or controller and provided to the player at the gaming device of the present invention. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such a free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and/or preventing cheating or electronic or other errors, reducing or eliminating win-loss volatility and the like.

In another embodiment, one or more of the gaming devices of the present invention are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or an on-line accounting and gaming information system operably coupled to the central server or controller. The accounting and gaming information system of this embodiment includes a player database for storing player profiles, a player tracking module for tracking players and a credit system for providing automated casino transactions.

A plurality of the gaming devices of the present invention are capable of being connected to a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system of the present invention may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server or webserver) through a conventional phone or other data transmission line, digital signal line (DSL), T-1 line, coaxial cable, fiber optic cable, wireless gateway or other suitable connection. In this embodiment, players may access an internet game page from any location where an internet connection and computer, or other internet facilitator are available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications according to the present invention, particularly if such communications are encrypted. Higher data transmission speeds may be useful for enhancing the sophistication and response of the display and interaction with the player.

In another embodiment, a plurality of gaming devices at one or more gaming sites may be networked to a central server in a progressive configuration, as known in the art, wherein a portion of each wager to initiate a primary game may be allocated to bonus or secondary event awards. In one embodiment, a host site computer is coupled to a plurality of the central servers at a variety of mutually remote gaming sites for providing a multi-site linked progressive automated gaming system. In one embodiment, a host site computer may serve gaming devices distributed throughout a number of properties at different geographical locations including, for example, different locations within a city or different cities within a state.

In one embodiment, the host site computer is maintained for the overall operation and control of the system. In this embodiment, a host site computer oversees the entire progressive gaming system and is the master for computing all progressive jackpots. All participating gaming sites report to, and receive information from, the host site computer. Each central server computer is responsible for all data communication between the gaming device hardware and software and the host site computer.

The gaming device can incorporate any suitable wagering primary game. The gaming machine or device of the present invention may include some or all of the features of conventional gaming machines or devices. The primary game may comprise any suitable reel-type game, card game, number game or other game of chance susceptible to representation in an electronic or electromechanical form which produces a random outcome based on probability data upon activation of the game from a wager made by the player. The primary game can also involve a risk, skill, or knowledge based event. That is, different primary wagering games, such as video poker games, video blackjack games, video keno, video bingo or any other suitable primary game may be implemented into the present invention. It should be appreciated that regardless of which primary game is utilized, the gaming device of the present invention enables the player to play a simultaneous secondary game.

In one embodiment, as illustrated in FIG. 1A, a primary game may be a slot game with one or more paylines 52. The paylines may be horizontal, vertical, circular, diagonal, angled or any combination thereof. In this embodiment, the gaming device displays at least one reel and preferably a plurality of reels 54, such as three to five reels, in either electromechanical form with mechanical rotating reels or in video form with simulated reels and movement thereof. In one embodiment, an electromechanical slot machine includes a plurality of adjacent, rotatable wheels which may be combined and operably coupled with an electronic display of any suitable type. In another embodiment, if the reels are in video form, the plurality of simulated video reels are displayed on one or more of the display devices as described above. Each reel displays a plurality of indicia such as bells, hearts, fruits, numbers, letters, bars or other images which preferably correspond to a theme associated with the gaming device. In this embodiment, the gaming device awards prizes when the reels of the primary game stop spinning if specified types and/or configurations of indicia or symbols occur on an active pay line or otherwise occur in a winning combination or pattern.

In another embodiment, a primary game may be a poker game wherein the gaming device enables the player to play a conventional game of video poker and initially deals five cards, all face up, from a virtual deck of fifty-two cards. Cards may be dealt as in a traditional game of cards or in the case of the gaming device, the cards may be randomly selected from a predetermined number of cards. If the player wishes to draw, the player selects the cards to hold by using one or more input devices, such as pressing related hold buttons or touching a corresponding area on a touch-screen. After the player presses the deal button, the processor of the gaming device removes the unwanted or discarded cards from the display and deals replacement cards from the remaining cards in the deck. This results in a final five-card hand. The processor of the gaming device compares the final five-card hand to a payout table which utilizes conventional poker hand rankings to determine the winning hands. Award based on a winning hand and the credits wagered is provided to the player.

In another embodiment, the primary game may be a multi-hand version of video poker. In this embodiment, the player is dealt at least two hands of cards. In one such embodiment, the cards in all of the dealt hands are the same cards. In one embodiment each hand of cards is associated with its own deck of cards. The player chooses the cards to hold in a primary hand. The held cards in the primary hand are also held in the other hands of cards. The remaining non-held cards are removed from each displayed hand and replaced with randomly dealt cards. Since the replacement cards are randomly dealt independently for each hand, the replacement cards will usually be different for each hand. The poker hand rankings are determined hand by hand and awards are provided to the player.

In one embodiment, a primary game may be a keno game wherein the gaming device displays a plurality of selectable indicia or numbers on at least one of the display devices. In this embodiment, the player selects at least one and preferably a plurality of the selectable indicia or numbers by using an input device or by using the touch-screen. The gaming device displays a series of drawn numbers to determine an amount of matches, if any, between the player's selected numbers and the gaming device's drawn numbers. The player is provided an award, if any, based on the amount of determined matches.

In another embodiment, as seen in FIG. 1B, the primary game may be a conventional game of blackjack or 21 game where the gaming device 10 displays a dealer's hand 21 and a player's hand 23 for a primary game. The gaming device also displays the player's secondary hand 25 used in a secondary game. Alternatively, the secondary game and the player's secondary hand could be displayed on a second display device 18. In one embodiment, the player decides to place a primary wager on the primary game with the bet input button 36, and optionally place a secondary game wager with the bet input button 36. In another embodiment, the player can place a bet using a touch screen. The player decides whether to hit or stand against the dealer's hand according the strategy of the game. In one embodiment, the player is provided a primary game award, if any, based on the results of the blackjack hand in the primary game. The player is also provided with a secondary game element, if any, based on the results from the primary game, and the gaming element appears in the player's secondary hand.

In another embodiment, as seen in FIGS. 1C, 1D and 1E, the primary game may be a conventional game of blackjack or 21 played at a live gaming table 68, on a playing surface 69, with a human dealer. The gaming table generally includes a chip tray 70 for holding several stacks of the dealer's chips. The dealer uses chips from the chip tray 70 to pay out winning hands or collect chips from players when they have lost. For each of a plurality of playing areas 72*a* to 72*e*, there is a primary game wagering area 74 and a secondary game wagering area 76 (best seen in FIG. 1E). In one embodiment, prior to the initiation of the round of blackjack, each player places his or her wager substantially within the primary game and secondary game wagering areas 74, 76. In another embodiment, the players may place the secondary game wagers at a later time. Generally, as seen in FIG. 1E, the secondary game wager 78 will be smaller than the primary game wager 80. However, in other embodiments, the secondary game wager 78 may be equal or larger than the primary game wager 80. As seen in FIG. 1C, the gaming table includes a plurality of display devices 82*a* to 82*e*, one for each of the players. In one embodiment, the display devices are used for displaying a plurality of secondary game cards 84 that may have been accumulated by each player over the course of several rounds of the primary blackjack game. In a further embodiment, the gaming table 68 may include another display device 86 that displays a progressive award 88. The progressive award 88 may be determined by the play of just one particular round of blackjack, it may be determined by several rounds of blackjack, or it may be determined by contributions from different gaming tables 68 throughout the gaming establishment, each gaming table 68 linked through a network.

It should also be appreciated that in addition to the secondary game of the present invention, the gaming device may employ one or more other bonus games in a conventional manner.

Figure 3A:
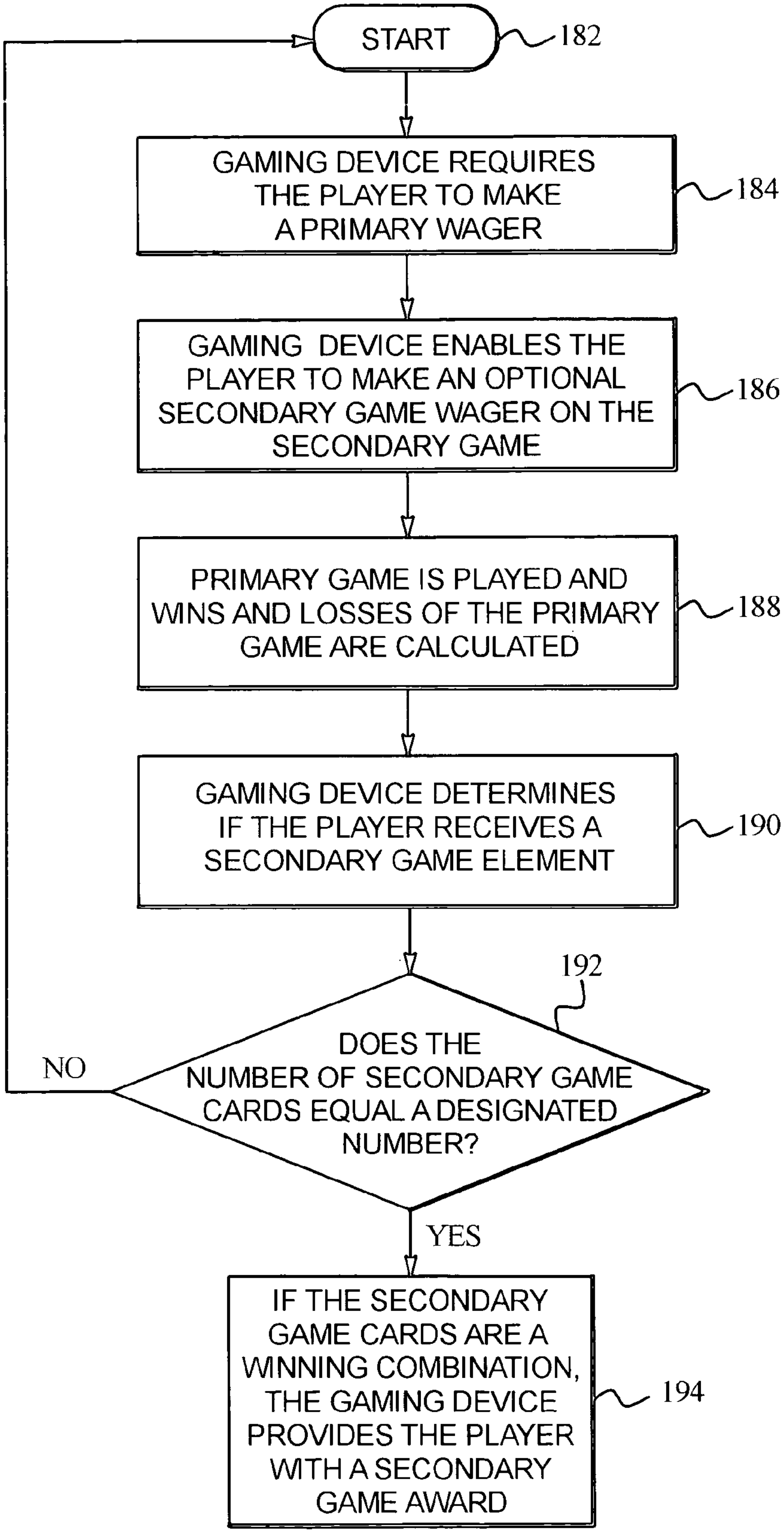
FIG. 3A is a flow diagram of the operation of one embodiment of the present invention.

Gaming Device Having Secondary Game Played in Parallel with Sequence of Plays of Primary Games The operation of one embodiment of the present invention is generally illustrated in FIGS. 3A, 3B, 3C, 4, 5 and 6. FIG. 3A includes a general overview of the operation of one embodiment of the gaming device. The gaming device initiates the primary game as indicated in step 182. The gaming device requires each player to make a wager on the primary game, as indicated by block 184. The gaming device also enables each player to make an optional secondary game wager on the secondary game as indicated in block 186. The primary game is played and the gaming device determines whether each player has won or lost as indicated in block 188. For each player the gaming device determines whether the player receives a secondary game element to be used in the secondary game, as indicated in block 190. The processor determines whether the number of accumulated secondary elements is equal to a designated number of elements as indicated by decision diamond 192. If one or more players have accumulated the designated number of secondary game elements, the gaming device determines whether or not the secondary game elements or cards form a winning combination, and provides a secondary game award 194, if any, to the player or players.

Figure 3B:
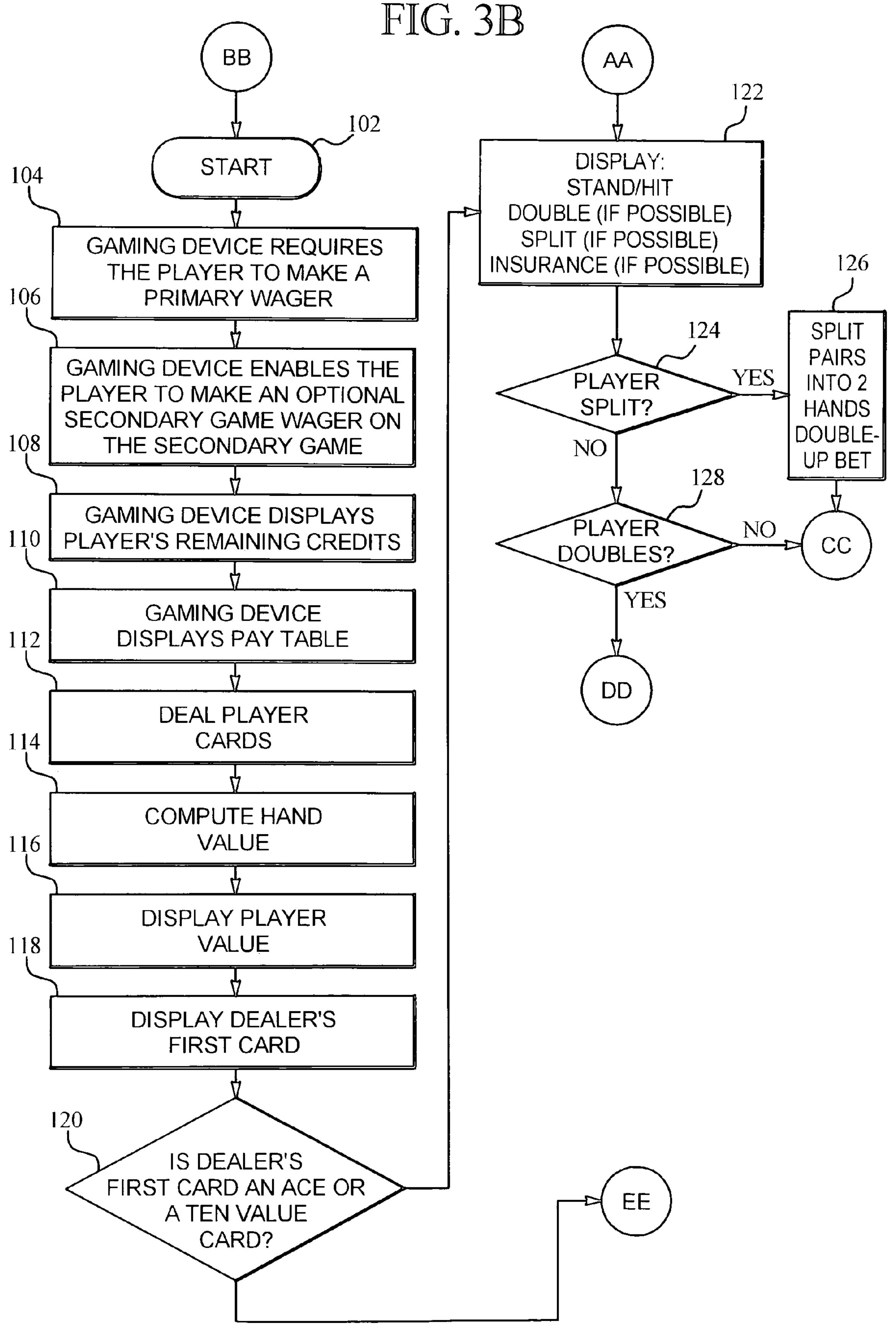
FIG. 3B is a partial flow diagram of the operation of one embodiment of the present invention where the primary game is blackjack.

Referring to FIG. 3B, in one embodiment, the primary game is a blackjack game. The game starts as indicated in step 102, and the gaming device requires each player to make a primary wager on the primary game as indicated in block 104. The primary wager must be equal to or exceed the minimum primary wager amount and must not exceed the maximum wager amount. These amounts are set by an operator or the house rules and may be any suitable amounts. It should be appreciated that the primary game wagers made by each player can be equal or different for each subsequent play of the primary game.

The gaming device also enables each player to make an optional secondary game wager on the secondary game as indicated in block 106. The gaming device displays each player's remaining credits or balance as indicated in block 108. The gaming device may also display the pay table for the primary game as indicted by block 110.

The gaming device deals the cards in a conventional manner which may include displaying each player's two initial cards face up as indicated by block 112, and the dealer two cards are initially dealt with only one card face up. The two-card value of each player's hand is computed as indicated in block 114. The gaming device displays the value of each player's hand and the dealer's up-card as indicated in blocks 116 and 118 (see also, FIG. 7D).

If the dealer's revealed card or face up card is an ace or a ten value card 120, there is a possibility that the dealer has blackjack, in which case the primary game would end without the player drawing any cards. In this embodiment, an immediate determination of whether the dealer has blackjack may be required. If the dealer's face up card is not an ace or a ten value card the primary game can continue. In a different embodiment, each player may hit before the dealer's down-card is revealed. The gaming device activates and displays the stand button 212, the hit button 214, the double down button 216 (if doubling is allowed for that situation under house rules), and the split button 218 (if splitting is allowed for that situation under house rules) as indicated in block 122. If pairs of the same value cards are dealt in a player's hand in the primary game, the split button 218 becomes active and the player can choose to split the pairs as indicated in decision diamond 124. If the pair of cards is split, the wager is doubled and the player plays out each hand according to normal rules, as shown in block 126. Under certain house rules, if the split pair is a pair of Aces the bet is doubled and the player receives only one additional card for each new hand. Moreover, under certain house rules split pairs may be subsequently re-split or doubled own a number of times.

Continuing with FIG. 3B, if splitting is not an option or if the player decides not to split the pair, the player must choose whether or not to double down, if possible, as indicated by decision diamond 128. Also, at this time the player decides whether to take insurance or surrender (not shown) based upon the controlling house rules of blackjack.

Figure 3C:
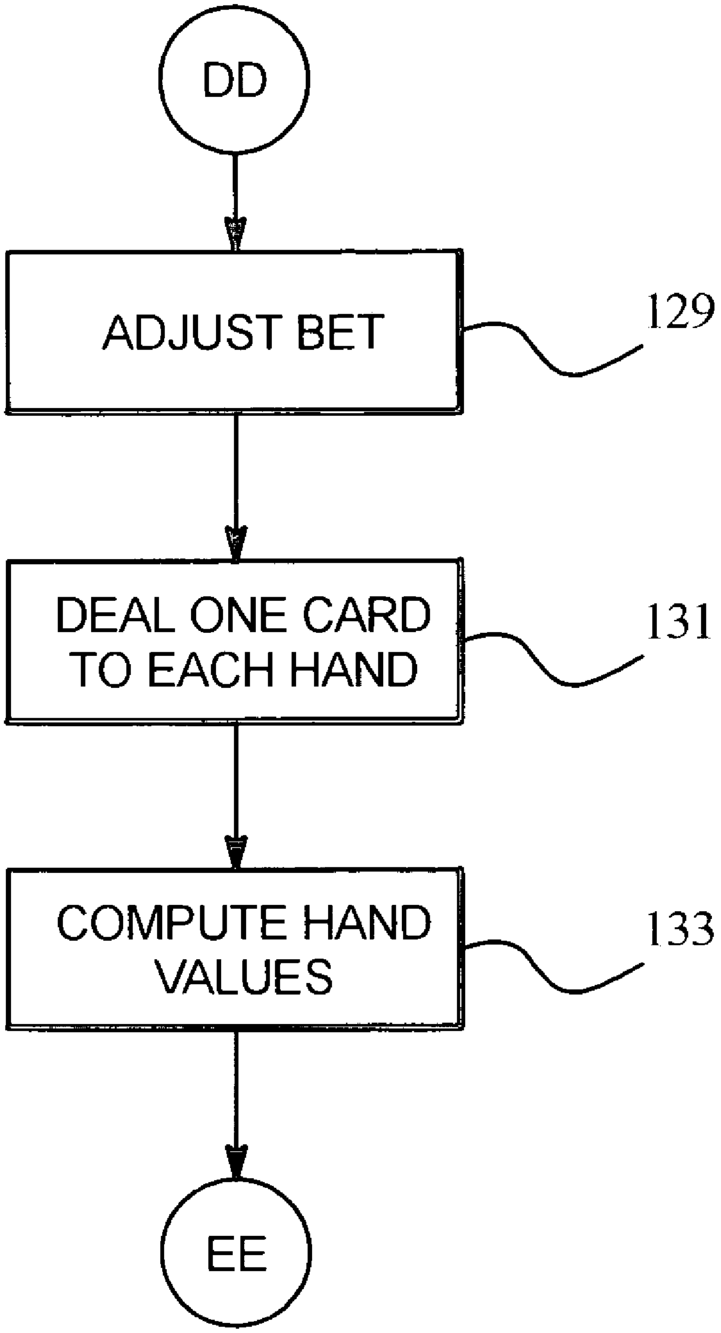
FIG. 3C is a partial flow diagram of the operation of one embodiment of the present invention where the primary game is blackjack.

As seen in FIG. 3C, after the player has chosen to double down, the bet is adjusted as indicated in block 129. In such case, one and only one card is dealt to the player's hands as indicated in block 131. The value of each hand is computed as indicated by block 133.

Figure 4:
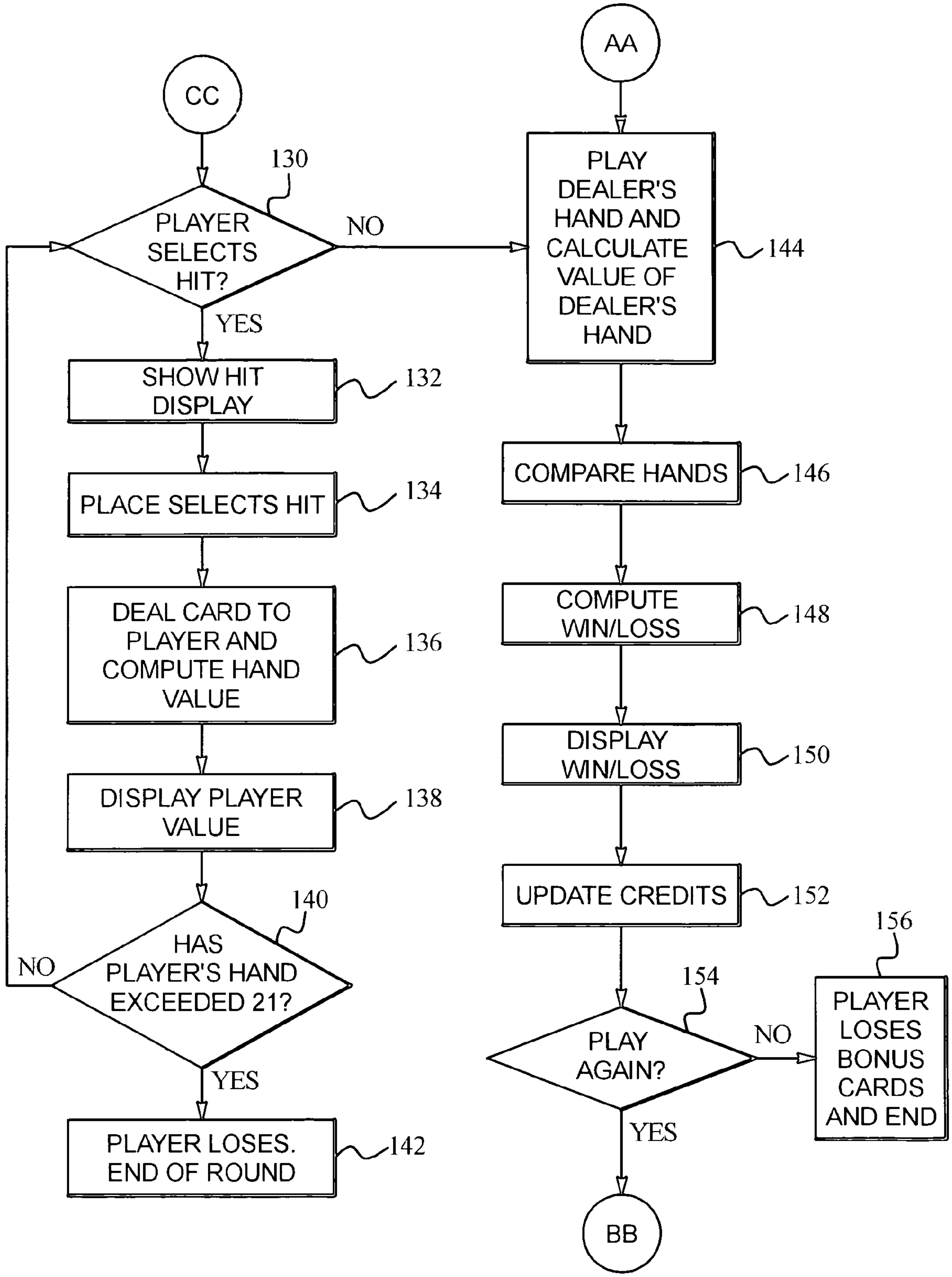
FIG. 4 is a partial flow diagram of the operation of one embodiment of the present invention where the primary game is blackjack.

As shown in FIG. 4, and continued from FIG. 3B, if the player has not chosen to split or double down, the player may take a hit as indicated in block 130. The hit button is displayed and becomes active as indicated in block 132. The player may take a hit as indicated by block 134 and then the gaming device deals a card to the player and computes the value of the player's hand as indicated by block 136. The value of the player's hand is displayed by the display device as indicated by block 138. The processor determines if the player's hand has exceeded twenty-one as indicated by decision diamond 140. If a player's hand exceeds twenty-one, the player has busted and loses at least the primary game wager, and the primary game ends 142. If the player has not exceeded twenty-one, the player may hit again as indicated by decision diamond 130.

Figure 7A:
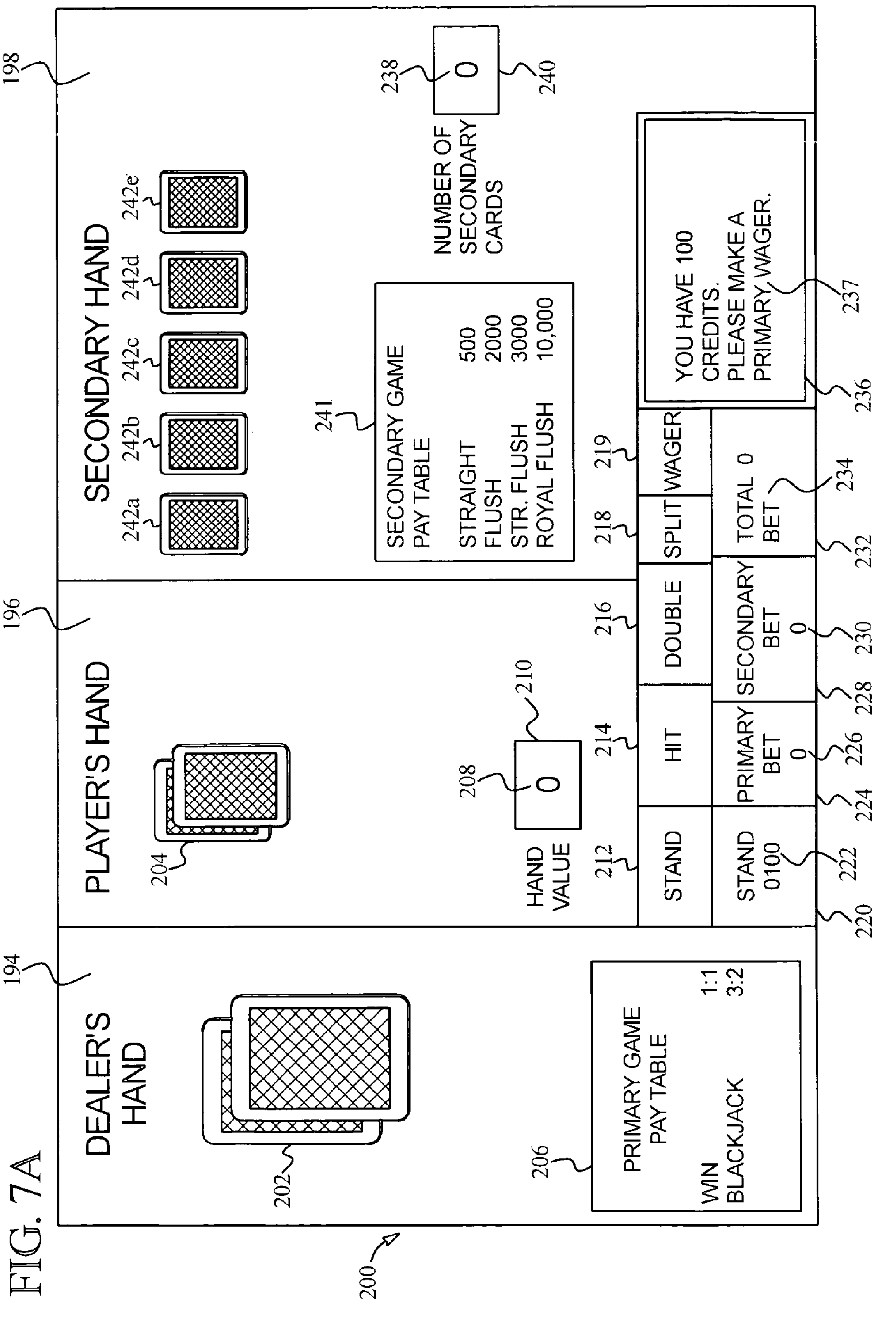
FIGS. 7A, 7B, 7C, 7D, 7E and 7F are illustrations of screen displays for a first round of the primary game, where the player achieves a secondary game card.

Continuing with FIG. 4, if the player has not exceeded twenty-one and has chosen to stand as indicated by block 130, the dealer's hand is played out according to traditional blackjack rules or the controlling house rules as indicated by block 144. The processor compares the value of the dealer's hand to the value of the player's hand as indicated by block 146 and determines whether the player has won or lost the primary game as indicated by block 148. The win or loss is displayed by the display device as indicated in block 150 (see also, FIG. 7F). If the player has won or pushed on the primary game wager, the credits are updated according to the pay table 206 (see FIG. 7A), as indicated by block 152. If the player chooses to play again, any secondary game cards accumulated by the player will be retained in memory for use in subsequent rounds or plays of the primary game. In this embodiment, if the player chooses to leave the table, or temporarily quit playing, the player loses all secondary game cards as indicated by block 156.

Figure 5:
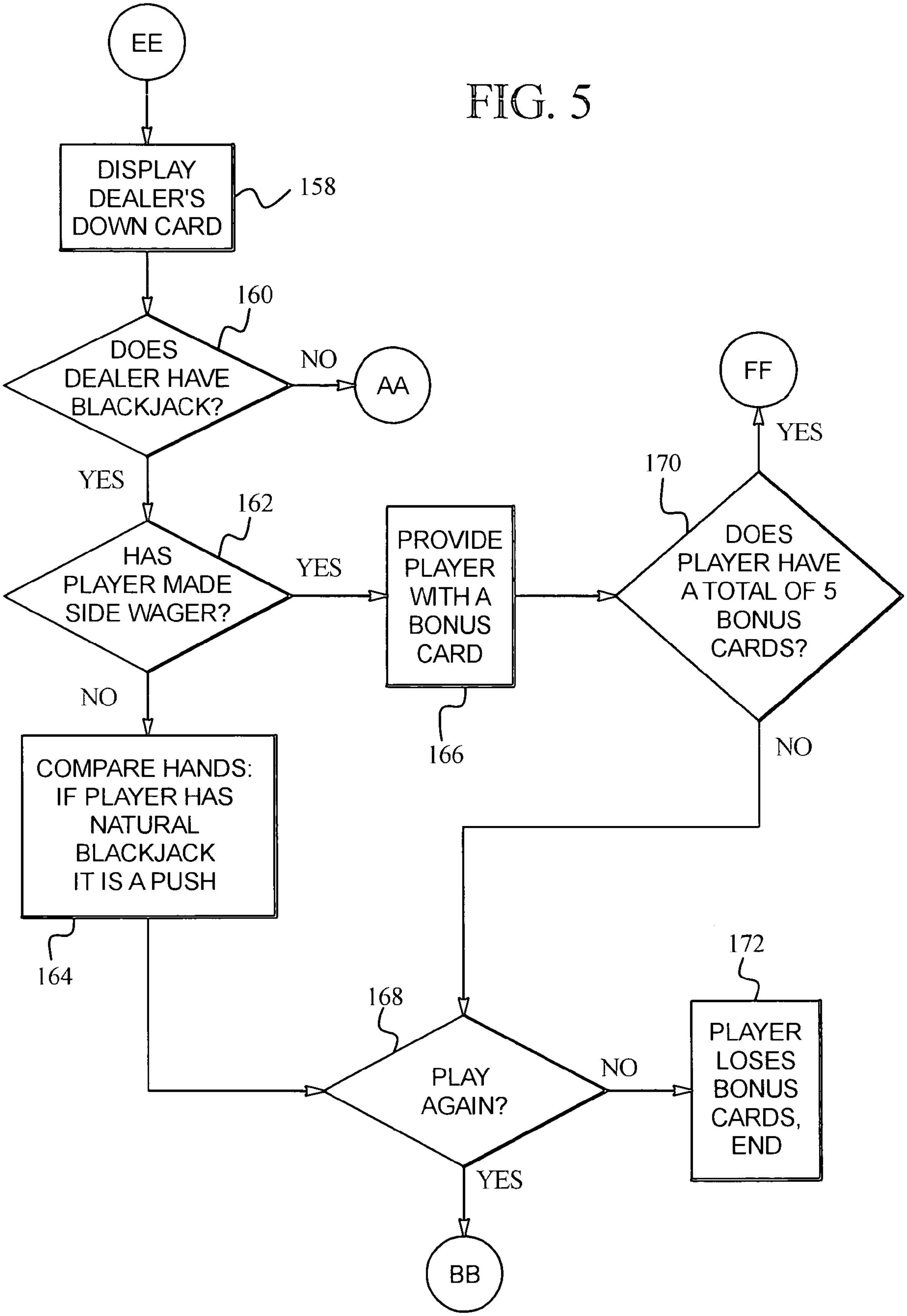
FIG. 5 is a partial flow diagram of the operation of one embodiment of the present invention where the primary game is blackjack.

Referring to FIG. 5 and continuing from FIG. 3B, the dealer's face up card was an ace or a ten value card and a determination must be made as to whether the dealer has blackjack. The gaming device identifies the dealer's down card as indicated by block 158 and determines if the dealer has a blackjack as indicated by block 160. If the dealer does not have a blackjack, the gaming device plays out the dealer's hand according to FIG. 4 and as described above. If the dealer has a blackjack the gaming device reveals the dealer's hand and then for each player the gaming device determines whether the player made a secondary game wager as indicated by decision diamond 162. If the player had made a secondary game wager, the gaming device provides the player with a secondary game card as indicated by block 166 and adds the secondary game card to the secondary hand (see also, FIG. 7F). The gaming device determines whether the player has less than a designated number of secondary game cards, as indicated by decision diamond 170. If the player has less than the designated number of secondary bonus cards, the player must decide whether to wager another round of the primary game as indicated by decision diamond 168. In this embodiment, if the player chooses not to wager on another round of the primary game, the player loses all of the secondary game cards and the secondary game ends as indicated by block 172. If the player chooses to wager on another round of the primary game, the gaming device begins another play of the primary game as indicated in step 102 (as seen in FIG. 3B). Also, if the player chooses to play another round of the primary game, the gaming device retains all secondary game cards to be used in subsequent rounds.

Figure 6:
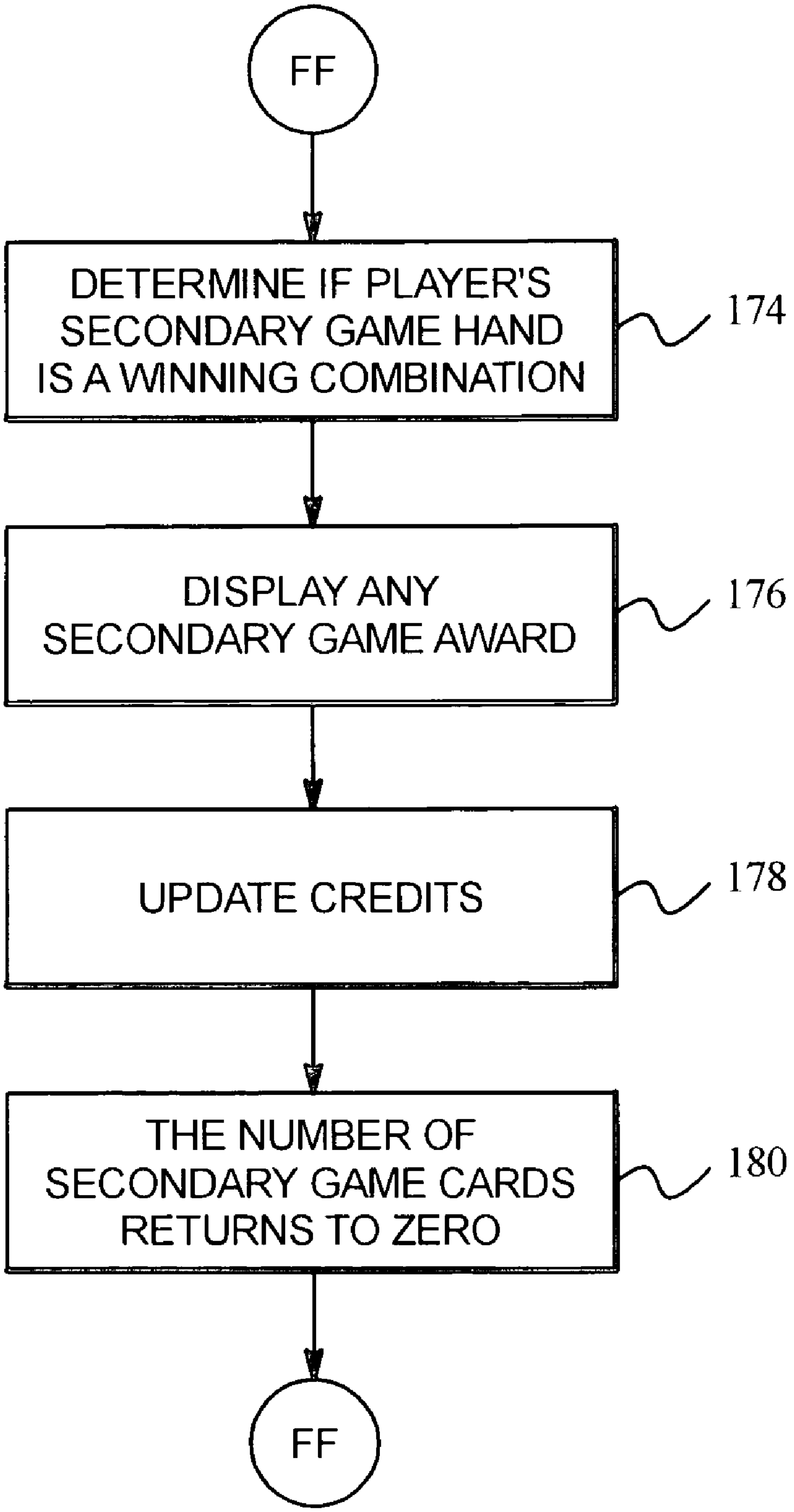
FIG. 6 is a partial flow diagram of the operation of one embodiment of the present invention where the primary game is blackjack.

In one embodiment, for each player the goal of the secondary game is to accumulate a total of five secondary game cards in an attempt to make a winning poker hand. It should be appreciated that the number accumulated secondary game elements may vary. Referring now to FIG. 6, if a player has collected his or her fifth secondary game card, the gaming device determines whether or not the player's secondary game hand is a winning combination of cards as indicated by block 174. In one embodiment, the winning combination of cards is a high ranking poker hand, such as a straight, a flush, a full house, four of a kind, two pair, a straight flush, or a royal straight flush. The gaming device displays any secondary game award associated with the player's secondary game hand as indicated by block 176. The gaming device updates the player's credits as indicated by block 178. In one embodiment, the value of the jackpot award would be larger with a higher ranking poker hand such as a royal flush. After the player's credits have been updated, the number of secondary game cards returns to zero as indicated by block 180 and the play starts over as indicated in step 102 (see FIG. 3B).

FIGS. 7A to 7F, FIGS. 8A to 8D and FIGS. 9A to 9D illustrate an example of a play of a secondary poker game over a sequence of rounds or plays of the primary blackjack game that is played at a gaming cabinet. This example play of the secondary poker game results in the player being awarded a large award for a successful combination of cards. This example of the present invention is configured on a conventional type gaming machine for illustrative purposes.

More specifically, the display 200 has three main display areas, a dealer's hand display 194, a player's primary hand display 196, and a player's secondary hand display 198. The display 200 displays an area for or card positions for a dealer blackjack hand 202, an area for or card positions for a player blackjack hand 204, and an area for card positions 242*a* to 242*e* for a secondary poker game, with secondary game cards accumulated from plays of the primary blackjack game.

The gaming device displays a pay table 206 of the payouts of the primary blackjack game. The paytable includes a one to one payout for a win, three to two for a blackjack. It should be appreciated however, that the payouts may be any suitable ratio of the wager and may vary according to different house or operator rules. For example, if the house allows for liberal splitting and re-splitting, the payout for a blackjack may only be one to one in order to give the gambling establishment a slight advantage.

The display 200 (which includes a touch screen in this example) includes several player inputs or buttons which enable a player to enter decisions and several displays or meters which provide the player information about the player's credits and wagers. The inputs or buttons include the stand button 212, the hit button 214, the double button 216, and the split button 218 that become active when appropriate during the play of the primary game. The displays include the credit display 220, the primary game bet display 224, the secondary game bet display 228, the total bet display 232, message display 236, and number of secondary game cards display 240.

In this example, the player has deposited one-hundred credits and the gaming device displays the one-hundred credits 222 in the credit display 220. The number of secondary game cards 238 is zero as displayed in the secondary game cards display 240 because this is prior to the player's first hand of the primary blackjack game. The gaming device displays a message in the message display 236 that the player should place a wager on the primary blackjack game.

Figure 7B:
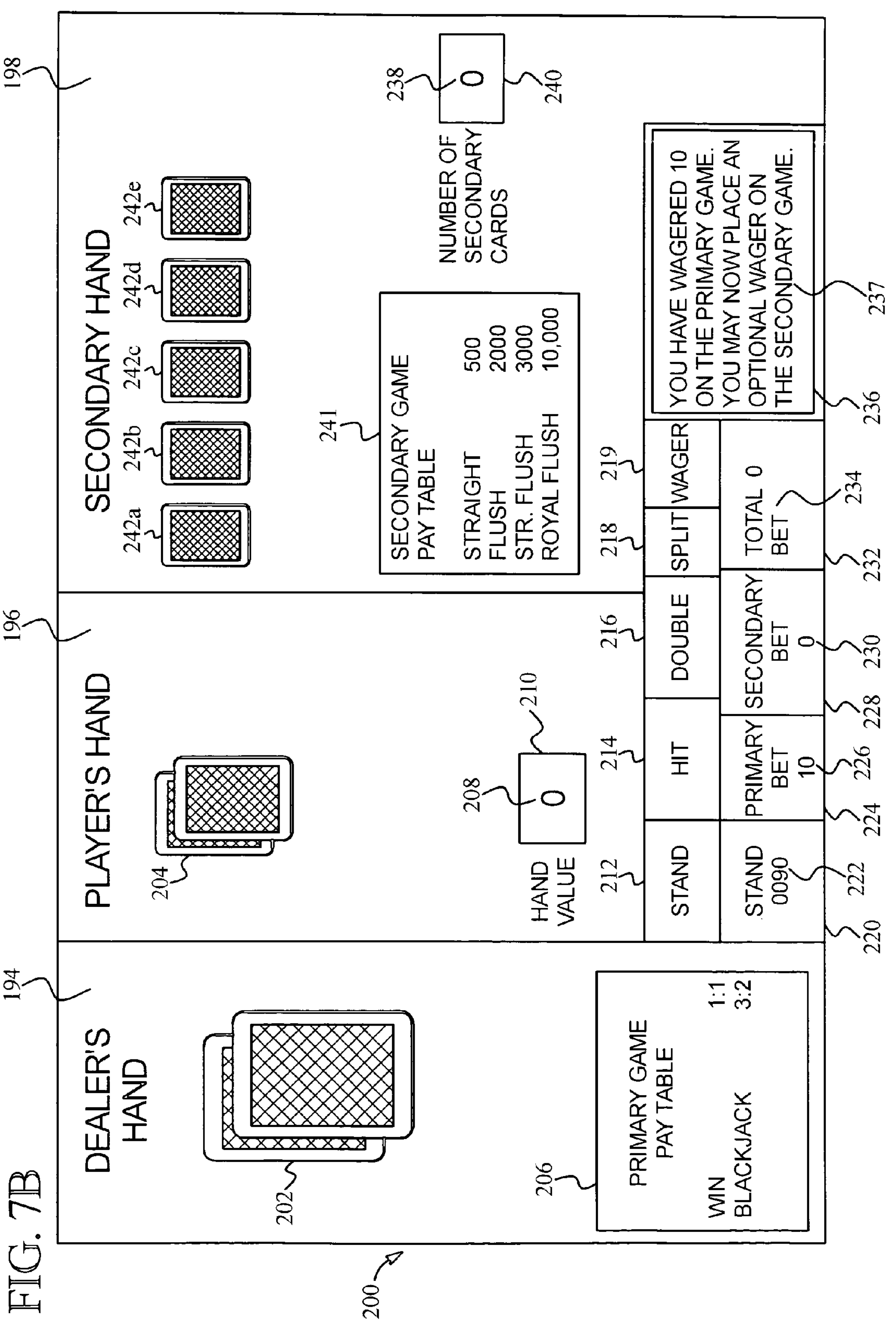

FIG. 7B illustrates that the player has made a wager of ten credits 226 as shown in the primary game bet display 224. The total bet 234 at this point is ten as shown in the total bet display 232 because the player has not made a wager on the secondary game. The number of credits 222 has been reduced to ninety as shown in the credits display 220. The gaming device displays a message to the player in the message display 236 that the player may place a wager on the secondary game.

Figure 7C:
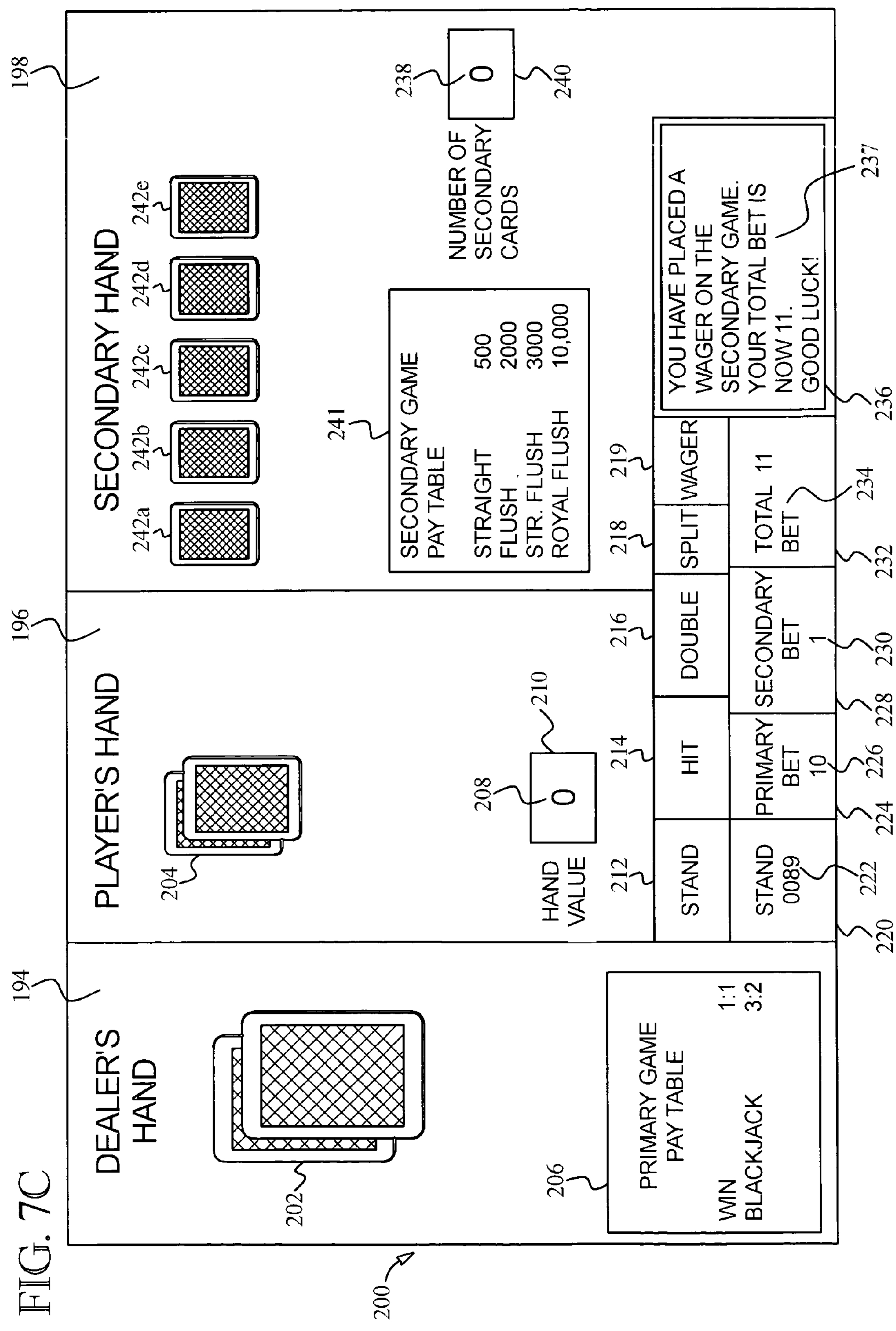

FIG. 7C illustrates that the player has made a secondary game wager 230 of one credit as indicated in the secondary game wager display 228. The number of credits 222 has been reduced to eighty-nine as indicated in the credits display 220. The total bet 234 is now eleven as indicated in the total bet display 232.

Figure 7D:
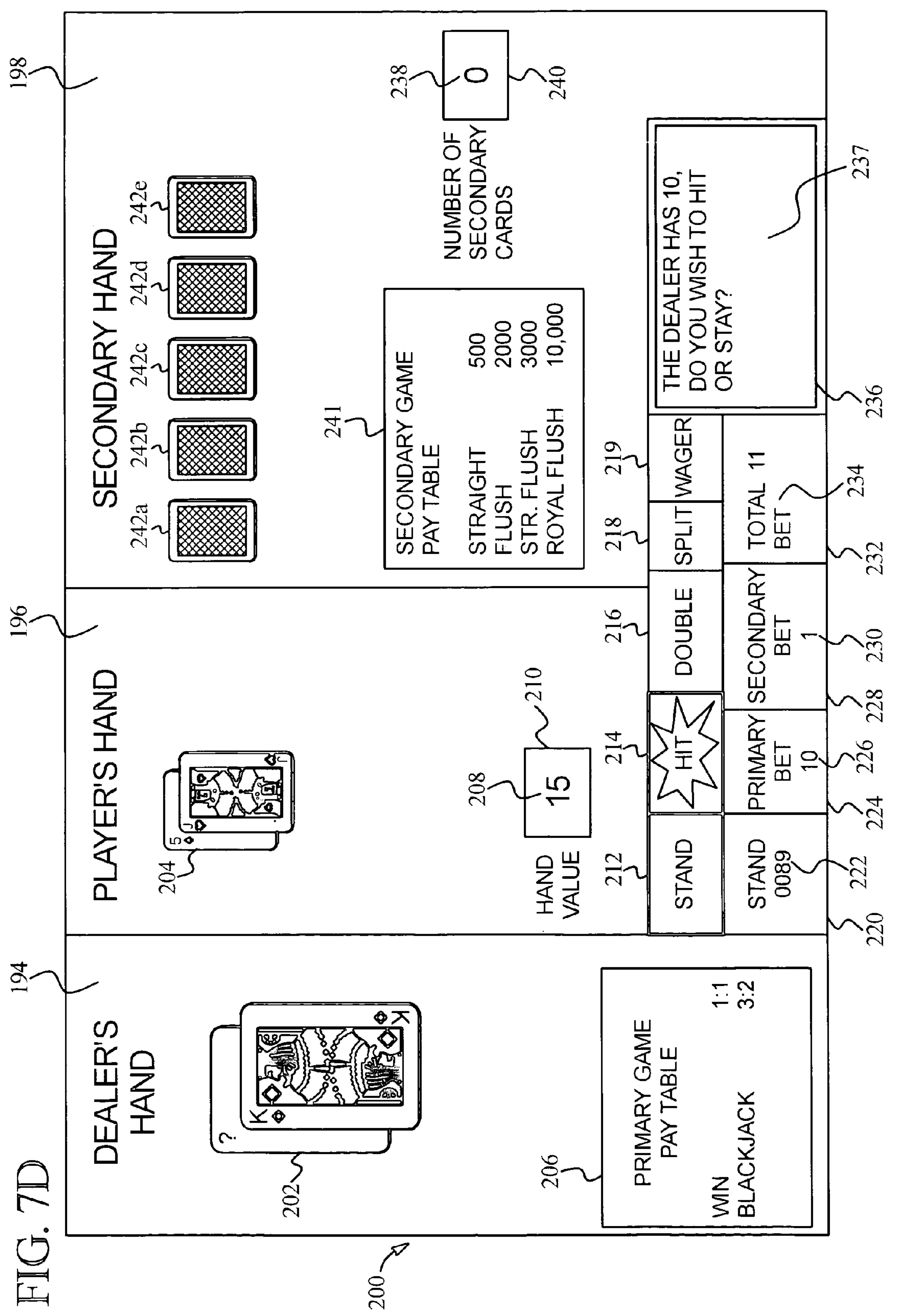

FIG. 7D illustrates that the player and the dealer have been dealt hands or initial cards. In this first example play of the primary game, the player hand 204 is dealt with both cards face up and includes a jack of hearts and a five of spades. The player's hand value 210 is fifteen as indicated in the hand value display 208. The dealer's hand 202 also has two cards including one of the cards dealt face down. The value of the dealer's up-card is displayed in the message display 236. Note that in this case, the dealer's up-card was the king of diamonds, which would normally require an immediate resolution as to whether or not the dealer has blackjack, as described above. However, in this particular example for illustrative purposes, the player is allowed to hit. The player's hand does not offer an opportunity to double or split and thus the double button 216 and the split button 218 remain inactive. The stand button 212 and the hit button 214 are activated as indicated by the highlighted buttons and in the instructions to the player in the message display 236. In this example, FIG. 7D illustrates that the player has elected to take a hit by selecting the hit button 214.

Figure 7E:
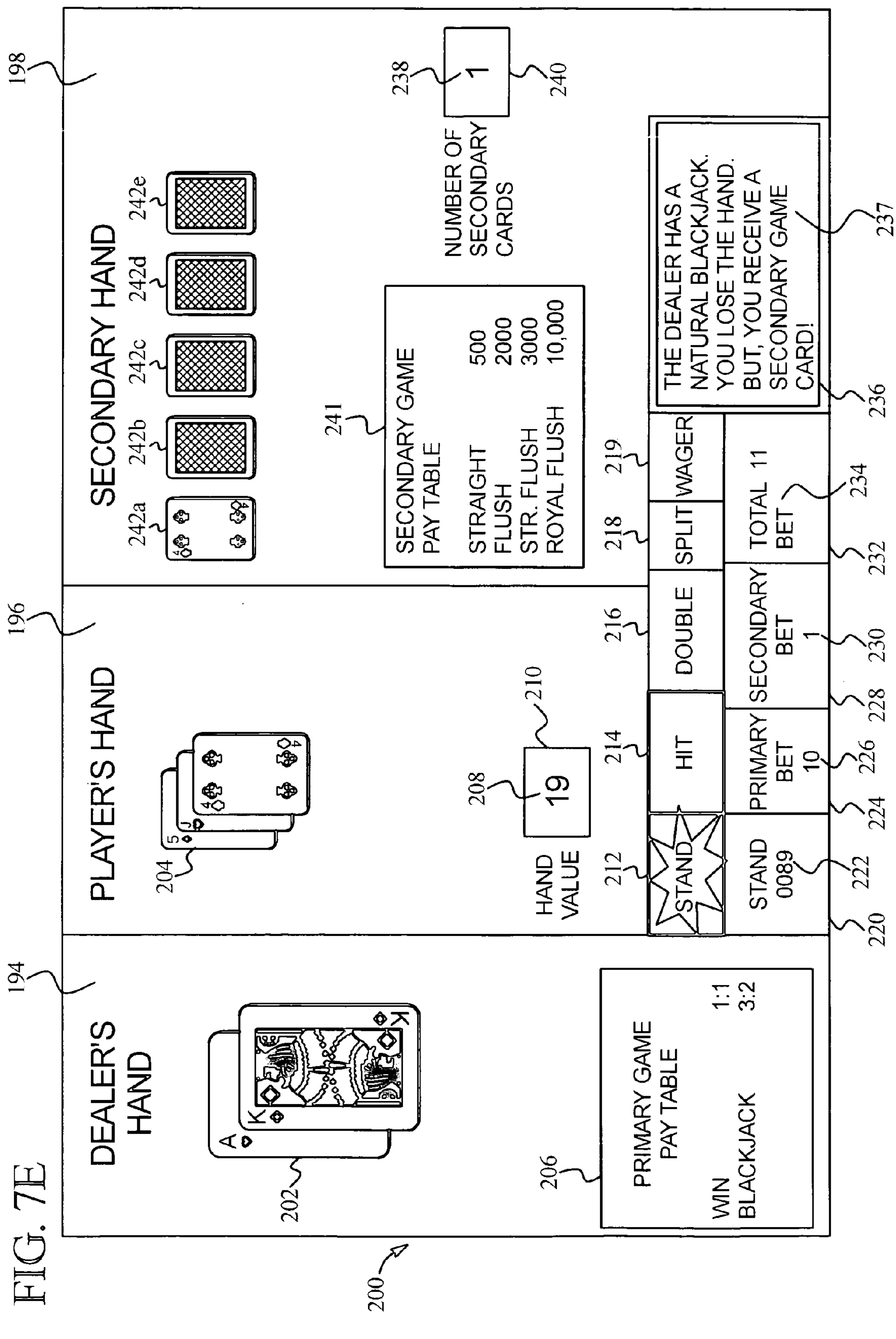

FIG. 7E illustrates that the player's hit card was a four of diamonds, bringing the player's total hand value 210 to nineteen as shown in the hand value display 208. The gaming device continues to provide the player the option of hitting again, as indicated by the still active hit button 214, since the player's hand value 210 is still less than twenty-one. This is indicated in the message display 236. In this example, the player chooses to stand by selecting the stand button 212. FIG. 7E also illustrates that the dealer's down card is revealed. The dealer's down card is an ace of hearts in this example which gives the dealer blackjack, as indicated by the dealer's hand 202 and in the message display 236. The player loses the primary game wager, but since the dealer won with a blackjack and the player made a secondary game wager 228, the gaming device provides the player with a secondary game card 242*a*. In this illustrated embodiment, the predetermined criteria or predetermined condition for obtaining a card in the secondary game is the dealer obtaining blackjack. It should be appreciated that the triggering condition can be any suitable triggering condition as discussed above and as further discussed below.

Upon occurrence of the triggering event, the processor of the gaming device selects the card to be used in the secondary game. In this illustrated example, the processor of the gaming device selects one of the cards from the player's primary game hand to be used in the secondary game. It should be appreciated that other methods could be used to select the cards for the secondary game as further above and discussed below.

Figure 7F:
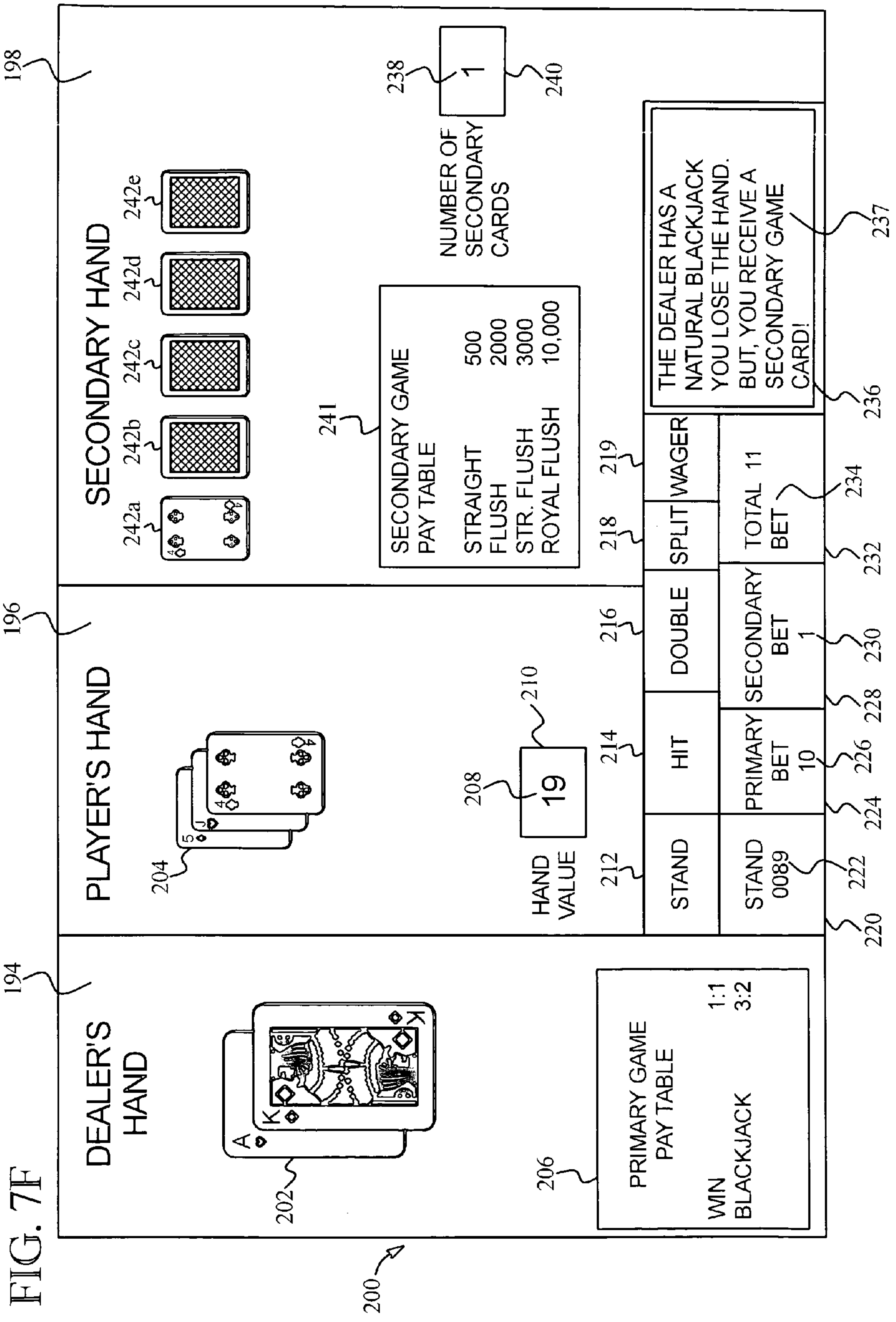

FIG. 7F illustrates that the secondary game card 242*a* is a four of clubs. The number of secondary game cards 238 is one as indicated in the number of secondary game cards display 240. The negative player experience of losing the primary game to the dealer, especially when the dealer gets a blackjack, is at least partially offset by the positive occurrence of receiving a secondary game card. This card may bring the player closer to achieving a possible winning outcome in the secondary game.

Figure 8A:
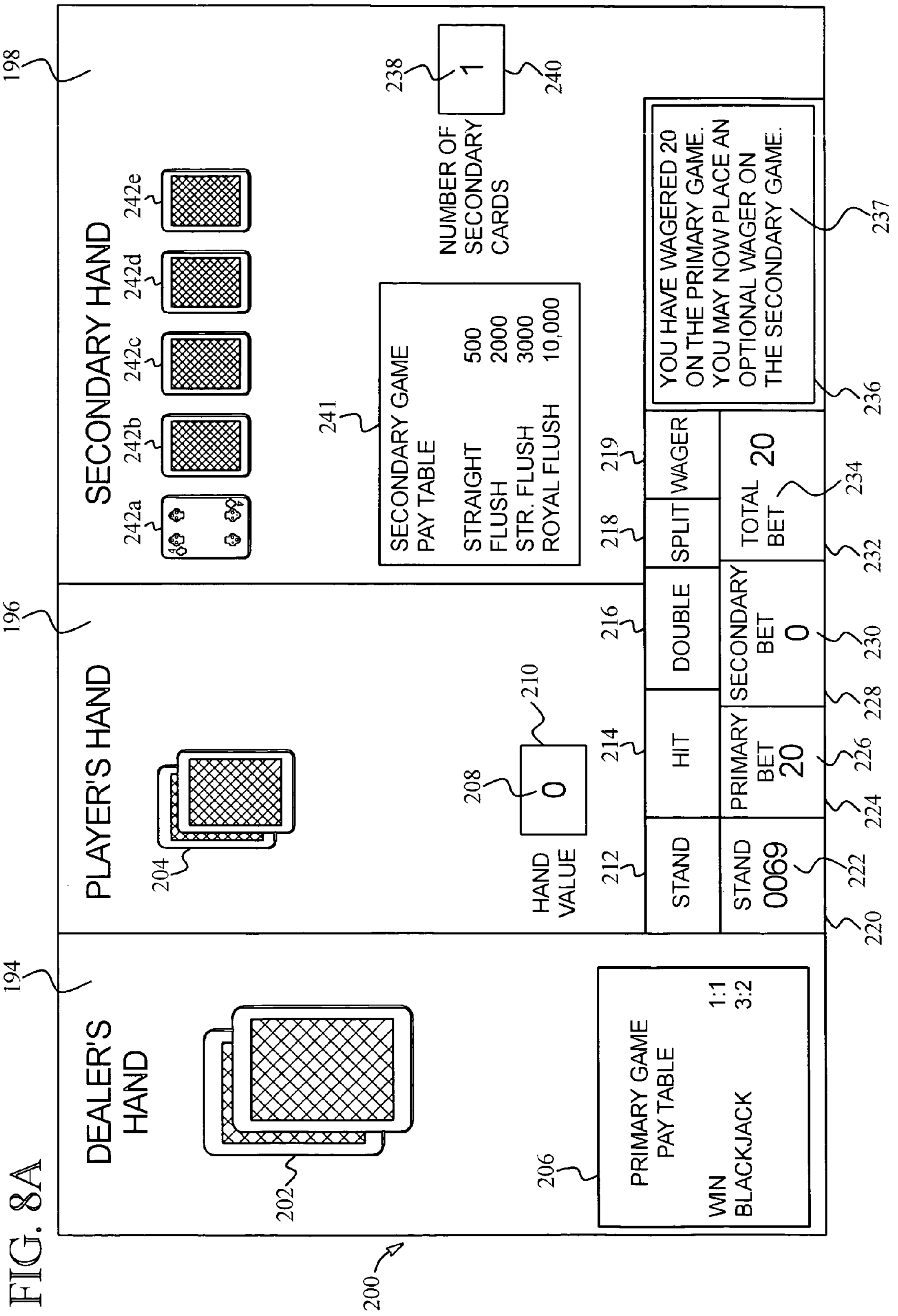
FIGS. 8A, 8B, 8C and 8D are illustrations of screen displays for a second round of the primary game, where the player achieves a second secondary game card.

FIG. 8A illustrates the beginning of another round or play of the primary game. The four of clubs obtained in the previous play of the primary game for the play of the secondary game is displayed in the secondary hand display. In this example second play of the primary game, the player has made a larger wager of twenty as shown in the primary game bet display 224. The gaming device displays the sixty-nine credits 222 in the credit display 220. The total bet 234 is twenty shown in the total bet display 232 because the player has not yet made a secondary game wager. The gaming device displays a message to the player in the message display 236 that the player now has the option of placing a secondary game wager.

Figure 8B:
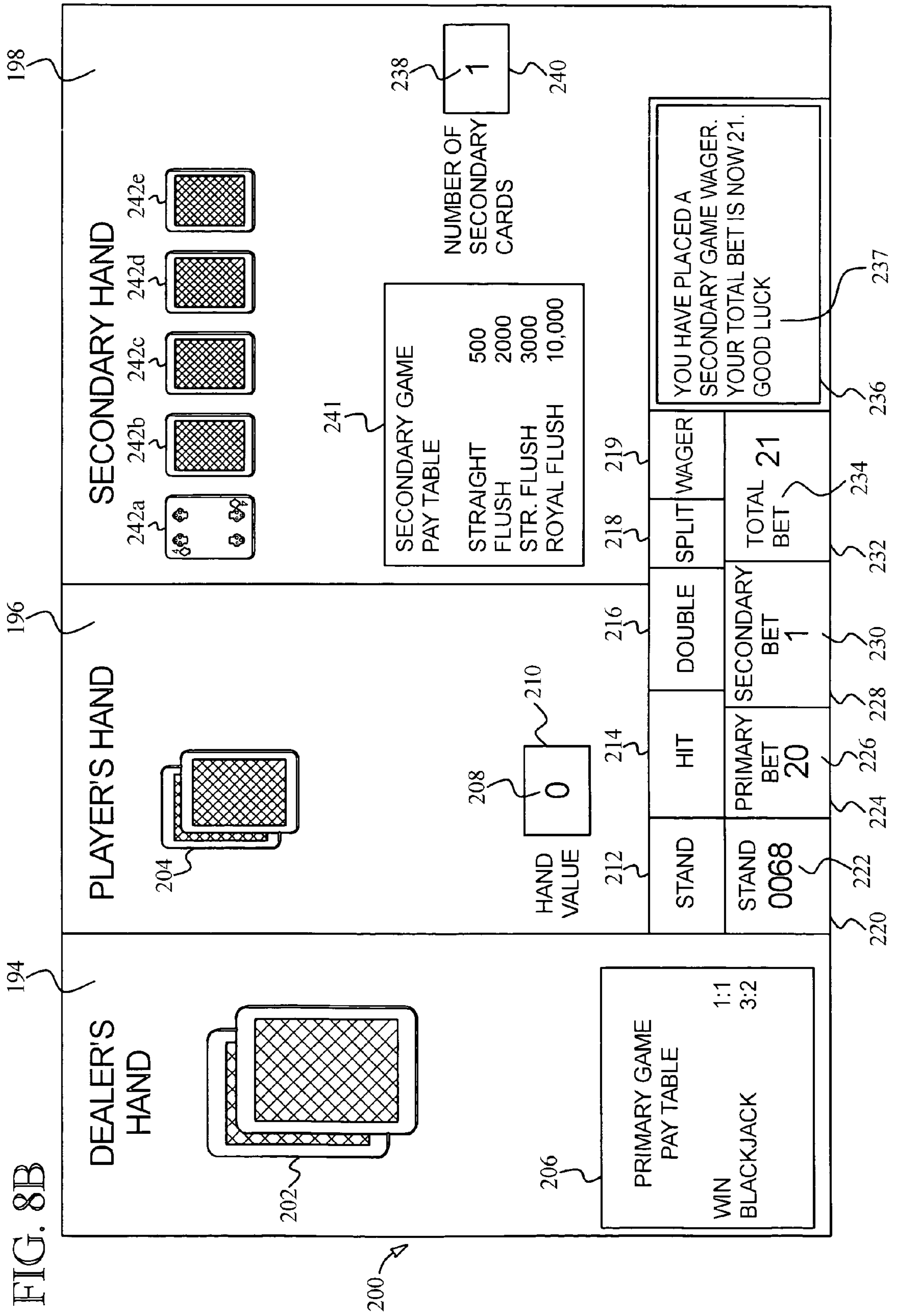

FIG. 8B illustrates that the player has made a secondary game wager 230 of one as indicated in the secondary game wager display 228. The number of remaining credits 222 is reduced to sixty-eight as indicated in the credits display 220. The total bet 234 is increased to twenty-one as indicated in the total bet display 232.

Figure 8C:
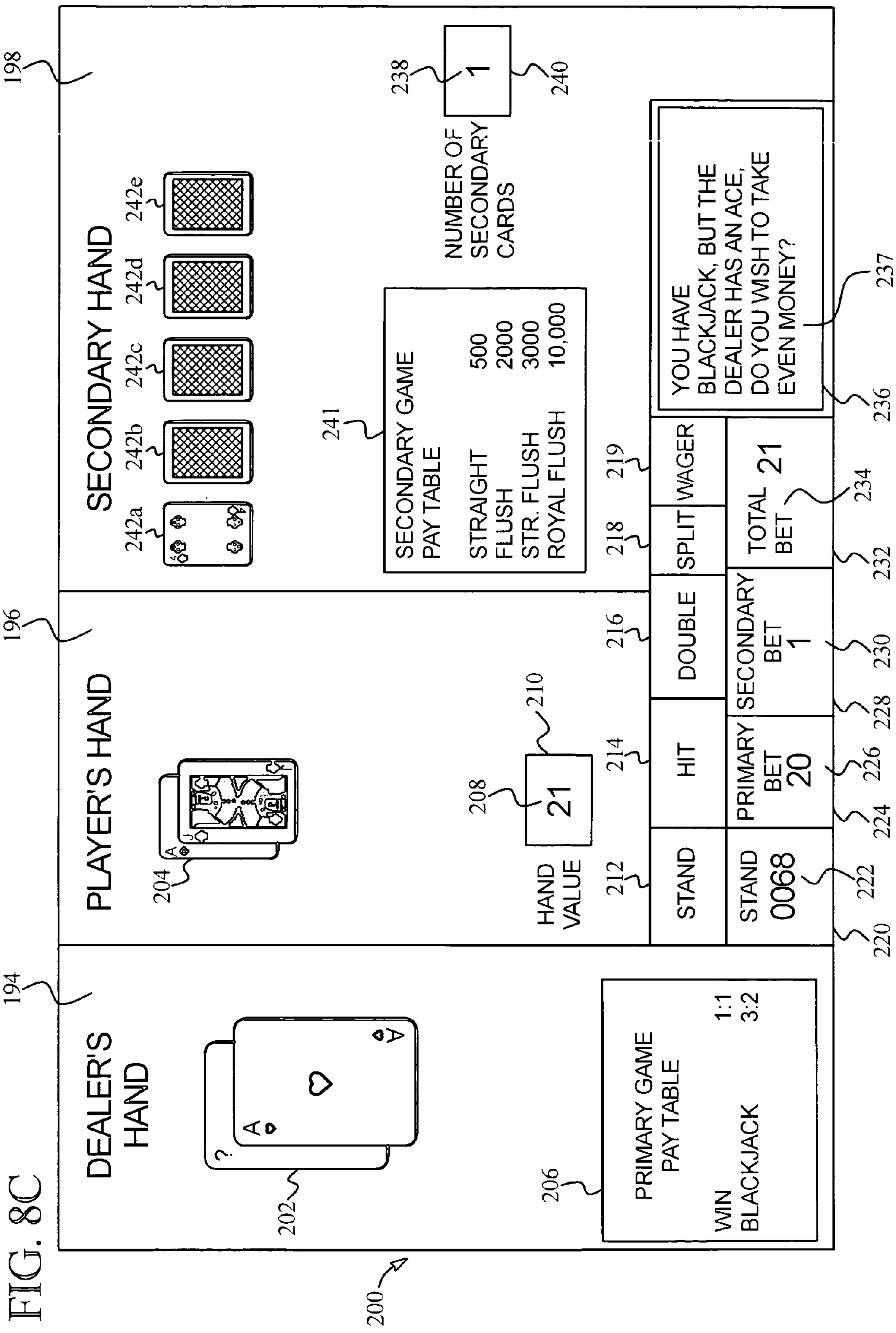

FIG. 8C illustrate the dealt player's hand and the dealt dealer's hand for the primary game. The player's hand 204 dealt with both cards face up in this example is a blackjack including an ace of diamonds and a jack of clubs. The player's hand value 210 is twenty-one as indicated in the hand value display 208. The value of the dealer's face up-card in this example is an ace which is displayed in the message display 236. The player's hand does not offer an opportunity to double or split and the double button 216 and the split button 218 remain inactive (not shown). The stand button 212 and the hit button 214 are inactive because the player can not hit on blackjack. As indicated in the instructions to the player in the message display 236, the gaming device will offer the player a 1:1 payoff if the player accepts this award prior to revealing the dealer's second card. This is somewhat like an insurance bet in that the player, by accepting even money is assuming that the dealer has blackjack and the result would have been a push. In this example, the player does not elect to take even money.

Figure 8D:
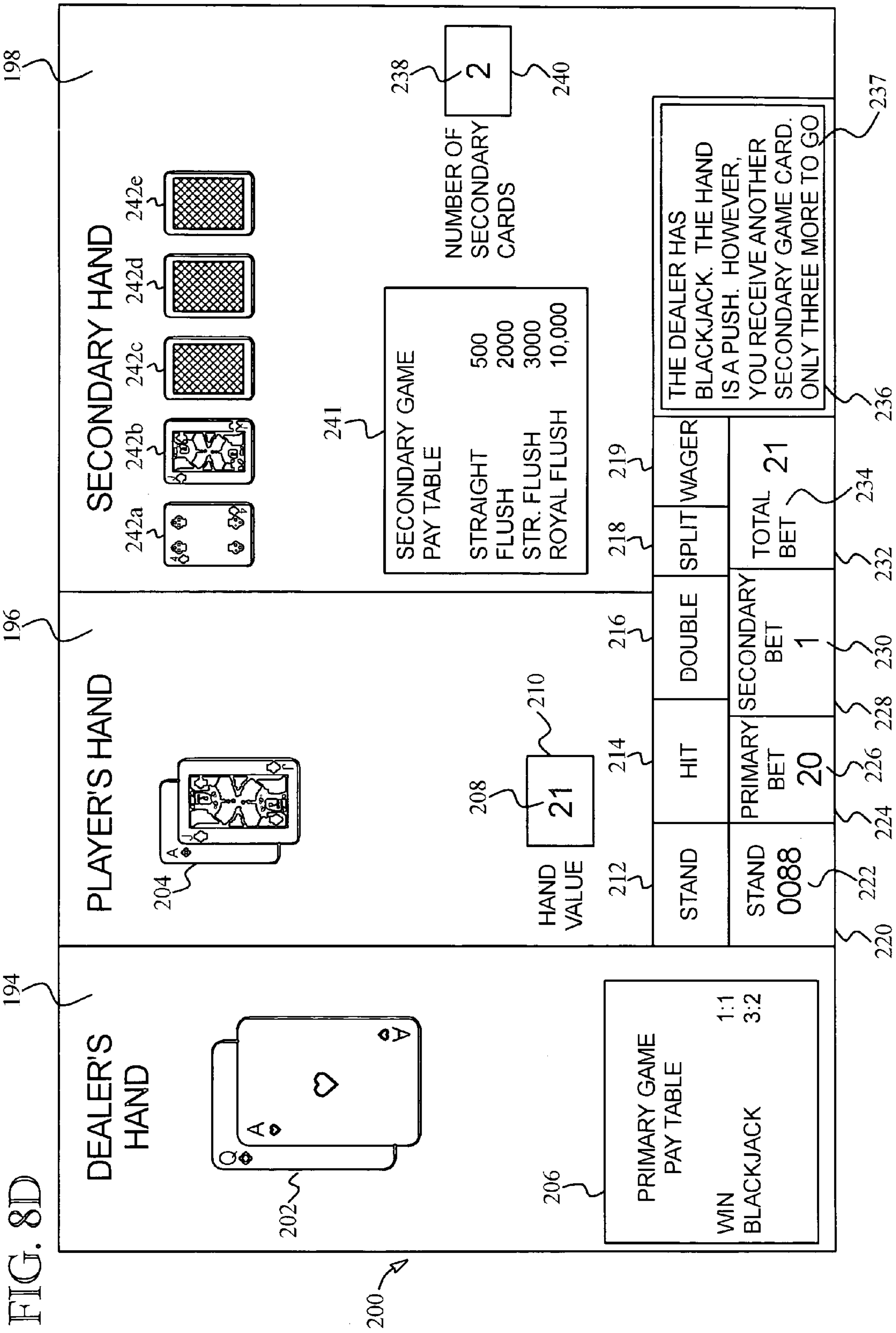

FIG. 8D illustrates the revealed dealer's down card which is a queen of diamonds, which also gives the dealer blackjack as indicated by the dealer's hand 202 and in the message display 236. In this example, the player pushes the primary game wager, but since the dealer won with a blackjack and the player made the secondary game wager 228, the gaming device provides the player with a second secondary game card 242*b*. In this example, the secondary game card 242*b* is a jack of clubs. The number of secondary game cards 238 is increased to two as indicated in the number of secondary game cards display 240. Once again, the player's loss to a dealer's blackjack is somewhat diminished by the player receiving a secondary game card. This is especially so with this second secondary game card 242*b* because the player received another club and now has two cards to a flush.

Figure 9A:
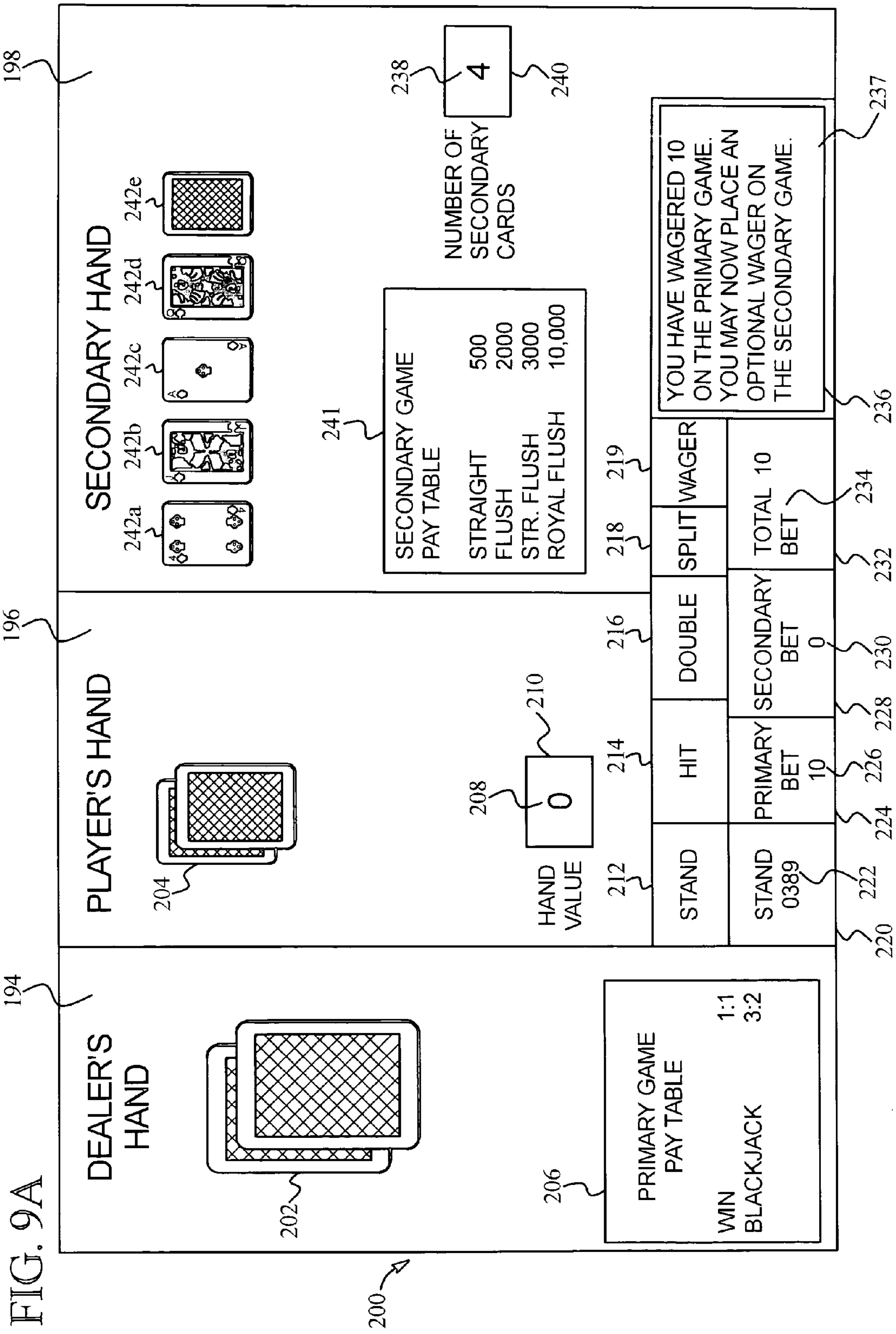
FIGS. 9A, 9B, 9C and 9D are illustrations of screen displays for a subsequent round of the primary game, where the player achieves a fifth secondary game card to complete the secondary game hand.

FIG. 9A illustrates a later state where the player has played several rounds or play of the primary game and has obtained four secondary game cards 242*a*, 242*b*, 242*c*, and 242*d* as also indicated in the number of secondary game cards display 240. At this stage, the player is only one secondary game card away from possibly obtaining a flush in the secondary game and to obtain an award associated with the flush in the secondary game. In this play, the player has made a wager of ten, as shown in the primary game bet display 224. The total bet 234 is ten as shown in the total bet display 232 because the player has not yet made a secondary game wager 230. The number of remaining player credits 222 is three-hundred eighty-nine as shown in the credits display 220. The gaming device displays a message 237 to the player in the message display 236 that the player may now place an optional secondary game wager 230.

Figure 9B:
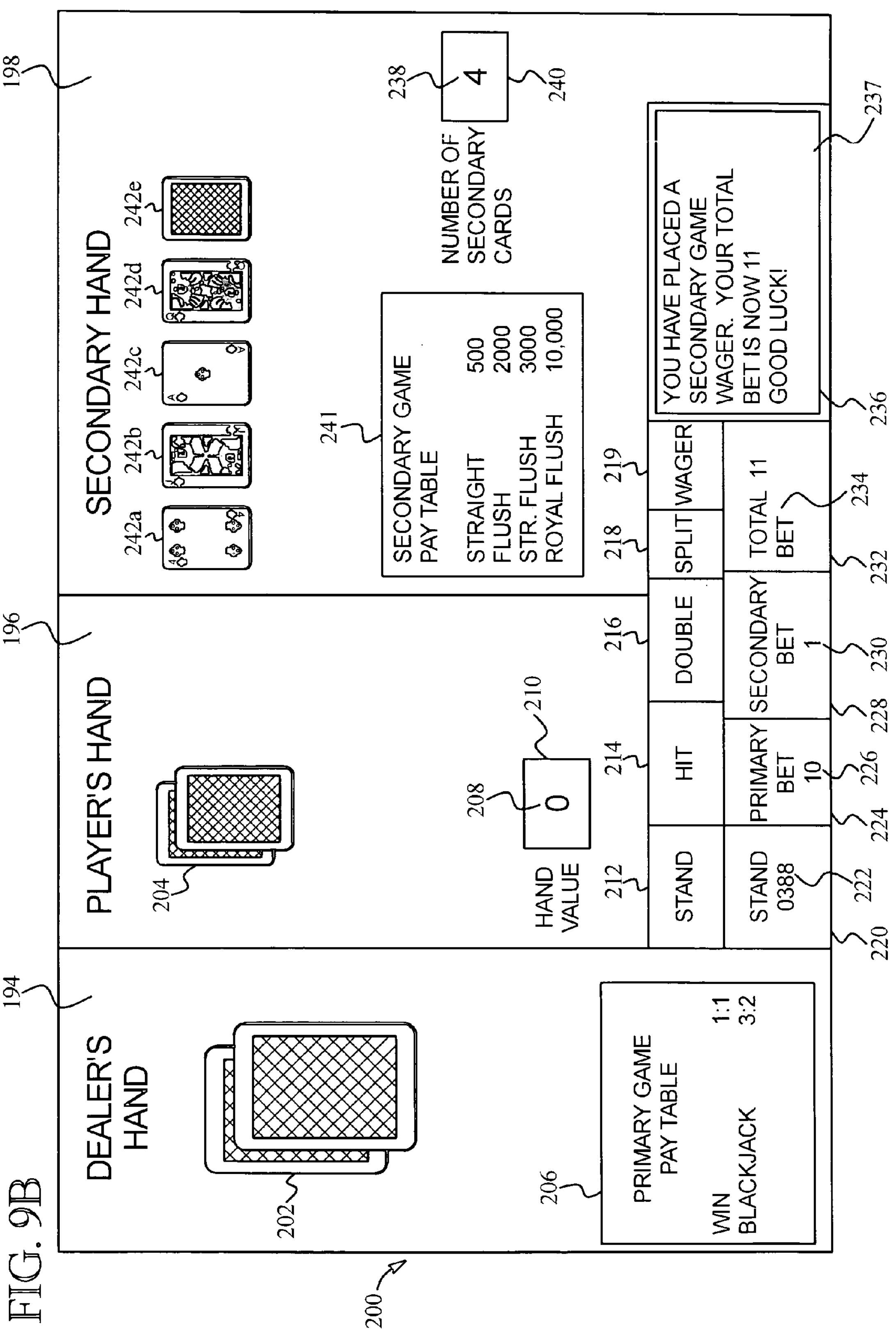

FIG. 9B illustrates that the player has made a secondary game wager 230 of one as indicated in the secondary game wager display 228. The number of credits 222 has been reduced to three-hundred eighty-eight as indicated in the credits display 220. The total bet 234 is now eleven as indicated in the total bet display 232.

Figure 9C:
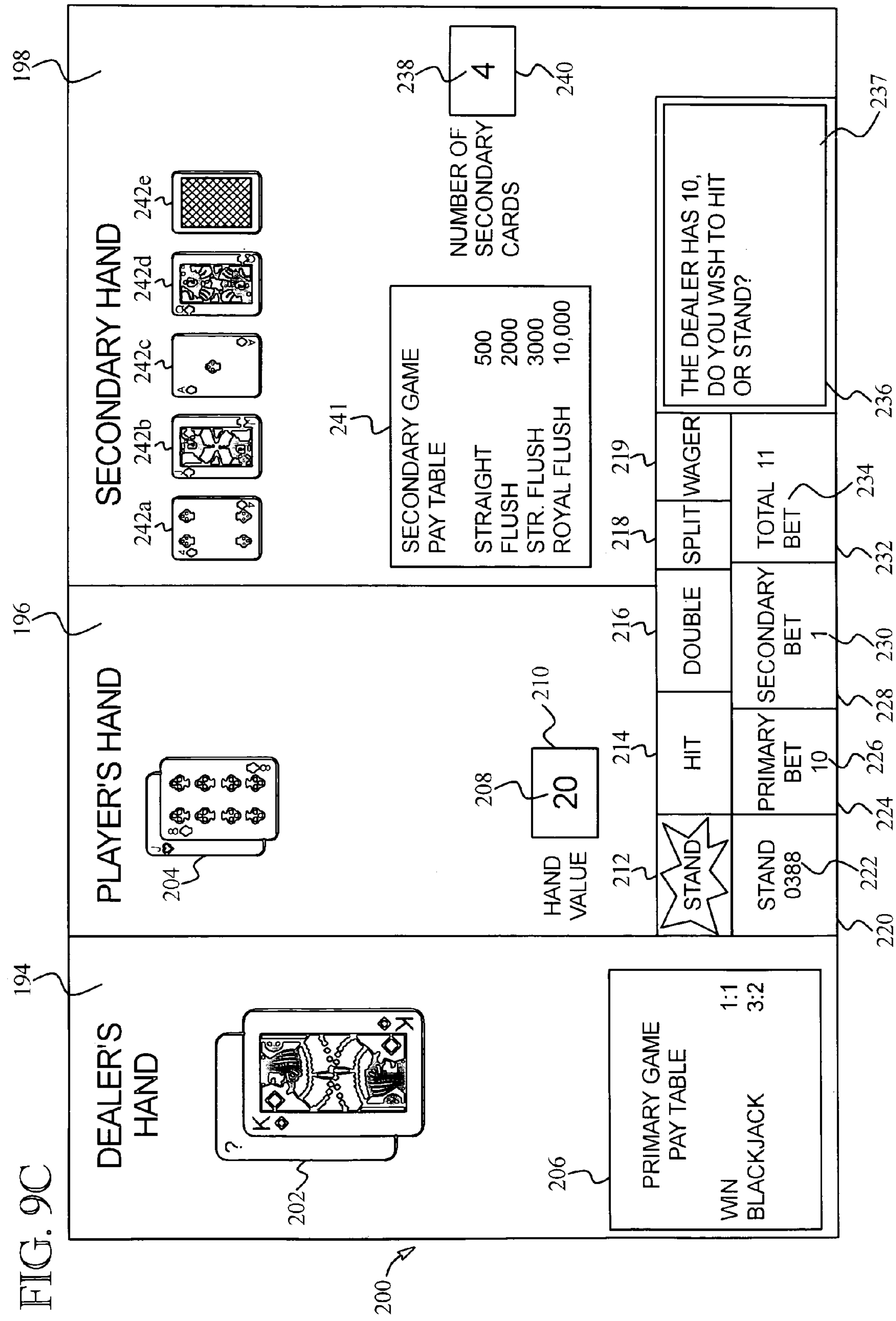

FIG. 9C illustrates the player's hand and the dealer's hand for the primary game. The player's hand 204 is dealt with both cards face up and includes a jack of hearts and an eight of clubs. The player's hand value 210 is eighteen as indicated in the hand value display 208. The value of the dealer's face up-card is displayed in the message display 236. The player's hand does not offer an opportunity to double or split and the double button 216 and the split button 218 remain inactive. The stand button 212 and the hit button 214 are activated as indicated by the highlighted borders and in the instructions 237 to the player in the message display 236. In this example, the player has a very good hand of eighteen and has elected to stand by selecting the stand button 212.

Figure 9D:
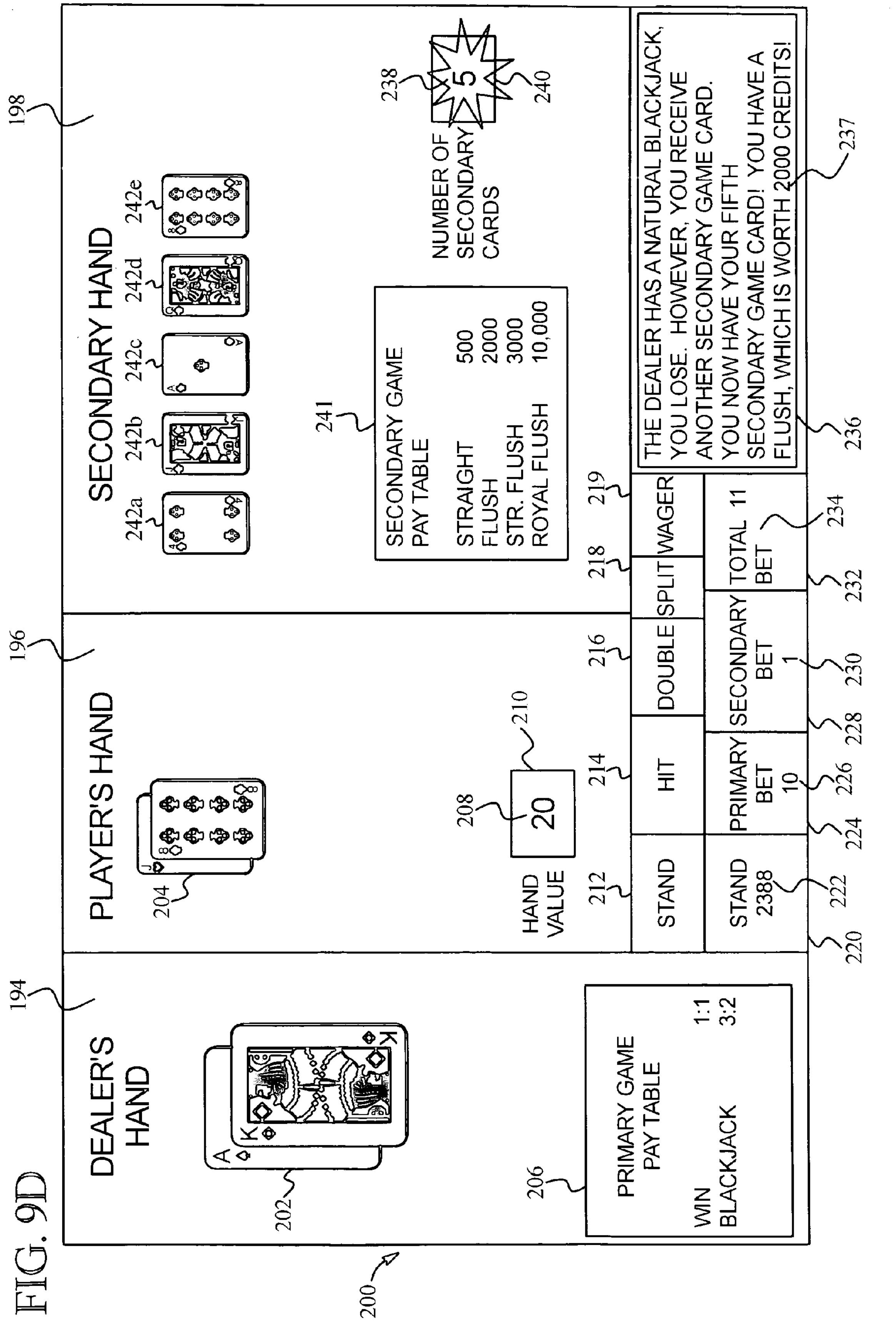

FIG. 9D illustrates the revealed dealer's down card down card to be an ace of spades, which gives the dealer blackjack as indicated by the dealer's hand 202 and in the message display 236. The player loses the primary game wager, but since the dealer won with a blackjack and the player made a secondary game wager 228, the gaming device provides the player with a secondary game card 242*e*. In this case, the secondary game card 242*e* is the eight of clubs. The number of secondary game cards 238 is increased to five as indicated in the number of secondary game cards display 240. The player has a total of five secondary game cards 238 which is a complete secondary hand. The gaming device evaluates the player's secondary hand after the hand is complete. The gaming device determines that the secondary hand is a winning combination of cards and in particular, the secondary hand is a five card club flush. The gaming device awards the player 2,000 credits for the flush according to the secondary game paytable and as indicated in the message display 236. The gaming device increments the credits by 2,000 to a total of 2,388 as indicated in the credits display. The gaming device restarts the secondary hand and play can continue.

FIGS. 10A, 10B, 10C, 10D and 10E illustrate an example of the play of a secondary poker game over a sequence of rounds or plays of the primary blackjack game, where the games are played at a live gaming table with several players and a human dealer. This example play of the secondary poker game results in a first player accumulating five secondary game cards and being awarded a jackpot for a successful combination of cards. The second player does not accumulate additional secondary game cards because he or she does not continue to place secondary game wagers.

Figure 10A:
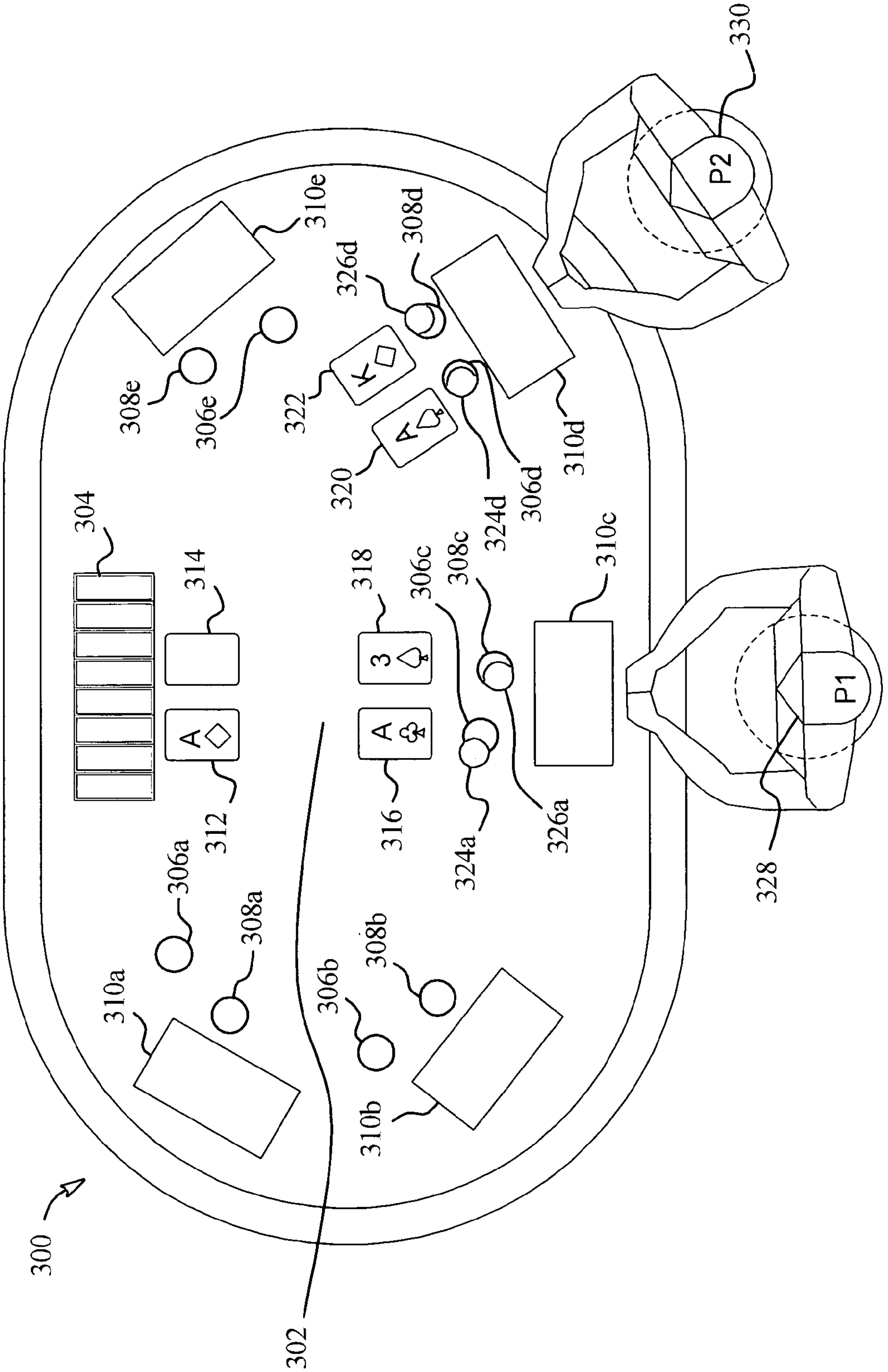
FIGS. 10A, 10B, 10C, 10D and 10E are top views of one embodiment of the gaming device, where the primary and secondary games are played at a gaming table.

Referring to FIG. 10A, the gaming table 300 has a playing surface 302 and a chip tray 304 for holding several stacks of chips. The dealer uses the chip tray 304 to pay out players when they win and collect chips when players have lost. The gaming table can accommodate a plurality of players. In this example, there are five player positions and only two players 328 and 330 seated at the table. It should be appreciated that the gaming table could accommodate any suitable number of playing positions and players so as not to interfere with game play. For each of the playing positions there is a primary wagering area 306*a* to 306*e* for wagering on the primary game, and a secondary game wagering area 308*a* to 308*e* for wagering on the secondary game. The gaming table also includes a display device 310*a* to 310*e* for the player position that is used to play the secondary game. In one embodiment, the display device displays gaming elements or cards that have been awarded to the player from the primary game.

In one embodiment, the gaming table includes a suitable card and wager tracking technology as described above and below. In general, a suitable tracking system would first identify each of the players' wagers. The tracking system also tracks the player's cards and the dealer's cards as they are dealt. The processor stores this information or data in memory. The gaming device provides a secondary game card if a secondary wager is placed and a triggering condition occurs in a play of the primary game. In one embodiment, the triggering event is the dealer getting blackjack. When the triggering event occurs in the primary game, the processor retrieves the stored information about the player's cards and causes the secondary game display device to display a virtual card for use in the secondary game. Therefore, the tracking system allows the secondary game to operate automatically and without assistance from the dealer.

FIG. 10A illustrates that a first player 328 has placed a primary wager 324*a* in the primary wagering area 306*a* and placed a secondary wager 326*a* in the secondary game wagering area 308*c*. A second player 330 has placed a primary wager 324*b* in the primary wagering area 306*d* and a secondary wager 326*b* in a secondary game wagering area 308*d*. At this point, neither the first player 328 or the second player 330 has achieved any secondary game cards as indicated by the empty secondary game displays 310*c* and 310*d*. The dealer deals two cards to the first player 328, the first card 316 is an ace of clubs and the second card 318 is the three of spades. The dealer deals two cards to the second player 330, the first card 320 is an ace of spades and the second card 322 is the king of diamonds. The dealer deals two cards to him or herself, and reveals the dealer's first card 312 which is an ace of diamonds. The dealer's second card 314 is unrevealed at this time. The second player has achieved blackjack, and in one embodiment may be offered the chance to take even money (i.e., even money being similar to an insurance bet in that the player is paid one to one on the wager). Because the dealer's first card 312 is an ace, the first player may place an optional insurance bet. In this example, the first player has chosen not to place an insurance bet. A determination is made immediately whether or not the dealer has blackjack, because the dealer's first card is an ace.

Figure 10B:
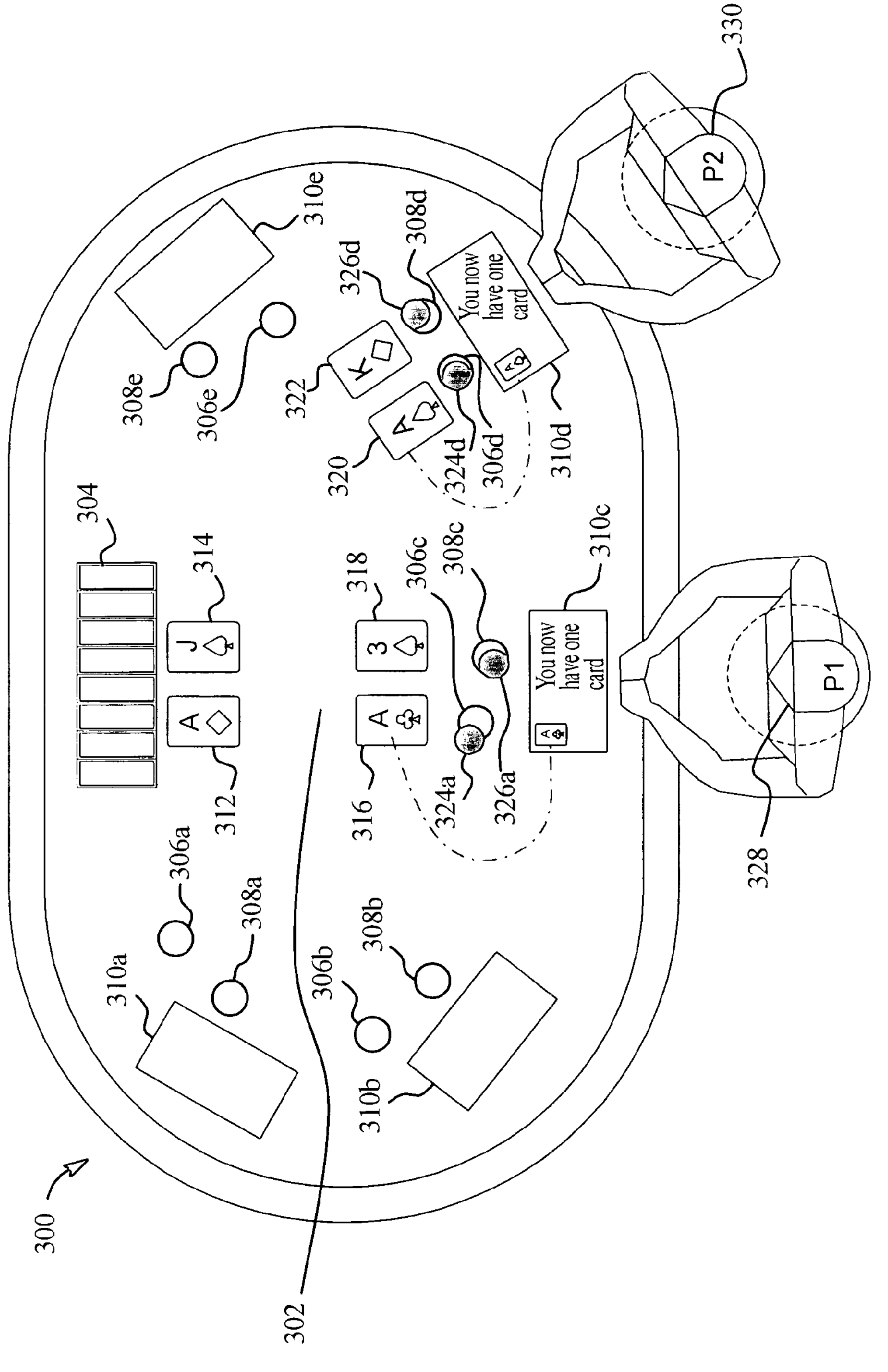

FIG. 10B illustrates that the dealer reveals the dealer's second card 314 which is a jack of spades. The dealer has achieved a hand of blackjack. The first player has lost the primary hand and the second player has pushed with the dealer. In this embodiment, because both players have placed a secondary game wager and the triggering condition has occurred (i.e., the dealer has received blackjack), the processor provides both players with a secondary game card. As shown by the dashed line connecting the first player's first card 316 and the first player's display device 310*c* a visual representation of the first player's first card appears in the display device 310*c*. The information related to the first player's first card is identified by a suitable scanning/tracking technology and the processor causes the secondary game display device 310*c* to display a virtual representation of the first player's first card. Similarly, the information related to the second player's first card 320 has been identified by the tracking technology and the processor causes the secondary game display device 310*d* to display the player's first card, as indicated by the dashed line. The processor causes a message to be displayed in both display devices 310*c* and 310*d* that the player has received their first secondary game card. The first round of the primary game ends and the secondary game for both players is initiated.

Figure 10C:
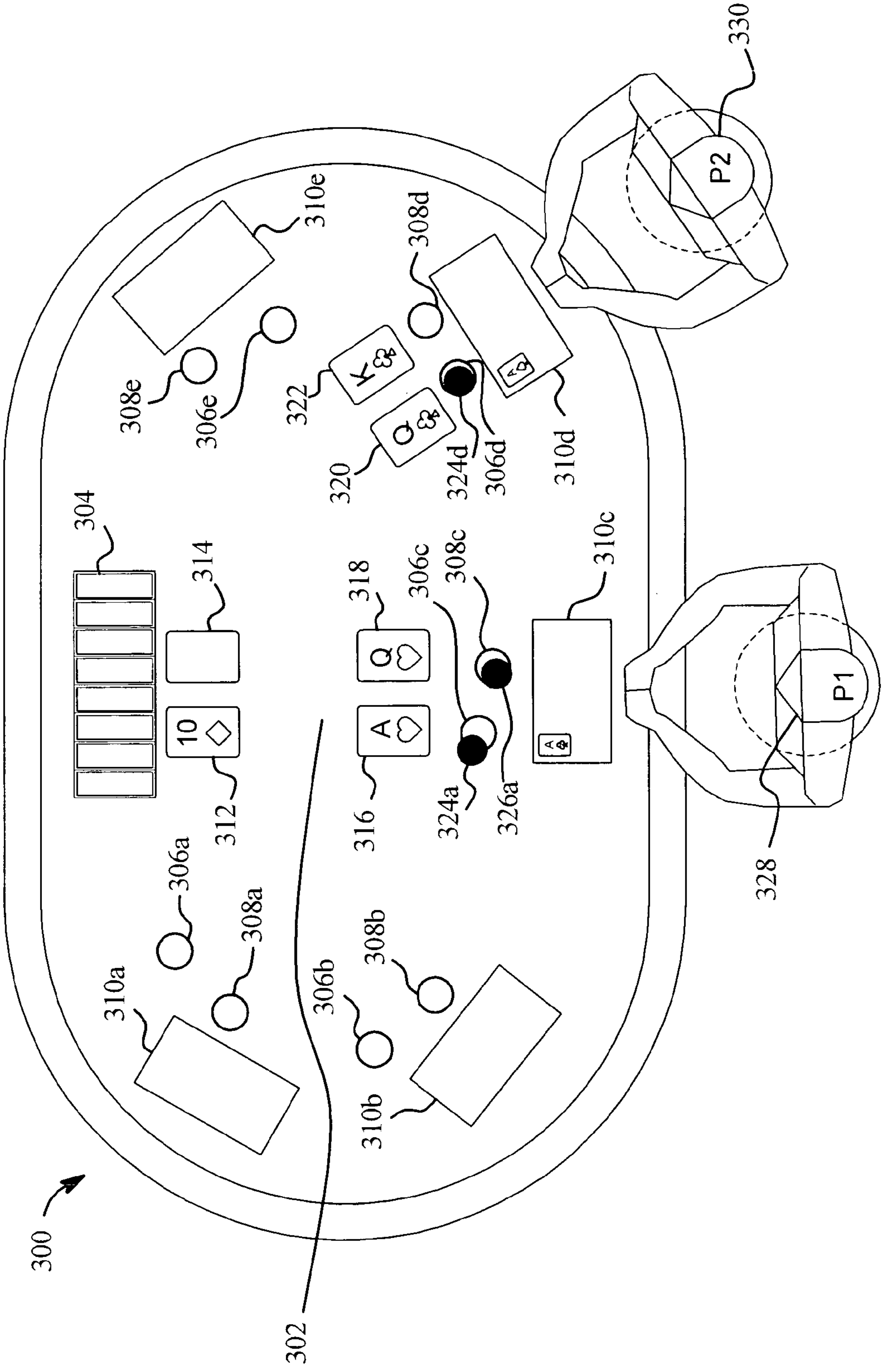

FIG. 10C illustrates that the first player 328 has placed another primary wager 324*a* in the primary wagering area 306*a* and a secondary wager 326*a* in the secondary game wagering area 308*c*. The second player 330 has also placed a primary wager 324*b* in the primary wagering area 306*d*. However, for this particular round of the primary game, the second player has chosen not to place a secondary wager. In this embodiment, a player is not required to place consecutive wagers on the secondary game in order to retain their accumulated secondary game cards, as seen in the second player's secondary game display 310*d*. The dealer deals two cards to the first player 328, the first card 316 is an ace of heart and the second card 318 is the queen of hearts. The dealer deals two cards to the second player 330, the first card 320 is an queen of clubs and the second card 322 is the king of clubs. In this round of the primary game, the first player has achieved blackjack. The dealer deals him or herself two cards. The dealers reveals the dealer's first card 312, which is the ten of diamonds. In this embodiment, the first player is not offered the chance to take even money because the dealer's first card 312 is not an ace (despite the fact that the dealer may have blackjack). The first player is not paid at this point because the dealer also has the possibility of obtaining a blackjack. Accordingly, an immediate determination is made as to whether or not the dealer has blackjack, because the dealer's first card 312 is a ten.

Figure 10D:
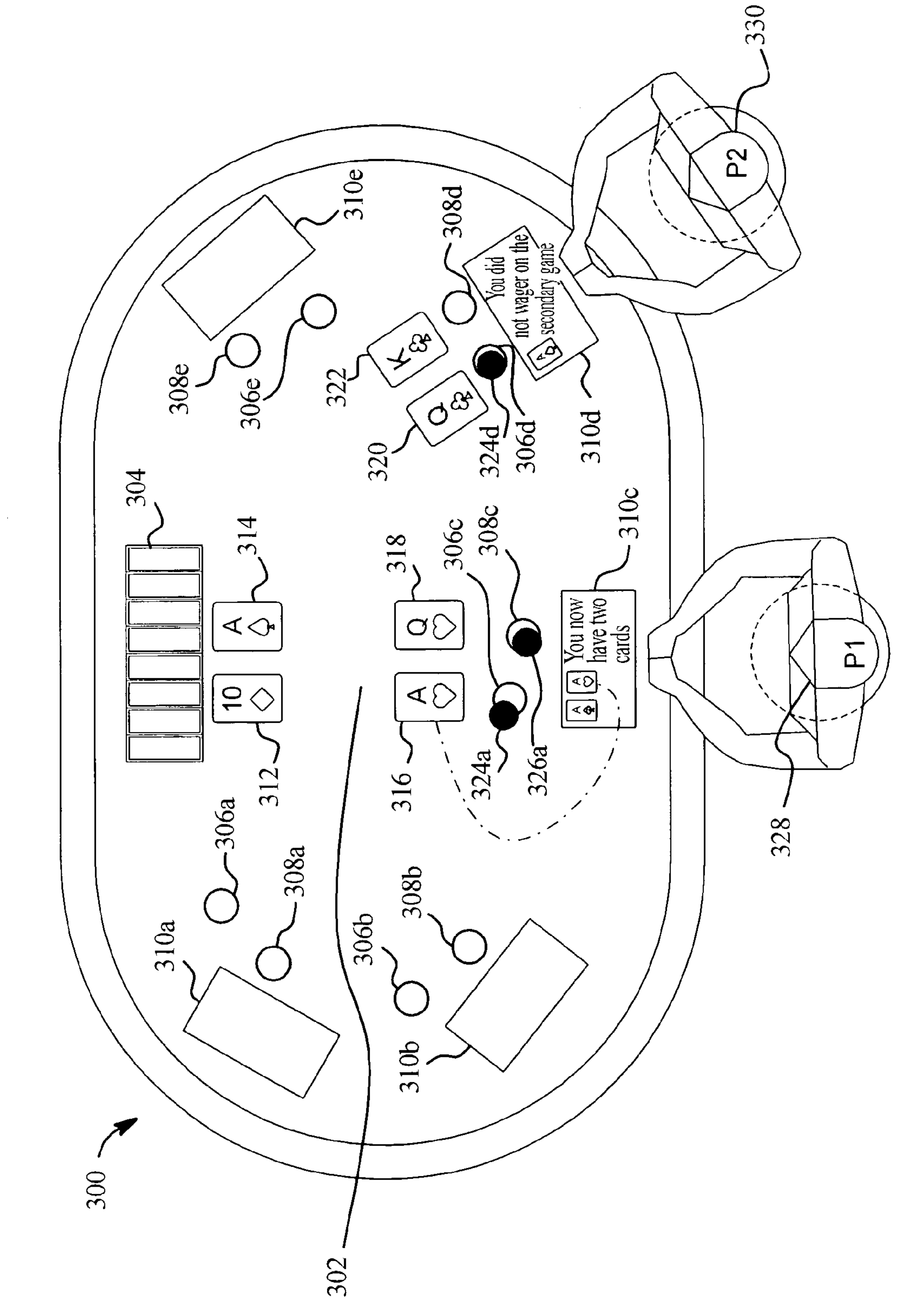

FIG. 10D illustrates that the dealer reveals the dealer's second card 314, which is a ace of spades. The dealer has achieved a hand of blackjack. The first player has pushed on the primary hand and the second player has lost. In this embodiment, the players would be eligible to receive a secondary game card because the triggering condition has occurred (i.e., the dealer has received blackjack). However, the second player did not place a secondary wager and does not receive a secondary game card as indicated in the second player's secondary game display 310*d*. However, he first player has placed a secondary game wager. As shown by the dashed line connecting the first player's first card 316 and the first player's display device 310*c* the processor causes a visual representation of the first player's first card to appear in the secondary game display device 310*c*. The processor causes the secondary game display device 310*c* to display a message that the player has received their second secondary game card. This ends the second round of the primary game.

Figure 10E:
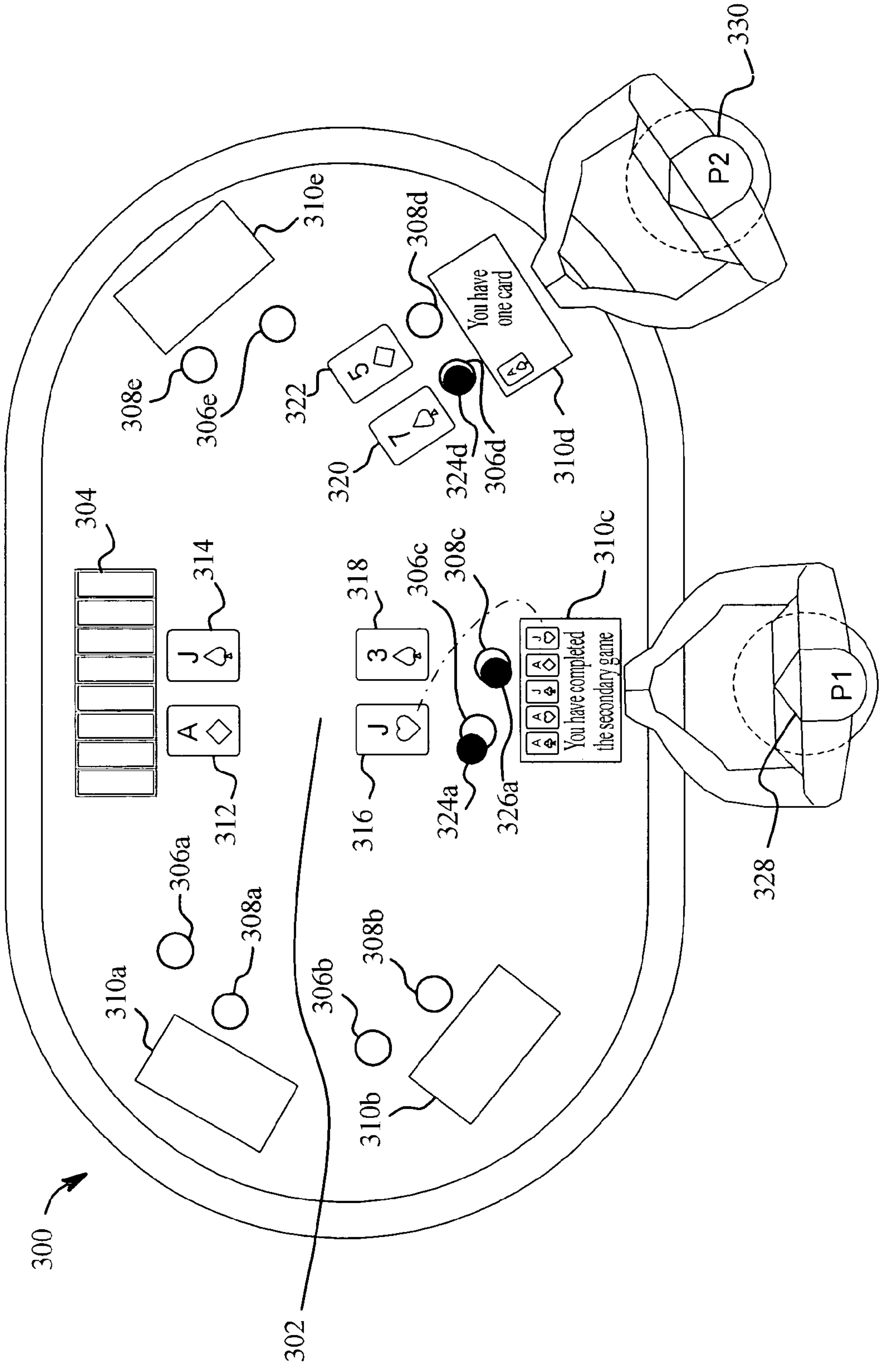

FIG. 10E illustrates a later round of the primary game where the first player 328 completes the secondary game. Several rounds of the primary game have taken place during the period of time between FIG. 10D and FIG. 10E as indicated by the additional secondary game cards in the first player's secondary game display 310*c*. Also, the second player has not accumulated any additional secondary game cards, as indicated by the second player's secondary game display 310*d*. In this round of the primary game, the first player 328 has placed another primary wager 324*a* in the primary wagering area 306*a* and a secondary wager 326*a* in the secondary game wagering area 308*c*. The second player 330 has also placed a primary wager 324*b* in the primary wagering area 306*d*. The second player did not place a secondary wager. The dealer deals two cards to the first player 328, the first card 316 is the jack of hearts and the second card 318 is the three of spades. The dealer deals two cards to the second player 330, the first card 320 is the seven of spades and the second card 322 is the five of diamonds. The dealer has achieved blackjack and both of the players have lost the primary game. However, since the first player placed a secondary wager and the triggering condition has occurred (i.e., the dealer was dealt blackjack) the processor provides a secondary gaming card to the first player. This is the first player's fifth secondary game card and completes the secondary game. The dealer provides the first player with a secondary award for achieving a high ranking poker hand. In particular, the player's poker hand was a full house with three aces and two jacks. After the secondary game award has been provided, the processor restarts the first player's secondary game.

Alternative Primary and Secondary Games

In certain of the embodiments described below, the primary game is a traditional blackjack or 21 game. However, it should be appreciated that the primary game may be of any suitable type such that the fulfillment of certain conditions in the primary game causes the gaming device to provide the player with an element to be used in the secondary game, where the element is retained and other elements may be accumulated over the course of several plays of the primary game. As indicated above, the primary game may alternatively be poker (including any of the numerous poker games), pai gow, roulette, baccarat, craps, variations thereof or any other suitable video. The present invention may also in any suitable mechanical based game.

In one embodiment, the gaming device begins the secondary game upon the first secondary game wager placed by a player. In this embodiment, the secondary game can continue until the player discontinues wagering on the primary game. In this embodiment, the gaming device includes a program code which causes the processor to automatically begin or initiate a secondary game simultaneous with the play of the primary game.

It should be appreciated that the secondary game elements may be chosen in a variety of ways. In one embodiment, the secondary game elements or cards may be selected from the elements or cards in the primary game. In one embodiment, where the primary game is blackjack, the secondary game cards may be randomly selected from a conventional deck of 52 playing cards, selected from the dealer's hand, or selected from a player's hand. In one embodiment, a player can select the secondary cards from either the dealer's hand or that player's hand. In another embodiment, the secondary game card would be the dealer's original up-card. In other embodiments, the secondary game card may be the highest value card, the lowest value card, the first card dealt, the second card dealt or the last card dealt in the player's or dealer's hand.

In one embodiment, the secondary game card is automatically selected by a suitable auto-hold computer program. In this embodiment, a card is automatically selected from the player's hand or the dealer's hand that will maximize the potential value of the secondary game outcome. In one example where the secondary game is a five-card poker game with cards as secondary game elements and where the player has already accumulated a pair of fives, the most valuable card to the player would be another five so as to form three-of-a-kind. Therefore, if the player's blackjack hand includes a two, a ten and a five, the gaming device would automatically select the five to be the next secondary game element.

In another embodiment, the secondary game card may be chosen from a separate pre-shuffled deck of actual or virtual cards shared by a plurality of players. In this embodiment, the secondary cards available to one player, would be limited by the secondary cards that the other players have already accumulated. In other words, they have already been taken out of the deck. Also, a player's secondary cards could be returned to the deck after a player has achieved a designated number or has forfeited their cards by leaving the table and cashing out. In another embodiment, each player secondary game card hand may be dealt from a separate actual or virtual deck of cards for that player's secondary game card. In one embodiment, the gaming device may include programming logic to prevent the player from receiving two secondary game cards that are of the same suit and rank. In one example, each player would have a separate deck of cards to prevent the occurrence of duplicate cards. In another example where multiple decks of cards are used, if a duplicate card is selected then the gaming device would require that a different card be selected for or by the player.

In another embodiment, the secondary game cards could be partially randomly generated by the gaming device and partially selected by a player. For example, the gaming device may randomly determine the first three secondary game cards, and the player may choose the final two. In this embodiment, the player is somewhat limited in their ability to make a secondary game poker hand.

In one embodiment, each of the players may have one or more opportunities to decline to accept a secondary bonus card. For example, a player may have already accumulated a king of hearts, a king of diamonds, a two of hearts, and a two of clubs. In this example the player has two pair and the possibility of achieving a full house with the fifth card. The player may want to decline a secondary game card when the triggering condition occurs in the primary game and any secondary game cards to not help the player's poker hand in the secondary game.

In one embodiment, the secondary game is a five card poker game as described above where the results are based on the five cards in the secondary game drawn or obtained from the plays of the primary game (where a player made a secondary wager and the triggering condition occurred). In another embodiment, the five card poker game is a five card draw poker game where the player has one or more opportunities to hold and/or draw to the five cards (where the player made a secondary wager and the triggering condition occurred). In one embodiment, where the secondary game is a draw poker type game, the gaming device enables the player to replace one or more secondary game cards over the course of the or at the end of secondary round. In this embodiment, the player may have been awarded three cards of a first suit and one card of a second suit. The player may choose to replace or not hold the card with the second suit and in doing so increase the probability of obtaining a winning secondary hand. In one embodiment, the gaming device includes programming logic as described above, to prevent replacement cards from duplicating cards already in the player's poker hand. For example, all the cards may be drawn from a single actual or virtual deck of cards.

It should thus be appreciated that the gaming device may provide any suitable further game play in the secondary game after a designated number of secondary game elements have been obtained based on multiple plays of the primary game. For example, after a player receives five secondary game cards, the five cards of the secondary game may be combined with the two up-cards of the player's next blackjack hand in the primary game. In this embodiment, a simplified game of Texas Hold-em could be played, where the player chooses the best five card poker hand from a total of seven cards. It should also be appreciated that the secondary game may include a bonus game triggered by an occurrence of a triggering event in the secondary game. The secondary game could also include suitable bonus features such as wild cards and extra cards.

in one embodiment, awards in the secondary game may be based on a paytable. This paytable may be based in part on the minimum, average and maximum secondary game wagers and/or the minimum, average and maximum primary game wagers. In another embodiment, if a player obtains a winning combination of secondary game elements in the secondary game, the gaming device provides the player with or an opportunity to achieve a progressive award such as a wide area progressive jackpot as described above. In another embodiment, a winning secondary game outcome may enable player to place a number of free activations of a game.

In another embodiment, a player is not required to achieve a complete secondary game hand in order to receive a number of free activations of a game. For example, each of the provided secondary game cards or gaming elements represents an opportunity for the player to achieve the wide area progressive jackpot. In one embodiment, each provided gaming element corresponds to a number of free activations of a progressive slot game. In one embodiment, when the free activations are executed, a game server may play the designated number of free activations and stream the results to the gaming device to be displayed to the player. In another embodiment, data or other information regarding the progressive slot game is downloaded to the gaming device and the free activation of the progressive slot game are played real time from the gaming device.

It should be appreciated that the secondary game can be any suitable game as described above and the primary game may be the same game as the secondary game.

In one embodiment, as discussed above the gaming table may include suitable scanning or reading technologies that are capable of identifying the values of the dealer's and player's cards. The scanning technologies, as discussed above, may be optical, based on radio frequency identification or another suitable method as discussed above. In one embodiment, the card recognition system includes a computer tracking program. For example, in a Blackjack table game where an optical reader is included in a card shoe, a computer tracking program would be able to determine the number of cards dealt and at least partially determine what cards have been dealt to the different players at the table.

Alternative Wagering

In the above described embodiments, the primary game wager is placed at the beginning of the primary game, prior to any cards having been dealt to each player or the dealer and the secondary game wager is placed at the same time that each player places the primary game wager. However, the present invention contemplates a plurality of different wagering variations.

In one embodiment, there may be a qualifying condition of an amount wagered on the primary game in order to be eligible to place a secondary wager on the secondary game. In another embodiment, the qualifying condition is whether a player has played a number of rounds of the primary game. In one embodiment, the gaming device may not require a separate additional wager for the secondary game. Rather, a player must earn entry to the secondary game through play of the primary game, thereby encouraging play of the primary game. In another embodiment, the qualifying condition may be based on a random event independent of the play of the primary game.

In one embodiment, the condition for placing a secondary wager includes matching cards in the primary game to predetermined cards. Prior to a play of the primary game, the gaming device determines one or more cards and displays them on a display device. In this embodiment, the gaming device enables a player to place a secondary wager on the secondary game only if one or both of the player's originally dealt cards from the primary game match one or both of the predetermined cards. Therefore, in this embodiment, the player has no direct control over whether or not he or she will be able to place a secondary wager. In another embodiment, any of the players cards in the primary game may be used to match the predetermined cards displayed by the display device.

It should be appreciated that any suitable method or multiple methods may be employed to determine when and if a player may place a secondary wager.

Alternative Triggering Conditions

The present invention contemplates a variety of different ways to determine whether or not to provide a secondary game card or element to a player. In other words, there may be several different conditions of the base game that determine whether a player is to be provided with a secondary game card or element. In the embodiment described above, the criteria or the triggering condition is when a secondary wager has been placed and the dealer receives a blackjack in the primary game.

In general, receiving a secondary game card or element tends to increase the level of player excitement. Therefore, in alternative embodiments, the gaming device may provide a player a secondary game card or element in order to compensate the player for a frustrating or negative result in a play of the primary game. In one embodiment, the player will receive a secondary game card only if both the player and the dealer get blackjack. In this sense, the player will be compensated for the fact that they have a experienced a particularly frustrating push with the dealer.

In another embodiment, the gaming device provides a player a secondary game card if the player doubles down with a primary game hand value of nine or ten, and doubles to a hand of twelve or less (generally, house rules allow the player only one additional card when doubling-down). In another embodiment, the gaming device provide the player a secondary game element or card when the player doubled-down to a total of twelve or less and subsequently lost the hand to the dealer (i.e., the player would not be awarded a secondary game card if the dealer subsequently busts). In these embodiments, the secondary game card compensates the player in that a potentially very good hand turned into a bad hand.

In another embodiment, the gaming device may provide a player a secondary game card if the total value of the player's first two cards is twelve, and the player hits and receives a card with a value of ten. In this embodiment, the player is compensated with a secondary game card for having experienced a particularly frustrating bust. Therefore, when the player receives a secondary game card in response to a particularly frustrating hand, the level of excitement is maintained because the player is closer to achieving a complete bonus hand and potentially winning a large bonus award.

In one embodiment, the triggering condition for receiving a secondary game card or element is when a pair of aces have been split and both hands receive a ten value card. In this respect a player is rewarded for achieving two blackjack hands with respect to the base game (house rules may prohibit paying 3:2 on a blackjack after the player has split aces). In another embodiment, the triggering condition for receiving a secondary game card is when a designated number of cards have been dealt to increasing or decreasing value or rank in the primary game.

In other embodiments, the gaming device may provide a player a secondary game card or element to augment a particularly good or winning result in the primary game. In one embodiment, the triggering condition for a secondary game card is if a secondary wager has been placed and the player gets a total hand value of twenty-one in the primary game by having five or more cards (such as Five Card Charlie). For example, the initial hand may be a four and a three, and the player hits three times and receives a six, a three, and a five. In this embodiment, providing a secondary game card is a reward for achieving the highest possible hand in a somewhat unique way. With the prospect of obtaining an additional secondary game card in this manner, a player may be encouraged to take hits on his or her hand that are not the most strategic for winning the primary game. In that respect, the gaming establishment will tend to win a higher percentage of hands in the primary game. It should be appreciated that the number of cards that the player may have to draw can be any number to make it sufficiently difficult for the player to achieve.

In another embodiment where the base game is played with a plurality of players at a community gaming table, the triggering condition for receiving a secondary game card is when at least a minimum number of players at a gaming table or console simultaneously receive a designated hand such as blackjack. For example, if at least three players at a table receive a designated hand such as blackjack at the same time, all of the players are awarded a secondary game card or element. This would add to the overall level of excitement of the game and also increase the camaraderie between players as they would be motivated for other players to also achieve blackjack. Since occurrences of this nature may happen less often, the gaming machine may provide each of the players more than one secondary game cards or elements.

In other embodiments, a player may receive a secondary game card for some unique combination or sequence of cards that the player, or the dealer, or both the player and the dealer received in a play of the primary game. In one embodiment, a secondary game card is awarded if there is a winning poker hand that can be selected from the combination of the dealer's and the player's cards. For example, if the player's is dealt a total of four cards, and they all are diamonds, and one of the dealer's cards was also a diamond, this would correspond to a flush in poker. In another embodiment, the winning poker hand must be selected from only the player's hand.

In an alternative embodiment, a random or predetermined sequence of cards may be generated by a processor and displayed by an additional display device. In this embodiment, a secondary game card is awarded if the cards in a player's hand match the cards on the display. The prospect of achieving this unique hand may motivate the player to take a hit when conventional blackjack strategy would dictate otherwise. In another embodiment, a secondary game card is provided if the card's in the player's hand match the cards in the dealer's hand.

In one embodiment, a secondary game card is randomly awarded to a player, if the player places an optional secondary game wager. In this embodiment, there is no triggering condition for receiving a secondary game card other than the random selection. In one embodiment, where the optional secondary game wager is generally required in order to be eligible to receive a secondary game card, the gaming device may additionally randomly award a secondary game card to a player that has not placed the optional wager. In this embodiment, even a player choosing not to wager on the secondary game has a chance to participate and accumulate secondary game cards thereby increasing overall player enjoyment and camaraderie.

In one embodiment where a player is randomly awarded a secondary bonus card, the likelihood or percentage chance of getting a card is based on the cumulative amounts wagered by the player in either the primary game or the secondary game. Therefore, in this embodiment, frequent players are rewarded by being more likely, on average, to receive a secondary game card.

In certain embodiments, the award of a secondary game card is based, at least in part, on the amount of game play. In one embodiment, a player will automatically receive a secondary game card after participating in a predetermined or randomly determined number of plays of the primary game. In another embodiment, after the player has achieved a qualifying level of play in the primary game and if a triggering condition occurs, the player is awarded a opportunity to receive a secondary game card. In an example of this embodiment, the gaming device includes an indicator to inform a player that they are eligible to receive a secondary game card. In another embodiment, a secondary game card is awarded if the player has participated in the secondary game a number of times without achieving a secondary game card, where the number is one, five, ten or any suitable number. In these embodiments, frequent players are rewarded with one or more secondary game cards or an opportunity to collect one or more secondary game cards.

It should thus be appreciated that the present invention contemplates employing one or more of the triggering conditions described above or one or more other suitable triggering conditions.

Alternative Terminating Conditions

It should be appreciated that the secondary game may be terminated in a variety of ways. In the above described embodiments, the secondary game is naturally terminated or reset when a player achieves the designated number of secondary game elements and is provided with an award. In certain of the embodiments described above, if the player discontinues play of the primary game, all of the accumulated secondary game cards or elements are forfeited or given up. In another embodiment, accumulated secondary game elements may be stored on a central server and further associated with a player identification card. Therefore, the player may leave the table or even the gaming establishment and still retain any accumulated secondary game elements.

It should be appreciated that the gaming device may save or enable a player to save the accumulated secondary game elements or cards under certain circumstances. It is only natural that players may need to leave the table for a variety of reasons, such as to eat, to withdraw money from an Automated Teller Machine (ATM), to use the restroom, to order a drink, or to make a phone call. In some cases, it may take a while to build up a sufficient number of secondary game elements to form a secondary game hand, and it would be frustrating if the player was required to forfeit the elements if they had to temporarily leave the gaming table. However, a gaming establishment would normally not want to leave a gaming space unoccupied for a significant period of time.

In one embodiment, the secondary game may maintain its status after the play of the primary game is stopped and after the player has cashed out any remaining credits. In this embodiment, the secondary game may maintain the same status for a given period of time until another player initiates the primary game. Consequently, a new player may obtain the benefits of a player who has previously played the primary game, but did not accumulate enough secondary game cards to be evaluated in the secondary game.

It should be understood that various changes and modifications to the present embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A method of operating a gaming device including a primary card game, said method comprising:

(a) enabling a player to place a primary wager on a play of the primary card game;

(b) enabling the player to place a secondary wager on a secondary poker game;

(c) if the primary wager was placed on said play of the primary card game, generating a primary card game outcome and providing the player with any primary awards associated with the primary card game;

(d) if the secondary wager was placed and a triggering event occurs associated with said play of the primary card game, providing the player with a secondary poker game card wherein the secondary poker game card is accumulated for use in the secondary poker game;

(e) displaying any accumulated secondary poker game cards;

(f) repeating (a) to (e) at least once and until the number of accumulated secondary poker game cards reaches a predetermined number; and (g) providing the player with any secondary awards associated with the combination of secondary poker game cards.

2. The method of claim 1, wherein the secondary poker game card is selected from the cards in said play of the primary card game.

3. The method of claim 2, which includes receiving a player selection of the secondary poker game card.

4. The method of claim 1, wherein the primary game is a blackjack game including, a dealer hand and a player hand, and which includes selecting the secondary poker game card from the group consisting of: (a) the dealer hand; (b) the player hand; (c) the player hand and the dealer hand; and (d) at least one standard deck of fifty-two cards.

5. The method of claim 1, wherein the triggering event is selected from the group consisting of: (a) the dealer obtaining a blackjack; (b) the player obtaining a blackjack; (c) the dealer obtaining a predetermined combination of cards; (d) the player obtaining a predetermined combination of cards; (e) the dealer obtaining a predetermined number of cards; and (f) the player obtaining a predetermined number of cards.

6. The method of claim 1, which includes enabling the player to forfeit any accumulated secondary game cards.

7. The method of claim 1, wherein the card game is played at a gaming table and the method includes:
- (i) electronically identifying cards with an optical recognition device or a radio frequency identification device, and
- (ii) storing the identity of the cards in a memory.

8. The method of claim 1, which includes electronically tracking cards played in the primary game, for each play of the primary game.

9. The method of claim 8, wherein electronic tracking of cards is executed according to a computer program.

10. The method of claim 8, wherein providing the player with a secondary poker game card includes selecting said secondary poker game card from the electronically tracked cards.

11. The method of claim 10, which includes selecting the secondary poker game cards from one of the player's cards.

12. The method of claim 1, which is operated through a data network.

13. The method of claim 12, wherein the data network is an internet.

14. A method of operating a gaming device including a primary blackjack game operable upon a primary wager by a player, said method comprising:
- (a) enabling the player to place a primary wager on a play of the primary blackjack game;
- (b) enabling the player to place a secondary wager on a secondary poker game;
- (c) if the primary wager was placed on said play of the primary blackjack game generating a primary blackjack game outcome by dealing a dealer hand and at least one player hand, and providing the player with any primary awards associated with the primary blackjack game outcome;
- (d) if the secondary wager was placed and a triggering event occurs in said play of the primary poker game providing the player with a secondary poker game card, wherein the secondary poker game card is accumulated for use in the secondary poker game;
- (e) displaying any accumulated secondary poker game cards;
- (f) repeating (a) to (e) at least once and until the number of accumulated secondary poker game cards reaches a predetermined number; and
- (g) providing the player with any secondary poker game awards associated with the combination of secondary poker game cards.

15. The method of claim 14, wherein the primary blackjack game includes, a dealer hand and a player hand, and which includes selecting the secondary poker game card from the group consisting of: (a) the cards in the dealer hand; (b) the cards in the player hand; (c) the cards in the player hand and the dealer hand; and (d) at least one standard deck of fifty-two cards.

16. The method of claim 15, which includes receiving a player selection of the secondary poker game card.

17. The method of claim 14, wherein the triggering event is selected from the group consisting of: (a) the dealer obtaining a blackjack; (b) the player obtaining a blackjack; (c) the dealer obtaining a predetermined combination of cards; (d) the player obtaining a predetermined combination of cards; (e) the dealer obtaining a predetermined number of cards; and (f) the player obtaining a predetermined number of cards.

18. The method of claim 14, which includes enabling the player to forfeit any accumulated secondary poker game cards.

19. The method of claim 14, wherein the primary blackjack game is played at a gaming table and the method includes:
- (i) electronically identifying the cards with an optical recognition device or a radio frequency identification device, and
- (ii) storing the identity of the cards in a memory.

20. The method of claim 14, which includes electronically tracking cards played in the primary game, for each play of the primary game.

21. The method of claim 20, wherein the electronic tracking is executed according to a computer program.

22. The method of claim 20, wherein providing the player with a secondary poker game card includes selecting said secondary poker game card from the electronically tracked cards.

23. The method of claim 14, which is operated through a data network.

24. The method of claim 23, wherein the data network is an internet.

25. A method of operating a gaming device including a primary card game operable upon a primary wager by a player, said method comprising:
- (a) enabling the player to place a primary wager on a play of the primary card game;
- (b) enabling the player to place a secondary wager on a secondary poker game;
- (c) if the primary wager was placed on said play of the primary card game generating a primary card game outcome and providing the player with any primary awards associated with the primary card game outcome;
- (d) electronically tracking cards played in the primary card game for said play of the primary card game;
- (e) if the secondary wager was placed and a triggering event occurs in said play of the primary card games, providing the player with a secondary poker game card selected from the cards tracked in said play of the primary card game, wherein the secondary poker game card is accumulated for use in the secondary poker game;
- (f) displaying any accumulated secondary poker game cards;
- (g) repeating (a) to (f) at least once until the number of accumulated secondary poker game cards reaches a predetermined number; and
- (h) providing the player with any secondary awards associated with the combination of secondary poker game cards.

26. The method of claim 25, wherein the primary card game is played at a gaming table and tracking the cards includes
- (i) identifying the cards with an optical recognition device or a radio frequency identification device, and
- (ii) storing the identity of the cards in memory.

27. The method of claim 25, which includes tracking the player's primary wager for each play of the primary game.

28. The method of claim 25, wherein the electronic tracking is executed according to a computer program.

29. The method of claim 28, wherein providing the player with a secondary poker game card includes selecting said secondary poker game card from the electronically tracked cards.

30. The method of claim 25, which is operated through a data network.

31. The method of claim 30, wherein the data network is an internet.

32. A method of operating a gaming device including a primary card game played at a gaming table and a secondary game played over a series of plays of the primary game, said method comprising:

(a) enabling a player to place a primary wager on a play of the primary game;

(b) enabling the player to place a secondary wager on the secondary game;

(c) if the primary wager was placed on the play of the primary game, (i) electronically identifying the cards with an optical recognition device or a radio frequency identification device, (ii) storing the identity of the cards in a memory, (iii) generating a primary game outcome and providing the player with any primary awards associated with the primary game outcome, and (iv) if the secondary wager was placed and a triggering event occurs associated with the play of the primary game, providing the player with a secondary game elements said secondary game element accumulated for use in the secondary game;

(d) displaying any accumulated secondary game elements;

(e) repeating (a) to (d) at least once until the number of accumulated secondary game elements reaches a predetermined number; and (f) if the number of accumulated secondary game elements reaches the predetermined number, providing the player with any secondary game awards associated with the combination of secondary game elements.

33. The method of claim 32, wherein the primary game includes a plurality of primary game elements, and the secondary game elements are selected from the primary game elements.

34. The method of claim 33, which includes receiving a player selection of the secondary game elements from the plurality of primary game elements for each qualifying play of the primary game.

35. The method of claim 33, which includes randomly selecting the secondary game elements from the plurality of primary game elements for each qualifying play of the primary game.

36. The method of claim 32, wherein the primary game is a blackjack game including a dealer hand and at least one player hand, the secondary game is a poker game, and the secondary game elements are cards selected from the primary game.

37. The method of claim 32, wherein the triggering event is selected from the group consisting of: (a) the dealer obtaining a blackjack; and (b) the player obtaining a blackjack.

38. The method of claim 32, wherein the secondary game elements are cards selected from a standard deck of fifty-two cards and includes determining the secondary game award based on the combination of cards and according to a paytable.

39. The method of claim 32, which includes enabling the player to forfeit any accumulated secondary game elements.

40. The method of claim 32, wherein the electronic identification of the cards is executed according to a computer program.

41. The method of claim 40, wherein providing the player with a secondary poker game card includes selecting said secondary poker game card from the electronically tracked cards.

42. The method of claim 32, which is operated through a data network.

43. The method of claim 42, wherein the data network is an internet.

44. The method of claim 42, wherein the secondary award is based on a progressive jackpot determined by contributions from a plurality of gaming devices linked through the data network.

* * * * *